US010418811B2

(12) United States Patent
Konya et al.

(10) Patent No.: US 10,418,811 B2
(45) Date of Patent: Sep. 17, 2019

(54) ELECTRIC POWER GRID SUPPLY AND LOAD PREDICTION USING CLEANSED TIME SERIES DATA

(71) Applicant: SAS Institute Inc., Cary, NC (US)

(72) Inventors: Mark Joseph Konya, Chesterfield, MO (US); Bradley Lawson, Jr., Raleigh, NC (US); Jennifer Short Whaley, Cary, NC (US); Sen-Hao Lai, Cary, NC (US); Tom Anderson, Peoria, AZ (US); Emily Jean Forney, Cary, NC (US); Glenn D. Good, Chicago, IL (US); Tae Yoon Lee, Johns Creek, GA (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 16/128,667

(22) Filed: Sep. 12, 2018

(65) Prior Publication Data

US 2019/0081476 A1 Mar. 14, 2019

Related U.S. Application Data

(60) Provisional application No. 62/557,669, filed on Sep. 12, 2017, provisional application No. 62/575,854, (Continued)

(51) Int. Cl.
*H02J 3/00* (2006.01)
*G05B 15/02* (2006.01)
*H02J 13/00* (2006.01)

(52) U.S. Cl.
CPC ............. *H02J 3/00* (2013.01); *G05B 15/02* (2013.01); *H02J 13/0017* (2013.01); *H02J 2003/003* (2013.01); *H02J 2003/007* (2013.01)

(58) Field of Classification Search
None
See application file for complete search history.

(56) References Cited

U.S. PATENT DOCUMENTS 8,600,572 B2 12/2013 Sri-Jayantha
2001/0020219 A1* 9/2001 Kishlock ............ G01R 19/2513
702/61

(Continued)

OTHER PUBLICATIONS

Arora, Siddhartha and Taylor, James W., "Forecasting Electricity Smart Meter Data Using Conditional Kernel Density Estimation" Sep. 9, 2014, arXiv:1409.2856 URL: https://arxiv.org/abs/1409.2856.

(Continued)

*Primary Examiner* — Bernard G Lindsay

(57) ABSTRACT

An apparatus includes a processor to: assign each value of each set of values of an initial supply meter data and of an initial load meter data to one of multiple buckets based on weather conditions and/or time and date; for each bucket, generate upper and lower bounds of power provision and power consumption values, and use the upper and lower bounds to identify outlier values assigned to the bucket; for each set of values within the initial supply meter data and within the initial load meter data, generate a naive model from the non-outlier values, and use interpolation and the naive model to fill in gaps, thereby generating cleansed supply meter data and cleansed load meter data; and store the cleansed supply meter data and cleansed load meter data together as merged meter data for use in making predictions.

30 Claims, 42 Drawing Sheets

Related U.S. Application Data filed on Oct. 23, 2017, provisional application No. 62/576,918, filed on Oct. 25, 2017.

(56) References Cited

U.S. PATENT DOCUMENTS

| | | | | |
|---|---|---|---|---|
| 2012/0232701 | A1* | 9/2012 | Carty | G05B 15/02 |
| | | | | 700/277 |
| 2012/0259583 | A1* | 10/2012 | Noboa | G05B 15/02 |
| | | | | 702/179 |
| 2013/0325195 | A1* | 12/2013 | Patterson | H02J 3/38 |
| | | | | 700/286 |
| 2014/0058572 | A1* | 2/2014 | Stein | G06Q 50/06 |
| | | | | 700/291 |
| 2015/0256435 | A1* | 9/2015 | Sum | G01R 25/00 |
| | | | | 702/62 |
| 2015/0316907 | A1* | 11/2015 | Elbsat | G06Q 10/04 |
| | | | | 700/275 |
| 2015/0332294 | A1* | 11/2015 | Albert | G06Q 30/0202 |
| | | | | 705/7.31 |
| 2016/0048757 | A1 | 2/2016 | Nasle et al. | |
| 2016/0358079 | A9 | 12/2016 | Bou-Abboud | |
| 2017/0212668 | A1* | 7/2017 | Shah | G06F 3/04847 |
| 2017/0285591 | A1* | 10/2017 | Menzel | G05B 15/02 |

OTHER PUBLICATIONS

Eto, Joseph H and Thomas, Robert J., "Computational Needs for the Next Generation Electric Grid" Proceedings, Apr. 19-20, 2011.

Haben et al., "A new error measure for forecasts of household-level, high resolution electrical energy consumption" International Journal of Forecasting, vol. 30, Issue 2, Apr.-Jun. 2014, pp. 246-256.

Mirowski et al., "Demand Forecasting in Smart Grids", Feb. 26, 2014, Bell Labs Technical Journal, vol. 18, Issue 4, Special Issue: Data Analytics, Mar. 2014, pp. 135-158.

Sevlian, Raffi Avo and Ram Rajagopal. "A model for the effect of aggregation on short term load forecasting." 2014 IEEE PES General Meeting | Conference & Exposition (2014): 1-5.

* cited by examiner

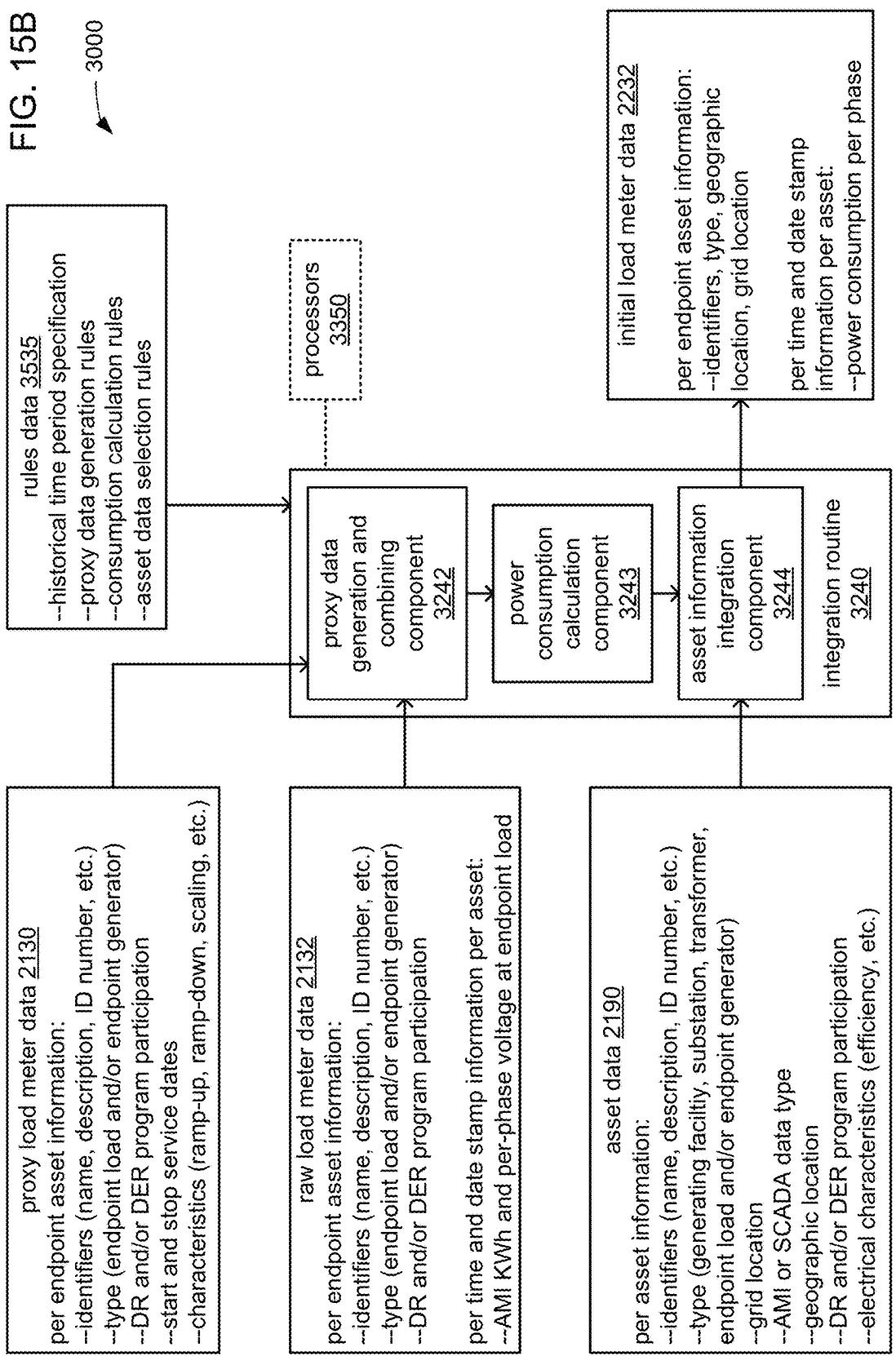

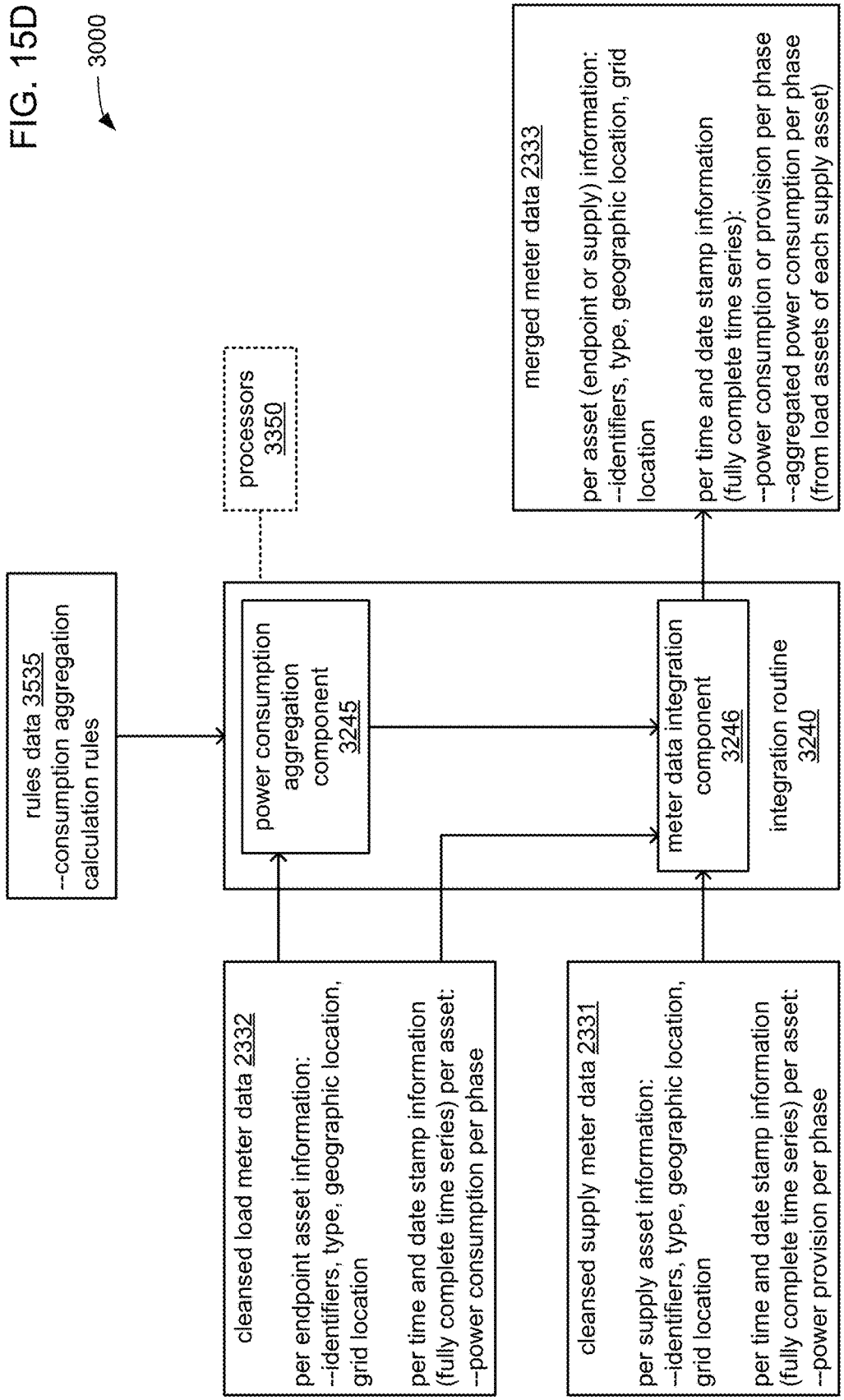

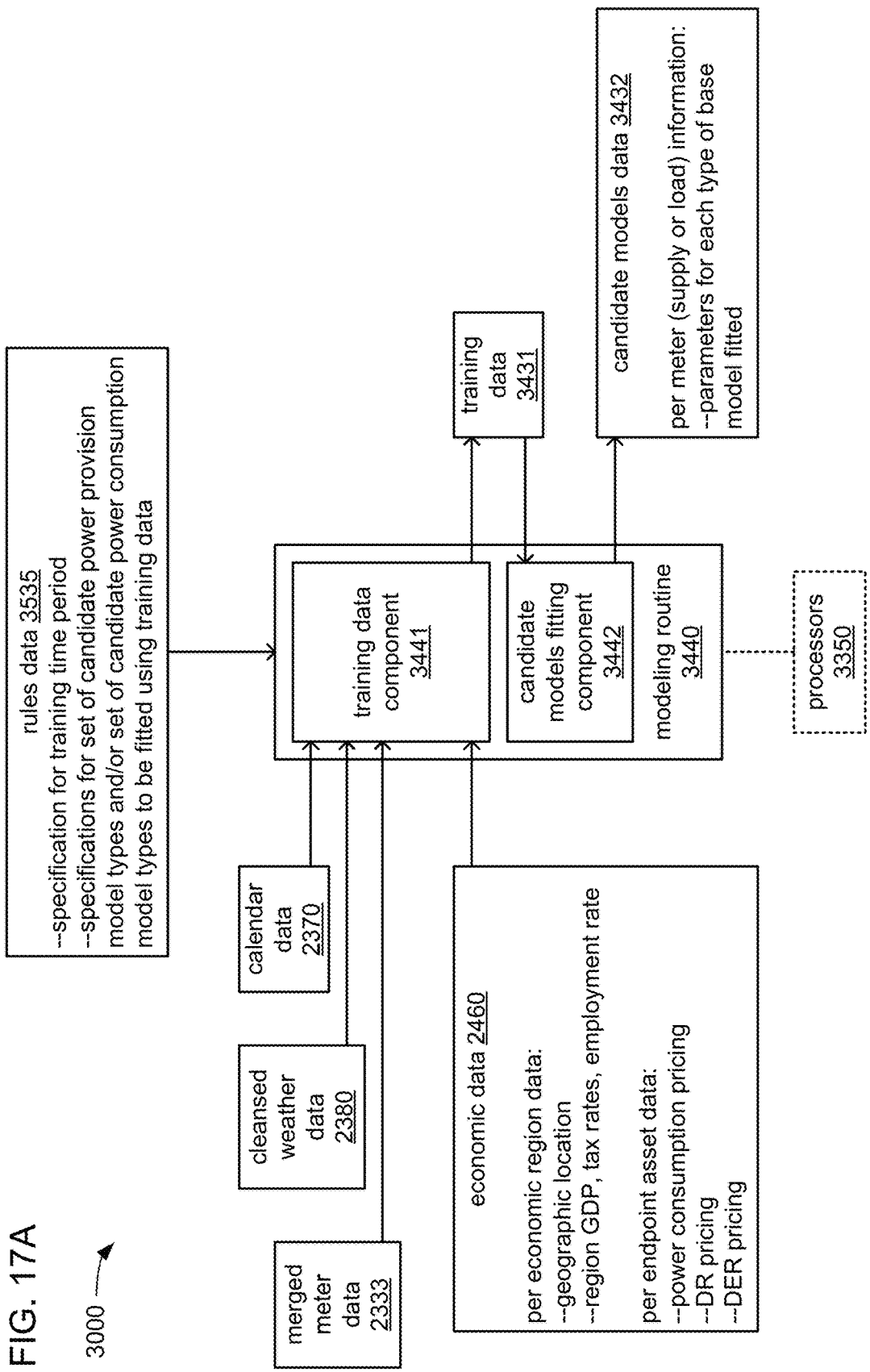

4100

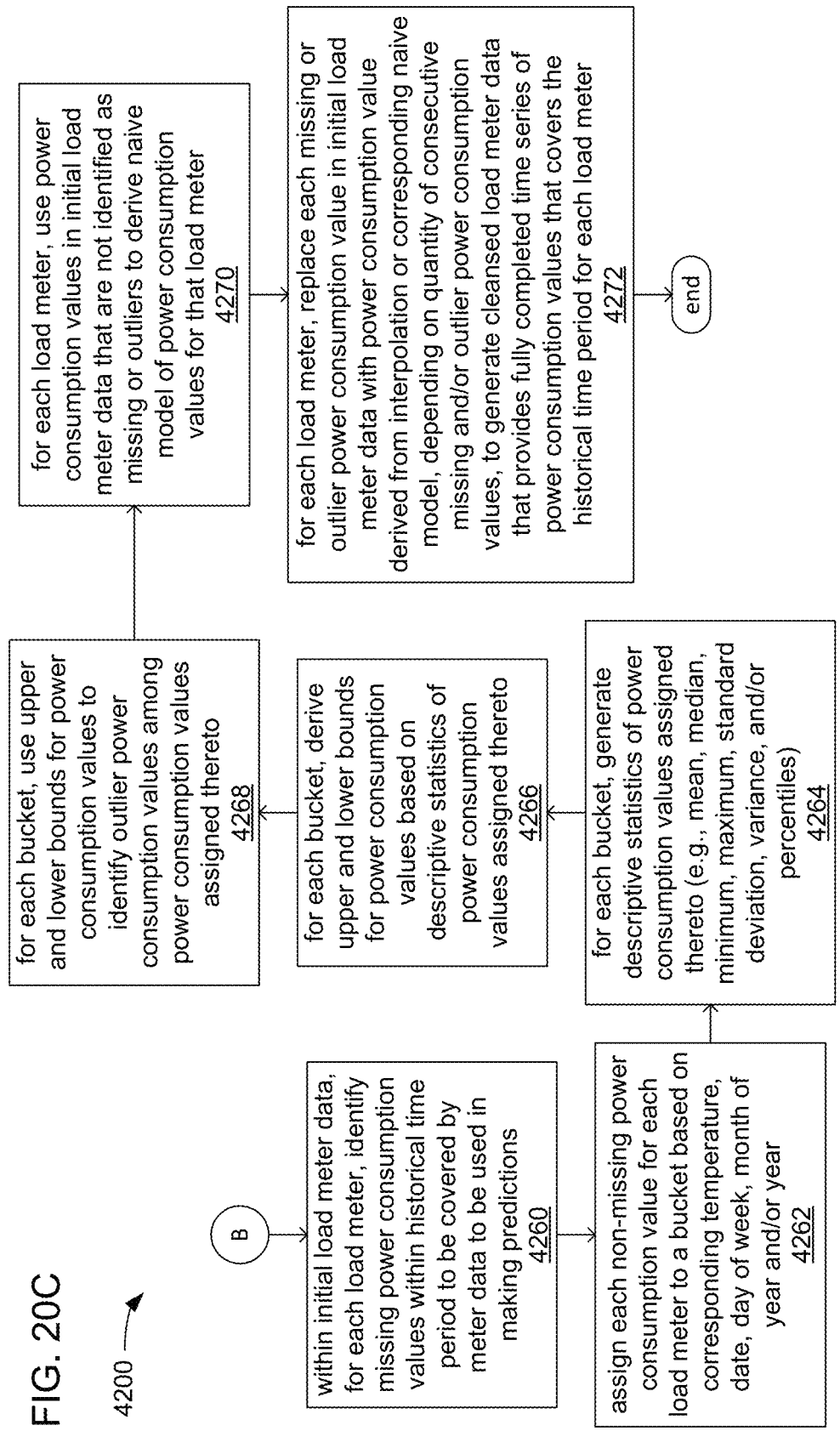

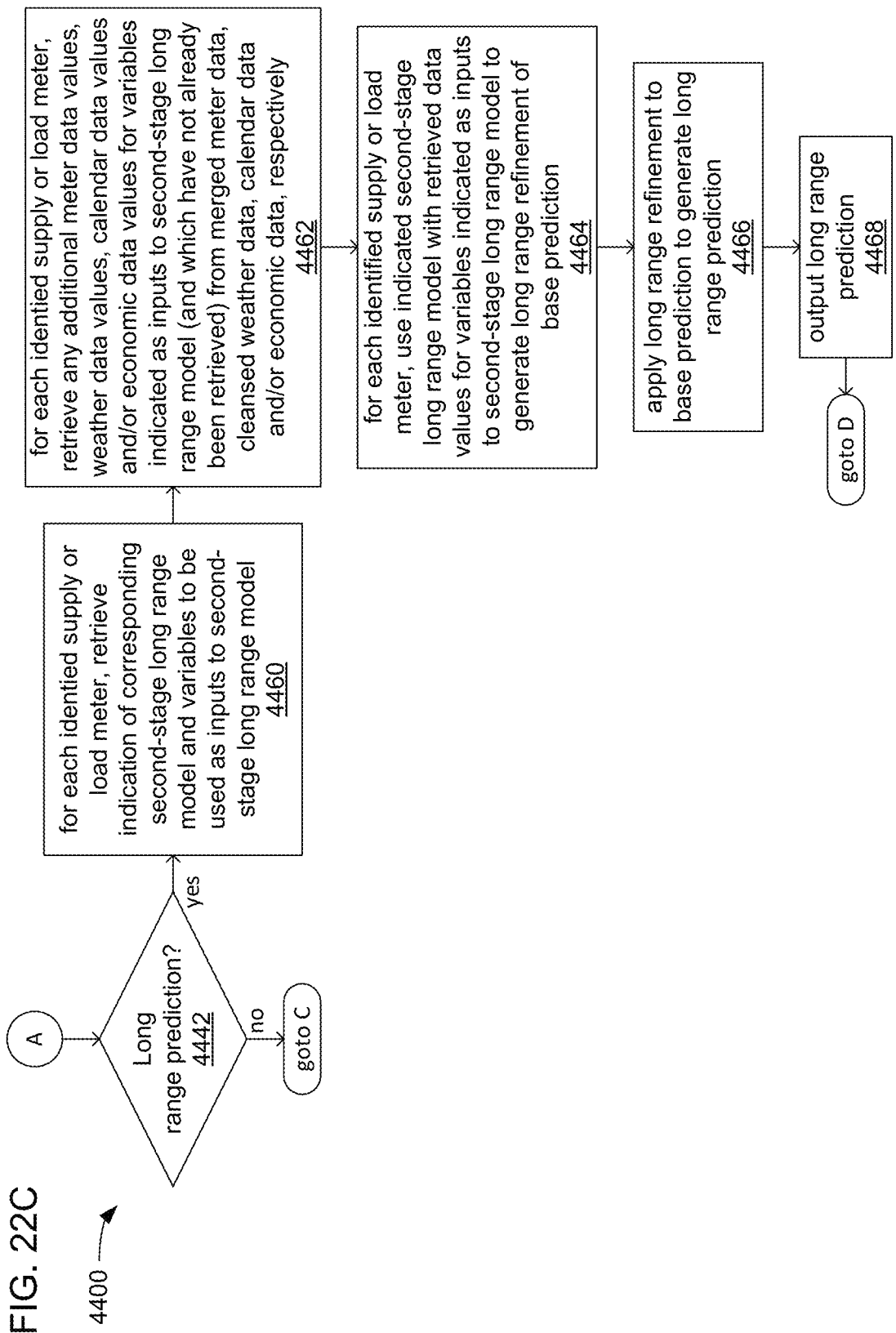

ELECTRIC POWER GRID SUPPLY AND LOAD PREDICTION USING CLEANSED TIME SERIES DATA

CROSS-REFERENCE TO RELATED APPLICATIONS

This application claims the benefit of priority under 35 U.S.C. § 119(e) to U.S. Provisional Application Ser. No. 62/557,669 filed Sep. 12, 2017; U.S. Provisional Application Ser. No. 62/575,854 filed Oct. 23, 2017; and U.S. Provisional Application Ser. No. 62/576,918 filed Oct. 25, 2017; the entirety of each of which is incorporated herein by reference.

BACKGROUND

Operators of electric power grids have long had possession of considerable quantities of data indicative of amounts of electric power provided and consumed at various points within those power grids, but have not been able to effectively use that data in making predictions of future provision or consumption of electric power. Various characteristics of that data typically thwart efforts to use it in making such predictions such that it remains a common practice for operators of power grids to do little better than to essentially guess based on the years of personal experience built up by various personnel. Such reliance on the first hand experiences of individuals necessarily includes making assumptions, without any analytical basis, that levels of power provision and/or consumption in one part of a power grid during an upcoming period of time will exhibit a behavior similar to what is remembered as having occurred before in another entirely different part of a power grid during an entirely different period of time in the past.

A power grid operator controls the operation of supply assets within the power grid that are used to provide electric power, such as generator facilities, transmission lines, distribution substations, primary and second distribution lines, and distribution transformers. Transmission lines are typically used to convey electric power across relatively lengthy distances from generator facilities to distribution substations which in turn convey electric power through distribution lines to endpoint locations at which electric power is consumed. At many of the supply locations, supply meters monitor the amount of electric power produced at or conveyed through one or more of such supply assets. A power grid operator also employs load meters to monitor the consumption of electric power at each of a great many endpoint locations.

The endpoint locations may include primary endpoint locations, such as relatively large industrial facilities or public venues that are typically served by primary distribution lines conveying three-phase electric power relatively directly from distribution substations. The endpoint locations may also include a vastly larger number of second endpoint locations, such as individual houses and places of business, that are typically served by secondary distribution lines conveying two poles of single-phase electric power tapped from separate lines of the three phases of the primary distribution lines through distribution transformers. At each of such primary and secondary endpoints, load meters monitor the amount of electric power consumed by the endpoint assets thereat (e.g., lighting, industrial machinery, climate control systems, appliances, electronic devices, etc.).

Typical power grids include thousands of supply locations from which supply meters provide data indicative of electric power generated or conveyed therethrough. The vast quantities of data provided by the supply meters is typically used to monitor the operating condition of the supply assets, as well as relative degrees of use of each. As will be familiar to those skilled in the art, the generating facilities of a power grid typically include a combination of generating facilities that are able to be operated to relatively quickly change the amount of electric power produced to adjust for changes in demand for electric power that usually occur at various times throughout each day, and generating facilities that are not able to be so operated. As will also be familiar to those skilled in the art, the generating facilities of a power grid typically include a combination of technologies for generating electricity such that each generating facility may be more or less expensive than the others to operate to produce each megawatt of electric power. Thus, the data from the supply meters at generating facilities is, therefore, typically used to monitor how much electric power is being produced at each generating facility at various times of each day as part of monitoring power generation costs.

Typical power grids include millions of endpoint locations from which load meters provide data indicative of electric power consumed. The even greater quantities of data provided by the load meters are typically used to generate monthly bills for the amount and, in some cases, the demand of electric power consumed at each endpoint location.

The recent advent of communications networks in power grids by which both supply and load meters may be remotely monitored from a central location has enabled ongoing monitoring at frequent intervals. This has eliminated the need for in-person visits by personnel to supply and/or endpoint locations to gather and bring back data from supply and load meters at what has traditionally been monthly intervals. However, this change from such monthly collection of data to the collection through a communications network at far shorter intervals has vastly increased the quantity of data that is collected. Also, the data provided by the supply and load meters typically employs different communications protocols, includes the use of different units of measure, and is measured at differing intervals of time. Further, the data provided by load meters is subject to frequently changing conditions at endpoint locations, including frequent changes in who consumes electric power at each endpoint location, and frequent changes in how many endpoint locations are connected to the power grid.

SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

An apparatus includes a processor and a storage to store instructions that, when executed by the processor, cause the processor to perform operations including retrieve initial supply meter data from the storage, wherein the initial supply meter data includes, for each supply meter of multiple supply meters of a power grid, a set of power provision values for a corresponding supply asset at a corresponding supply location, and each power supply value is representative of a measure of power provision taken at a time and date by a supply meter during a predetermined historical time period; and retrieve initial load meter data from the storage, wherein the initial load meter data includes, for each load meter of multiple load meters of the power grid, a set of power consumption values for a corresponding endpoint asset at a corresponding endpoint location, and each power consumption value is representative of a measure of power consumption taken at a time and date by a load meter during the predetermined historical time period. The processor is further caused to: assign each power provision value of the initial supply meter data to one of multiple buckets based on at least a weather condition at the corresponding supply location at the corresponding time and date; and assign each power consumption value of the initial load meter data to one of the multiple buckets based on at least a weather condition at the corresponding endpoint location at the corresponding time and date. For each bucket, the processor is further caused to: derive upper and lower bounds of power provision from the power provision values assigned to the bucket; use the upper and lower bounds of power provision to identify outlier power provision values among the power provision values assigned to the bucket; generate a naive power provision model from the power provision values assigned to the bucket that are not identified as outliers; derive upper and lower bounds of power consumption from the power consumption values assigned to the bucket; use the upper and lower bounds of power consumption to identify outlier power consumption values among the power consumption values assigned to the bucket; and generate a naive power consumption model from the power consumption values assigned to the bucket that are not identified as outliers. For each set of power provision values within the initial supply meter data, the processor is caused to perform further operations to generate, from the initial supply meter data, cleansed supply meter data in which each set of power provision values defines a complete time series, the further operations including: identify missing power provision values, wherein each power provision value identified as missing or an outlier in the set of power provision values defines at least part of a gap that prevents the set of power provision values from defining a complete time series; and for each missing or outlier power provision value in each gap that exceeds a predetermined threshold quantity of power provision values, employ a naive power provision model of the corresponding bucket to generate a power provision value to fill the gap. For each set of power consumption values within the initial load meter data, the processor is caused to perform further operations to generate, from the initial load meter data, cleansed load meter data in which each set of power consumption values defines a complete time series, the further operations including: identify missing power consumption values, wherein each power consumption value identified as missing or an outlier in the set of power consumption values defines at least part of a gap that prevents the set of power consumption values from defining a complete time series; and for each missing or outlier power consumption value in each gap that exceeds a predetermined threshold quantity of power consumption values, employ a naive power consumption model of one of the corresponding bucket to generate a power consumption value to fill the gap. The processor is still further caused to merge the cleansed load meter data and the cleansed supply meter data into merged meter data, and store the merged meter data within the storage to enable generation of power provision models and power consumption models of the power grid.

The processor may be caused to perform operations including: for each set of power provision values within the initial supply meter data, the processor is caused to perform further operations to generate the cleansed supply meter data from the initial supply meter data, the further operations including, for each missing or outlier power provision value in each gap that does not exceed the predetermined threshold quantity of power provision values, employ interpolation of power provision values adjacent to the gap to generate a power provision value to fill the gap; and for each set of power consumption values within the initial load meter data, the processor is caused to perform further operations to generate the cleansed load meter data from the initial load meter data, the further operations including, for each missing or outlier power consumption value in each gap that does not exceed the predetermined threshold quantity of power consumption values, employ interpolation of power consumption values adjacent to the gap to generate a power consumption value to fill the gap.

The processor may be further caused to perform operations including: receive raw supply meter readings from the multiple supply meters via a communications network of the power grid, wherein each raw supply meter reading includes a measure, taken by a supply meter, of electric power supplied on at least one phase of electric power by the corresponding supply asset, and each raw supply meter reading includes an indication of when the measure of electric power provided was taken by the supply meter; and receive raw load meter readings from the multiple load meters via a communications network of the power grid, wherein each raw load meter reading includes a measure, taken by a load meter, of electric power consumed on at least one phase of electric power by an endpoint asset, and each raw load meter reading includes an indication of when the measure of electric power consumed was taken by the load meter. The processor may further caused to, for each supply meter of the multiple supply meters, convert a set of corresponding raw supply meter readings into a corresponding set of power provision values of the initial supply meter data; and for each load meter of the multiple load meters, convert a set of corresponding raw load meter readings into a corresponding set of power consumption values of the initial load meter data.

The processor may be caused to perform operations including: retrieve proxy load meter readings, wherein the proxy load meter readings include indications of electrical characteristics of at least one endpoint asset at an endpoint location that was not connected to the power grid for a portion of the predetermined historical time period; and for each endpoint asset that was not connected to the power grid for a portion of the predetermined historical time period, the processor may be further caused to use corresponding electrical characteristics indicated in the proxy load meter readings to generate simulated load meter readings for the endpoint asset for the portion of the predetermined historical time period, and augment the raw load meter readings with the simulated load meter readings prior to conversion to power consumption values.

The processor may be caused to perform operations including: retrieve initial weather data including weather data values indicative of weather conditions at multiple weather station locations within a geographic area covered by the power grid; perform cleansing of the weather data values to fill gaps in the weather data values to cause the weather data values associated with each of the weather station location to define a complete time series of weather data values to generate cleansed weather data from the initial weather data; correlate each power consumption value of the initial load meter data to a weather data value in a time series of weather data values of the cleansed weather data; assign each power consumption value of the initial load meter data to one of the multiple buckets based at least on the correlated weather data value; correlate each power provision value of the initial supply meter data to a weather data value in a time series of weather data values of the cleansed weather data; and assign each power provision value of the initial supply meter data to one of the multiple buckets based at least on the correlated weather data value.

The processor may be caused to perform operations including retrieve calendar data including at least one of: indications of correlations between dates within the historical time period to days of a week or months of a year; or indications of holidays within the historical time period that are applicable to at least a portion of the geographic area covered by the grid. The processor may be further caused to: define each bucket of the multiple buckets to correspond to a different combination of a range of values of a weather condition and a range of dates; assign each power consumption value of the initial load meter data to one of the multiple buckets based at least on the date of the corresponding measure of power consumption and the correlated weather data value; and assign each power provision value of the initial supply meter data to one of the multiple buckets based at least on the date of the corresponding measure of power provision and the correlated weather data value.

The processor may be caused to perform operations including retrieve asset data including at least one of: identifiers of supply assets and endpoint assets of the power grid; indications of locations of supply assets and endpoint assets within a hierarchy of electrical pathways of the power grid; indications of geographic locations of supply locations of supply assets within a geographic area covered by the power grid; and indications of geographic locations of endpoint locations of endpoint assets within the geographic area covered by the power grid. The processor may be further caused to, for each set of power provision values within the cleansed supply meter data: use the asset data to correlate the supply asset corresponding to the set of power provision values to one or more endpoint assets that are provided with electric power by the supply asset in the power grid; retrieve the one or more sets of power consumption values within the cleansed load meter data that correspond to the one or more endpoint assets; aggregate the one or more sets of power consumption values to generate a set of aggregated power consumption values to correspond to the set of power provision values; and include the set of aggregated power consumption values in the merged meter data.

The processor may be caused to perform operations including: retrieve, from the merged meter data, a first portion of each time series of power provision values and of each time series of power consumption values from for a predetermined training time period within the historical time period for use as training data; and retrieve, from the merged meter data, a second portion of each time series of power provision values and of each time series of power consumption values from for a predetermined testing time period within the historical time period for use as testing data. The processor may further caused to retrieve, from at least one of cleansed weather data, calendar data or economic data, a first subset of data values for the training time period for use as further training data and a second subset of data values for the testing time period for use as further testing data, wherein: the cleansed weather data includes data values indicative of weather conditions at multiple weather station locations within a geographic area covered by the power grid throughout the historical time period; the calendar data includes at least one of indications of correlations between dates within the historical time period to days of a week or months of a year, or indications of holidays within the historical time period that are applicable to at least a portion of the geographic area covered by the grid; and the economic data includes data values indicative of economic conditions within the geographic area covered by the power grid throughout the historical time period. The processor may be further caused to, for each supply meter of the multiple supply meters: use the first portion of the corresponding time series within the training data, along with the further training data, in multiple performances of linear regression to generate a corresponding set of candidate models of power provision by the corresponding supply asset, wherein the corresponding set of candidate models of power provision are of a preselected set of model types; use the second portion of the corresponding time series within the testing data, along with the further testing data, to derive a degree of error for each candidate model of the corresponding set of candidate models of power provision; analyze the degree of error of each candidate model of the corresponding set of candidate models of power provision to identify a corresponding champion model of power provision; and store an indication of the corresponding champion model of power provision and an indication of variables to be used as inputs thereto within the storage to enable use of the corresponding champion model of power provision in a prediction of power provision by the corresponding supply asset. The processor may be further caused to, for each load meter of the multiple load meters: use the first portion of the corresponding time series within the training data, along with the further training data, in multiple performances of linear regression to generate a corresponding set of candidate models of power consumption by the corresponding endpoint asset, wherein the corresponding set of candidate models of power consumption are of the preselected set of model types; use the second portion of the corresponding time series within the testing data, along with the further testing data, to derive a degree of error for each candidate model of the corresponding set of candidate models of power consumption; analyze the degree of error of each candidate model of the corresponding set of candidate models of power consumption to identify a corresponding champion model of power consumption; and store an indication of the corresponding champion model of power consumption and an indication of variables to be used as inputs thereto within the storage to enable use of the corresponding champion model of power consumption in a prediction of power consumption by the corresponding endpoint asset.

The processor may be caused to perform operations including: retrieve, from the merged meter data, a third portion of each time series of power provision values and of each time series of power consumption values from for a predetermined short range training time period within the historical time period for use as short range training data; retrieve, from the merged meter data, a fourth portion of each time series of power provision values and of each time series of power consumption values from for a predetermined long range training time period within the historical time period for use as long range training data; retrieve, from at least the cleansed weather data, a third subset of data values for the short range training time period for use as further short range training data; and retrieve, from at least the economic data, a fourth subset of data values for the long range training time period for use as further long range training data. For each supply meter of the multiple supply meters, the processor may be further caused to: use the third portion of the corresponding time series within the short range training data, along with the further short range training data to generate a corresponding second-stage short range model of power provision by the corresponding supply asset to address overfitting of the corresponding champion model of power provision for a short range period of time; use the fourth portion of the corresponding time series within the long range training data, along with the further long range training data to generate a corresponding second-stage long range model of power provision by the corresponding supply asset to address overfitting of the corresponding champion model of power provision for a long range period of time; and store indications of the corresponding second-stage short range model of power provision and corresponding second-stage long range model of power provision to enable use of the corresponding champion model of power provision in a short range or long range prediction of power provision by the corresponding supply asset. For each load meter of the multiple load meters, the processor may be further caused to: use the third portion of the corresponding time series within the short range training data, along with the further short range training data to generate a corresponding second-stage short range model of power consumption by the corresponding endpoint asset to address overfitting of the corresponding champion model of power consumption for a short range period of time; use the fourth portion of the corresponding time series within the long range training data, along with the further long range training data to generate a corresponding second-stage long range model of power consumption by the corresponding endpoint asset to address overfitting of the corresponding champion model of power consumption for a long range period of time; and store indications of the corresponding second-stage short range model of power consumption and corresponding second-stage long range model of power consumption to enable use of the corresponding champion model of power consumption in a short range or long range prediction of power consumption by the corresponding endpoint asset.

The processor may be caused to perform operations including: receive a request from a requesting device for a prediction that covers a specified portion of the power grid for a specified prediction time period, and retrieve asset data that includes at least one of: identifiers of supply assets and endpoint assets of the power grid; indications of locations of supply assets and endpoint assets within a hierarchy of electrical pathways of the power grid; indications of geographic locations of supply locations of supply assets within a geographic area covered by the power grid; and indications of geographic locations of endpoint locations of endpoint assets within the geographic area covered by the power grid. The processor may be further caused to: use the asset data to identify one or more supply assets and one or more endpoint assets within the specified portion of the power grid; retrieve, from the merged meter data, a portion of the time series of power provision values for each supply meter that corresponds to an asset of the identified one or more supply assets; for each supply meter that corresponds to a supply asset of the identified one or more supply assets, use the corresponding champion model of power provision with the retrieved portion of the corresponding time series of power provision values to generate a corresponding base prediction of power provision; retrieve, from the merged meter data, a portion of the time series of power consumption values for each load meter that corresponds to an endpoint asset of the identified one or more endpoint assets; for each load meter that corresponds to an endpoint asset of the identified one or more endpoint assets, use the corresponding champion model of power consumption with the retrieved portion of the corresponding time series of power consumption values to generate a corresponding base prediction of power consumption; and analyze the specified prediction time period to determine whether the requested prediction includes a short range prediction, a mid range prediction or a long range prediction. In response to a determination that the requested prediction includes a short range prediction, the processor is caused to: for each supply meter that corresponds to a supply asset of the identified one or more supply assets, use the corresponding second-stage short range model of power provision with the retrieved portion of the corresponding time series of power provision values to generate a corresponding short range refinement of the corresponding base prediction of power provision, apply the corresponding short range refinement to the corresponding base prediction of power provision, and provide the corresponding base prediction of power provision, after refinement, in response to the request; and for each load meter that corresponds to an endpoint asset of the identified one or more load assets, use the corresponding second-stage short range model of power consumption with the retrieved portion of the corresponding time series of power consumption values to generate a corresponding short range refinement of the corresponding base prediction of power consumption, apply the corresponding short range refinement to the corresponding base prediction of power consumption, and provide the corresponding base prediction of power consumption, after refinement, in response to the request. In response to a determination that the requested prediction includes a long range prediction, the processor may be caused to: for each supply meter that corresponds to a supply asset of the identified one or more supply assets, use the corresponding second-stage long range model of power provision with the retrieved portion of the corresponding time series of power provision values to generate a corresponding long range refinement of the corresponding base prediction of power provision, apply the corresponding long range refinement to the corresponding base prediction of power provision, and provide the corresponding base prediction of power provision, after refinement, in response to the request; and for each load meter that corresponds to an endpoint asset of the identified one or more load assets, use the corresponding second-stage long range model of power consumption with the retrieved portion of the corresponding time series of power consumption values to generate a corresponding long range refinement of the corresponding base prediction of power consumption, apply the corresponding long range refinement to the corresponding base prediction of power consumption, and provide the corresponding base prediction of power consumption, after refinement, in response to the request. Or, in response to a determination that the requested prediction includes a mid range prediction, the processor may be caused to: for each supply meter that corresponds to a supply asset of the identified one or more supply assets, provide the corresponding base prediction of power provision in response to the request; and for each load meter that corresponds to an endpoint asset of the identified one or more load assets: provide the corresponding base prediction of power consumption in response to the request.

A computer-program product tangibly embodied in a non-transitory machine-readable storage medium includes instructions operable to cause a processor to perform operations including: retrieve initial supply meter data from the storage, wherein the initial supply meter data includes, for each supply meter of multiple supply meters of a power grid, a set of power provision values for a corresponding supply asset at a corresponding supply location, and each power supply value is representative of a measure of power provision taken at a time and date by a supply meter during a predetermined historical time period; and retrieve initial load meter data from the storage, wherein the initial load meter data includes, for each load meter of multiple load meters of the power grid, a set of power consumption values for a corresponding endpoint asset at a corresponding endpoint location, and each power consumption value is representative of a measure of power consumption taken at a time and date by a load meter during the predetermined historical time period. The processor is further caused to: assign each power provision value of the initial supply meter data to one of multiple buckets based on at least a weather condition at the corresponding supply location at the corresponding time and date; and assign each power consumption value of the initial load meter data to one of the multiple buckets based on at least a weather condition at the corresponding endpoint location at the corresponding time and date. For each bucket, the processor is further caused to: derive upper and lower bounds of power provision from the power provision values assigned to the bucket; use the upper and lower bounds of power provision to identify outlier power provision values among the power provision values assigned to the bucket; generate a naive power provision model from the power provision values assigned to the bucket that are not identified as outliers; derive upper and lower bounds of power consumption from the power consumption values assigned to the bucket; use the upper and lower bounds of power consumption to identify outlier power consumption values among the power consumption values assigned to the bucket; and generate a naive power consumption model from the power consumption values assigned to the bucket that are not identified as outliers. For each set of power provision values within the initial supply meter data, the processor is caused to perform further operations to generate, from the initial supply meter data, cleansed supply meter data in which each set of power provision values defines a complete time series, the further operations including: identify missing power provision values, wherein each power provision value identified as missing or an outlier in the set of power provision values defines at least part of a gap that prevents the set of power provision values from defining a complete time series; and for each missing or outlier power provision value in each gap that exceeds a predetermined threshold quantity of power provision values, employ a naive power provision model of the corresponding bucket to generate a power provision value to fill the gap. For each set of power consumption values within the initial load meter data, the processor is caused to perform further operations to generate, from the initial load meter data, cleansed load meter data in which each set of power consumption values defines a complete time series, the further operations including: identify missing power consumption values, wherein each power consumption value identified as missing or an outlier in the set of power consumption values defines at least part of a gap that prevents the set of power consumption values from defining a complete time series; and for each missing or outlier power consumption value in each gap that exceeds a predetermined threshold quantity of power consumption values, employ a naive power consumption model of one of the corresponding buckets to generate a power consumption value to fill the gap. The processor is further caused to: merge the cleansed load meter data and the cleansed supply meter data into merged meter data; and store the merged meter data within the storage to enable generation of power provision models and power consumption models of the power grid.

The processor may be caused to perform operations including: for each set of power provision values within the initial supply meter data, the processor is caused to perform further operations to generate the cleansed supply meter data from the initial supply meter data, the further operations including, for each missing or outlier power provision value in each gap that does not exceed the predetermined threshold quantity of power provision values, employ interpolation of power provision values adjacent to the gap to generate a power provision value to fill the gap; and for each set of power consumption values within the initial load meter data, the processor is caused to perform further operations to generate the cleansed load meter data from the initial load meter data, the further operations including, for each missing or outlier power consumption value in each gap that does not exceed the predetermined threshold quantity of power consumption values, employ interpolation of power consumption values adjacent to the gap to generate a power consumption value to fill the gap.

The processor may be caused to perform operations including: receive raw supply meter readings from the multiple supply meters via a communications network of the power grid, wherein each raw supply meter reading includes a measure, taken by a supply meter, of electric power supplied on at least one phase of electric power by the corresponding supply asset, and each raw supply meter reading includes an indication of when the measure of electric power provided was taken by the supply meter; and receive raw load meter readings from the multiple load meters via a communications network of the power grid, wherein each raw load meter reading includes a measure, taken by a load meter, of electric power consumed on at least one phase of electric power by an endpoint asset, and each raw load meter reading includes an indication of when the measure of electric power consumed was taken by the load meter; for each supply meter of the multiple supply meters, convert a set of corresponding raw supply meter readings into a corresponding set of power provision values of the initial supply meter data; and for each load meter of the multiple load meters, convert a set of corresponding raw load meter readings into a corresponding set of power consumption values of the initial load meter data.

The processor may be caused to perform operations including: retrieve proxy load meter readings, wherein the proxy load meter readings include indications of electrical characteristics of at least one endpoint asset at an endpoint location that was not connected to the power grid for a portion of the predetermined historical time period; and for each endpoint asset that was not connected to the power grid for a portion of the predetermined historical time period, the processor may be caused to use corresponding electrical characteristics indicated in the proxy load meter readings to generate simulated load meter readings for the endpoint asset for the portion of the predetermined historical time period, and augment the raw load meter readings with the simulated load meter readings prior to conversion to power consumption values.

The processor may be caused to perform operations including: retrieve initial weather data including weather data values indicative of weather conditions at multiple weather station locations within a geographic area covered by the power grid; perform cleansing of the weather data values to fill gaps in the weather data values to cause the weather data values associated with each of the weather station location to define a complete time series of weather data values to generate cleansed weather data from the initial weather data; correlate each power consumption value of the initial load meter data to a weather data value in a time series of weather data values of the cleansed weather data; assign each power consumption value of the initial load meter data to one of the multiple buckets based at least on the correlated weather data value; correlate each power provision value of the initial supply meter data to a weather data value in a time series of weather data values of the cleansed weather data; and assign each power provision value of the initial supply meter data to one of the multiple buckets based at least on the correlated weather data value.

The processor may be caused to perform operations including: retrieve calendar data that includes at least one of indications of correlations between dates within the historical time period to days of a week or months of a year, or indications of holidays within the historical time period that are applicable to at least a portion of the geographic area covered by the grid; define each bucket of the multiple buckets to correspond to a different combination of a range of values of a weather condition and a range of dates; assign each power consumption value of the initial load meter data to one of the multiple buckets based at least on the date of the corresponding measure of power consumption and the correlated weather data value; and assign each power provision value of the initial supply meter data to one of the multiple buckets based at least on the date of the corresponding measure of power provision and the correlated weather data value.

The processor may be caused to perform operations including retrieve asset data including at least one of: identifiers of supply assets and endpoint assets of the power grid; indications of locations of supply assets and endpoint assets within a hierarchy of electrical pathways of the power grid; indications of geographic locations of supply locations of supply assets within a geographic area covered by the power grid; and indications of geographic locations of endpoint locations of endpoint assets within the geographic area covered by the power grid. The processor may be further caused to perform operations including, for each set of power provision values within the cleansed supply meter data, the processor is caused to: use the asset data to correlate the supply asset corresponding to the set of power provision values to one or more endpoint assets that are provided with electric power by the supply asset in the power grid; retrieve the one or more sets of power consumption values within the cleansed load meter data that correspond to the one or more endpoint assets; aggregate the one or more sets of power consumption values to generate a set of aggregated power consumption values to correspond to the set of power provision values; and include the set of aggregated power consumption values in the merged meter data.

The processor may be caused to perform operations including: retrieve, from the merged meter data, a first portion of each time series of power provision values and of each time series of power consumption values from for a predetermined training time period within the historical time period for use as training data; retrieve, from the merged meter data, a second portion of each time series of power provision values and of each time series of power consumption values from for a predetermined testing time period within the historical time period for use as testing data; and retrieve, from at least one of cleansed weather data, calendar data or economic data, a first subset of data values for the training time period for use as further training data and a second subset of data values for the testing time period for use as further testing data, wherein: the cleansed weather data includes data values indicative of weather conditions at multiple weather station locations within a geographic area covered by the power grid throughout the historical time period; the calendar data includes at least one of indications of correlations between dates within the historical time period to days of a week or months of a year, or indications of holidays within the historical time period that are applicable to at least a portion of the geographic area covered by the grid; and the economic data includes data values indicative of economic conditions within the geographic area covered by the power grid throughout the historical time period. For each supply meter of the multiple supply meters, the processor may be further caused to: use the first portion of the corresponding time series within the training data, along with the further training data, in multiple performances of linear regression to generate a corresponding set of candidate models of power provision by the corresponding supply asset, wherein the corresponding set of candidate models of power provision are of a preselected set of model types; use the second portion of the corresponding time series within the testing data, along with the further testing data, to derive a degree of error for each candidate model of the corresponding set of candidate models of power provision; analyze the degree of error of each candidate model of the corresponding set of candidate models of power provision to identify a corresponding champion model of power provision; and store an indication of the corresponding champion model of power provision and an indication of variables to be used as inputs thereto within the storage to enable use of the corresponding champion model of power provision in a prediction of power provision by the corresponding supply asset. For each load meter of the multiple load meters, the processor may be further caused to: use the first portion of the corresponding time series within the training data, along with the further training data, in multiple performances of linear regression to generate a corresponding set of candidate models of power consumption by the corresponding endpoint asset, wherein the corresponding set of candidate models of power consumption are of the preselected set of model types; use the second portion of the corresponding time series within the testing data, along with the further testing data, to derive a degree of error for each candidate model of the corresponding set of candidate models of power consumption; analyze the degree of error of each candidate model of the corresponding set of candidate models of power consumption to identify a corresponding champion model of power consumption; and store an indication of the corresponding champion model of power consumption and an indication of variables to be used as inputs thereto within the storage to enable use of the corresponding champion model of power consumption in a prediction of power consumption by the corresponding endpoint asset.

The processor may be caused to perform operations including: retrieve, from the merged meter data, a third portion of each time series of power provision values and of each time series of power consumption values from for a predetermined short range training time period within the historical time period for use as short range training data; retrieve, from the merged meter data, a fourth portion of each time series of power provision values and of each time series of power consumption values from for a predetermined long range training time period within the historical time period for use as long range training data; retrieve, from at least the cleansed weather data, a third subset of data values for the short range training time period for use as further short range training data; and retrieve, from at least the economic data, a fourth subset of data values for the long range training time period for use as further long range training data. For each supply meter of the multiple supply meters, the processor may be further caused to: use the third portion of the corresponding time series within the short range training data, along with the further short range training data to generate a corresponding second-stage short range model of power provision by the corresponding supply asset to address overfitting of the corresponding champion model of power provision for a short range period of time; use the fourth portion of the corresponding time series within the long range training data, along with the further long range training data to generate a corresponding second-stage long range model of power provision by the corresponding supply asset to address overfitting of the corresponding champion model of power provision for a long range period of time; and store indications of the corresponding second-stage short range model of power provision and corresponding second-stage long range model of power provision to enable use of the corresponding champion model of power provision in a short range or long range prediction of power provision by the corresponding supply asset. For each load meter of the multiple load meters, the processor may be further caused to: use the third portion of the corresponding time series within the short range training data, along with the further short range training data to generate a corresponding second-stage short range model of power consumption by the corresponding endpoint asset to address overfitting of the corresponding champion model of power consumption for a short range period of time; use the fourth portion of the corresponding time series within the long range training data, along with the further long range training data to generate a corresponding second-stage long range model of power consumption by the corresponding endpoint asset to address overfitting of the corresponding champion model of power consumption for a long range period of time; and store indications of the corresponding second-stage short range model of power consumption and corresponding second-stage long range model of power consumption to enable use of the corresponding champion model of power consumption in a short range or long range prediction of power consumption by the corresponding endpoint asset.

The processor may be caused to perform operations including: receive a request from a requesting device for a prediction that covers a specified portion of the power grid for a specified prediction time period; and retrieve asset data that includes at least one of: identifiers of supply assets and endpoint assets of the power grid; indications of locations of supply assets and endpoint assets within a hierarchy of electrical pathways of the power grid; indications of geographic locations of supply locations of supply assets within a geographic area covered by the power grid; and indications of geographic locations of endpoint locations of endpoint assets within the geographic area covered by the power grid. The processor may be further caused to: use the asset data to identify one or more supply assets and one or more endpoint assets within the specified portion of the power grid; retrieve, from the merged meter data, a portion of the time series of power provision values for each supply meter that corresponds to an asset of the identified one or more supply assets; for each supply meter that corresponds to a supply asset of the identified one or more supply assets, use the corresponding champion model of power provision with the retrieved portion of the corresponding time series of power provision values to generate a corresponding base prediction of power provision; retrieve, from the merged meter data, a portion of the time series of power consumption values for each load meter that corresponds to an endpoint asset of the identified one or more endpoint assets; for each load meter that corresponds to an endpoint asset of the identified one or more endpoint assets, use the corresponding champion model of power consumption with the retrieved portion of the corresponding time series of power consumption values to generate a corresponding base prediction of power consumption; and analyze the specified prediction time period to determine whether the requested prediction includes a short range prediction, a mid range prediction or a long range prediction. In response to a determination that the requested prediction includes a short range prediction, the processor may be further caused to: for each supply meter that corresponds to a supply asset of the identified one or more supply assets, use the corresponding second-stage short range model of power provision with the retrieved portion of the corresponding time series of power provision values to generate a corresponding short range refinement of the corresponding base prediction of power provision, apply the corresponding short range refinement to the corresponding base prediction of power provision, and provide the corresponding base prediction of power provision, after refinement, in response to the request; and for each load meter that corresponds to an endpoint asset of the identified one or more load assets, use the corresponding second-stage short range model of power consumption with the retrieved portion of the corresponding time series of power consumption values to generate a corresponding short range refinement of the corresponding base prediction of power consumption, apply the corresponding short range refinement to the corresponding base prediction of power consumption, and provide the corresponding base prediction of power consumption, after refinement, in response to the request. In response to a determination that the requested prediction includes a long range prediction, the processor may be further caused to: for each supply meter that corresponds to a supply asset of the identified one or more supply assets, use the corresponding second-stage long range model of power provision with the retrieved portion of the corresponding time series of power provision values to generate a corresponding long range refinement of the corresponding base prediction of power provision, apply the corresponding long range refinement to the corresponding base prediction of power provision; and provide the corresponding base prediction of power provision, after refinement, in response to the request; and for each load meter that corresponds to an endpoint asset of the identified one or more load assets, use the corresponding second-stage long range model of power consumption with the retrieved portion of the corresponding time series of power consumption values to generate a corresponding long range refinement of the corresponding base prediction of power consumption, apply the corresponding long range refinement to the corresponding base prediction of power consumption, and provide the corresponding base prediction of power consumption, after refinement, in response to the request. Or, in response to a determination that the requested prediction includes a mid range prediction, the processor may be further caused to: for each supply meter that corresponds to a supply asset of the identified one or more supply assets, provide the corresponding base prediction of power provision in response to the request; and for each load meter that corresponds to an endpoint asset of the identified one or more load assets:

provide the corresponding base prediction of power consumption in response to the request.

A computer-implemented method includes: retrieving, by a processor, and from a storage, initial supply meter data, wherein the initial supply meter data includes, for each supply meter of multiple supply meters of a power grid, a set of power provision values for a corresponding supply asset at a corresponding supply location, and each power supply value is representative of a measure of power provision taken at a time and date by a supply meter during a predetermined historical time period; and retrieving, by the processor, and from the storage, initial load meter data, wherein the initial load meter data includes, for each load meter of multiple load meters of the power grid, a set of power consumption values for a corresponding endpoint asset at a corresponding endpoint location, and each power consumption value is representative of a measure of power consumption taken at a time and date by a load meter during the predetermined historical time period. The method further includes: assigning each power provision value of the initial supply meter data to one of multiple buckets based on at least a weather condition at the corresponding supply location at the corresponding time and date; assigning each power consumption value of the initial load meter data to one of the multiple buckets based on at least a weather condition at the corresponding endpoint location at the corresponding time and date; and performing, for each bucket, further operations including: deriving, by the processor, upper and lower bounds of power provision from the power provision values assigned to the bucket; using the upper and lower bounds of power provision to identify outlier power provision values among the power provision values assigned to the bucket; generating, by the processor, a naive power provision model from the power provision values assigned to the bucket that are not identified as outliers; deriving, by the processor, upper and lower bounds of power consumption from the power consumption values assigned to the bucket; use the upper and lower bounds of power consumption to identify outlier power consumption values among the power consumption values assigned to the bucket; and generating, by the processor, a naive power consumption model from the power consumption values assigned to the bucket that are not identified as outliers. The method further includes performing, for each set of power provision values within the initial supply meter data, further operations to generate cleansed supply meter data from the initial supply meter data in which each set of power provision values defines a complete time series, the further operations including: identifying missing power provision values, wherein each power provision value identified as missing or an outlier in the set of power provision values defines at least part of a gap that prevents the set of power provision values from defining a complete time series; and employing, by the processor, and for each missing or outlier power provision value in each gap that exceeds a predetermined threshold quantity of power provision values, a naive power provision model of the corresponding bucket to generate a power provision value to fill the gap. The method further includes performing, for each set of power consumption values within the initial load meter data, further operations to generate cleansed load meter data from the initial load meter data in which each set of power consumption values defines a complete time series, the further operations including: identifying missing power consumption values, wherein each power consumption value identified as missing or an outlier in the set of power consumption values defines at least part of a gap that prevents the set of power consumption values from defining a complete time series; and employing, by the processor, and for each missing or outlier power consumption value in each gap that exceeds a predetermined threshold quantity of power consumption values, a naive power consumption model of one of the corresponding bucket to generate a power consumption value to fill the gap. The method further includes: merging the cleansed load meter data and the cleansed supply meter data into merged meter data; and storing, by the processor, the merged meter data within the storage to enable generation of power provision models and power consumption models of the power grid.

The method may include: performing, for each set of power provision values within the initial supply meter data, further operations to generate the cleansed supply meter data from the initial supply meter data, the further operations including employing, by the processor, and for each missing or outlier power provision value in each gap that does not exceed the predetermined threshold quantity of power provision values, interpolation of power provision values adjacent to the gap to generate a power provision value to fill the gap; and performing, for each set of power consumption values within the initial load meter data, further operations to generate the cleansed load meter data from the initial load meter data, the further operations including employing, by the processor, and for each missing or outlier power consumption value in each gap that does not exceed the predetermined threshold quantity of power consumption values, interpolation of power consumption values adjacent to the gap to generate a power consumption value to fill the gap.

The method may include: receiving, by the processor, raw supply meter readings from the multiple supply meters via a communications network of the power grid, wherein each raw supply meter reading includes a measure, taken by a supply meter, of electric power supplied on at least one phase of electric power by the corresponding supply asset, and each raw supply meter reading includes an indication of when the measure of electric power provided was taken by the supply meter; receiving, by the processor, raw load meter readings from the multiple load meters via a communications network of the power grid, wherein each raw load meter reading includes a measure, taken by a load meter, of electric power consumed on at least one phase of electric power by an endpoint asset, and each raw load meter reading includes an indication of when the measure of electric power consumed was taken by the load meter; converting, by the processor, and for each supply meter of the multiple supply meters, a set of corresponding raw supply meter readings into a corresponding set of power provision values of the initial supply meter data; and converting, by the processor, and for each load meter of the multiple load meters, a set of corresponding raw load meter readings into a corresponding set of power consumption values of the initial load meter data.

The method may include: retrieving, by the processor, proxy load meter readings, wherein the proxy load meter readings include indications of electrical characteristics of at least one endpoint asset at an endpoint location that was not connected to the power grid for a portion of the predetermined historical time period; and performing, for each endpoint asset that was not connected to the power grid for a portion of the predetermined historical time period, further operations including: using, by the processor, corresponding electrical characteristics indicated in the proxy load meter readings to generate simulated load meter readings for the endpoint asset for the portion of the predetermined historical time period; and augmenting, by the processor, the raw load meter readings with the simulated load meter readings prior to conversion to power consumption values.

The method may include: retrieving, by the processor, initial weather data including weather data values indicative of weather conditions at multiple weather station locations within a geographic area covered by the power grid; performing, by the processor, cleansing of the weather data values to fill gaps in the weather data values to cause the weather data values associated with each of the weather station location to define a complete time series of weather data values to generate cleansed weather data from the initial weather data; correlating, by the processor, each power consumption value of the initial load meter data to a weather data value in a time series of weather data values of the cleansed weather data; assigning each power consumption value of the initial load meter data to one of the multiple buckets based at least on the correlated weather data value; correlating, by the processor, each power provision value of the initial supply meter data to a weather data value in a time series of weather data values of the cleansed weather data; and assigning each power provision value of the initial supply meter data to one of the multiple buckets based at least on the correlated weather data value.

The method may include: retrieving, by the processor, calendar data including at least one of indications of correlations between dates within the historical time period to days of a week or months of a year, or indications of holidays within the historical time period that are applicable to at least a portion of the geographic area covered by the grid; defining each bucket of the multiple buckets to correspond to a different combination of a range of values of a weather condition and a range of dates; assigning each power consumption value of the initial load meter data to one of the multiple buckets based at least on the date of the corresponding measure of power consumption and the correlated weather data value; and assigning each power provision value of the initial supply meter data to one of the multiple buckets based at least on the date of the corresponding measure of power provision and the correlated weather data value.

The method may include retrieving, by the processor, asset data including at least one of: identifiers of supply assets and endpoint assets of the power grid; indications of locations of supply assets and endpoint assets within a hierarchy of electrical pathways of the power grid; indications of geographic locations of supply locations of supply assets within a geographic area covered by the power grid; and indications of geographic locations of endpoint locations of endpoint assets within the geographic area covered by the power grid. The method may further include performing, for each set of power provision values within the cleansed supply meter data, further operations including: using, by the processor, the asset data to correlate the supply asset corresponding to the set of power provision values to one or more endpoint assets that are provided with electric power by the supply asset in the power grid; retrieving, by the processor, the one or more sets of power consumption values within the cleansed load meter data that correspond to the one or more endpoint assets; aggregating, by the processor, the one or more sets of power consumption values to generate a set of aggregated power consumption values to correspond to the set of power provision values; and including, by the processor, the set of aggregated power consumption values in the merged meter data.

The method may include: retrieving, by the processor, and from the merged meter data, a first portion of each time series of power provision values and of each time series of power consumption values from for a predetermined training time period within the historical time period for use as training data; retrieving, by the processor, and from the merged meter data, a second portion of each time series of power provision values and of each time series of power consumption values from for a predetermined testing time period within the historical time period for use as testing data; and retrieving, by the processor, and from at least one of cleansed weather data, calendar data or economic data, a first subset of data values for the training time period for use as further training data and a second subset of data values for the testing time period for use as further testing data, wherein: the cleansed weather data includes data values indicative of weather conditions at multiple weather station locations within a geographic area covered by the power grid throughout the historical time period; the calendar data includes at least one of indications of correlations between dates within the historical time period to days of a week or months of a year, or indications of holidays within the historical time period that are applicable to at least a portion of the geographic area covered by the grid; and the economic data includes data values indicative of economic conditions within the geographic area covered by the power grid throughout the historical time period. The method may further include performing, by the processor, and for each supply meter of the multiple supply meters, further operations including: using the first portion of the corresponding time series within the training data, along with the further training data, in multiple performances of linear regression to generate a corresponding set of candidate models of power provision by the corresponding supply asset, wherein the corresponding set of candidate models of power provision are of a preselected set of model types; using the second portion of the corresponding time series within the testing data, along with the further testing data, to derive a degree of error for each candidate model of the corresponding set of candidate models of power provision; analyzing the degree of error of each candidate model of the corresponding set of candidate models of power provision to identify a corresponding champion model of power provision; and storing an indication of the corresponding champion model of power provision and an indication of variables to be used as inputs thereto within the storage to enable use of the corresponding champion model of power provision in a prediction of power provision by the corresponding supply asset. The method may further include performing, by the processor, and for each load meter of the multiple load meters, further operations including: using the first portion of the corresponding time series within the training data, along with the further training data, in multiple performances of linear regression to generate a corresponding set of candidate models of power consumption by the corresponding endpoint asset, wherein the corresponding set of candidate models of power consumption are of the preselected set of model types; using the second portion of the corresponding time series within the testing data, along with the further testing data, to derive a degree of error for each candidate model of the corresponding set of candidate models of power consumption; analyzing the degree of error of each candidate model of the corresponding set of candidate models of power consumption to identify a corresponding champion model of power consumption; and storing an indication of the corresponding champion model of power consumption and an indication of variables to be used as inputs thereto within the storage to enable use of the corresponding champion model of power consumption in a prediction of power consumption by the corresponding endpoint asset.

The method may include: retrieving, by the processor, and from the merged meter data, a third portion of each time series of power provision values and of each time series of power consumption values from for a predetermined short range training time period within the historical time period for use as short range training data; retrieving, by the processor, and from the merged meter data, a fourth portion of each time series of power provision values and of each time series of power consumption values from for a predetermined long range training time period within the historical time period for use as long range training data; retrieving, by the processor, and from at least the cleansed weather data, a third subset of data values for the short range training time period for use as further short range training data; and retrieving, by the processor, and, from at least the economic data, a fourth subset of data values for the long range training time period for use as further long range training data. The method may further include performing, by the processor, and for each supply meter of the multiple supply meters, further operations including: using the third portion of the corresponding time series within the short range training data, along with the further short range training data to generate a corresponding second-stage short range model of power provision by the corresponding supply asset to address overfitting of the corresponding champion model of power provision for a short range period of time; using the fourth portion of the corresponding time series within the long range training data, along with the further long range training data to generate a corresponding second-stage long range model of power provision by the corresponding supply asset to address overfitting of the corresponding champion model of power provision for a long range period of time; and storing indications of the corresponding second-stage short range model of power provision and corresponding second-stage long range model of power provision to enable use of the corresponding champion model of power provision in a short range or long range prediction of power provision by the corresponding supply asset. The method may further include performing, by the processor, and for each load meter of the multiple load meters, further operations including: using the third portion of the corresponding time series within the short range training data, along with the further short range training data to generate a corresponding second-stage short range model of power consumption by the corresponding endpoint asset to address overfitting of the corresponding champion model of power consumption for a short range period of time; using the fourth portion of the corresponding time series within the long range training data, along with the further long range training data to generate a corresponding second-stage long range model of power consumption by the corresponding endpoint asset to address overfitting of the corresponding champion model of power consumption for a long range period of time; and storing indications of the corresponding second-stage short range model of power consumption and corresponding second-stage long range model of power consumption to enable use of the corresponding champion model of power consumption in a short range or long range prediction of power consumption by the corresponding endpoint asset.

The method may include: receiving, by the processor, a request from a requesting device for a prediction that covers a specified portion of the power grid for a specified prediction time period; and retrieving, by the processor, asset data including at least one of: identifiers of supply assets and endpoint assets of the power grid; indications of locations of supply assets and endpoint assets within a hierarchy of electrical pathways of the power grid; indications of geographic locations of supply locations of supply assets within a geographic area covered by the power grid; and indications of geographic locations of endpoint locations of endpoint assets within the geographic area covered by the power grid. The method may further include: using, by the processor, the asset data to identify one or more supply assets and one or more endpoint assets within the specified portion of the power grid; retrieving, by the processor, and from the merged meter data, a portion of the time series of power provision values for each supply meter that corresponds to an asset of the identified one or more supply assets; for each supply meter that corresponds to a supply asset of the identified one or more supply assets, using, by the processor, the corresponding champion model of power provision with the retrieved portion of the corresponding time series of power provision values to generate a corresponding base prediction of power provision; retrieving, by the processor, and from the merged meter data, a portion of the time series of power consumption values for each load meter that corresponds to an endpoint asset of the identified one or more endpoint assets; for each load meter that corresponds to an endpoint asset of the identified one or more endpoint assets, using, by the processor, the corresponding champion model of power consumption with the retrieved portion of the corresponding time series of power consumption values to generate a corresponding base prediction of power consumption; and analyzing, by the processor, the specified prediction time period to determine whether the requested prediction includes a short range prediction, a mid range prediction or a long range prediction. The method may further include, in response to a determination that the requested prediction includes a short range prediction, performing, by the processor, operations including: for each supply meter that corresponds to a supply asset of the identified one or more supply assets, using the corresponding second-stage short range model of power provision with the retrieved portion of the corresponding time series of power provision values to generate a corresponding short range refinement of the corresponding base prediction of power provision, applying the corresponding short range refinement to the corresponding base prediction of power provision, and providing the corresponding base prediction of power provision, after refinement, in response to the request; and for each load meter that corresponds to an endpoint asset of the identified one or more load assets, using the corresponding second-stage short range model of power consumption with the retrieved portion of the corresponding time series of power consumption values to generate a corresponding short range refinement of the corresponding base prediction of power consumption, applying the corresponding short range refinement to the corresponding base prediction of power consumption, and providing the corresponding base prediction of power consumption, after refinement, in response to the request. The method may further include, in response to a determination that the requested prediction includes a long range prediction, performing, by the processor, operations including: for each supply meter that corresponds to a supply asset of the identified one or more supply assets, using the corresponding second-stage long range model of power provision with the retrieved portion of the corresponding time series of power provision values to generate a corresponding long range refinement of the corresponding base prediction of power provision, applying the corresponding long range refinement to the corresponding base prediction of power provision, and providing the corresponding base prediction of power provision, after refinement, in response to the request; and for each load meter that corresponds to an endpoint asset of the identified one or more load assets, using the corresponding second-stage long range model of power consumption with the retrieved portion of the corresponding time series of power consumption values to generate a corresponding long range refinement of the corresponding base prediction of power consumption, applying the corresponding long range refinement to the corresponding base prediction of power consumption, and providing the corresponding base prediction of power consumption, after refinement, in response to the request. Or, the method may further include, in response to a determination that the requested prediction includes a mid range prediction, performing, by the processor, operations including: for each supply meter that corresponds to a supply asset of the identified one or more supply assets, providing the corresponding base prediction of power provision in response to the request; and for each load meter that corresponds to an endpoint asset of the identified one or more load assets: providing the corresponding base prediction of power consumption in response to the request.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures:

FIGS. 15A, 15B, 15C and 15D, together, illustrate an example of integration of portions of raw meter data from meters of a power grid to generate merged meter data.

FIGS. 17A, 17B, 17C and 17D, together, illustrate an example of derivation of models of power provision or power consumption using the merged meter data of FIGS. 15A-D.

FIGS. 20A, 20B and 20C, together, illustrate an example embodiment of a logic flow of cleansing initial meter data to generate cleansed meter data as part of the integration of FIGS. 19A-B.

FIGS. 22A, 22B, 22C and 22D, together, illustrate an example embodiment of using the models of FIGS. 21A-B to make a prediction.

DETAILED DESCRIPTION

Figure 1:
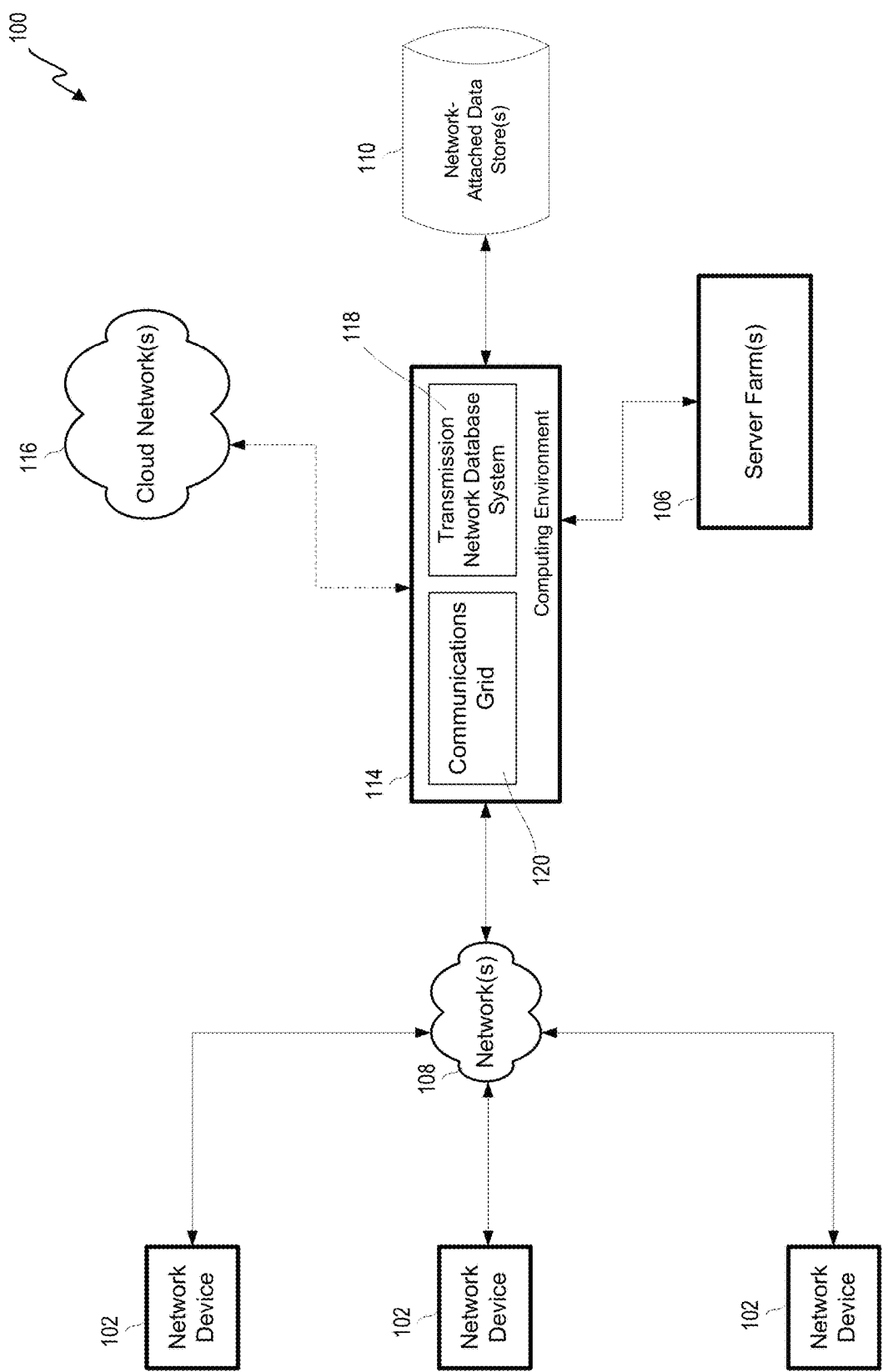
FIG. 1 illustrates a block diagram that provides an illustration of the hardware components of a computing system, according to some embodiments of the present technology.

Various embodiments described herein are generally directed to preparing and using raw meter data from supply and load meters of an electric power grid to derive per meter sets of models that may be employed in providing short, mid and long range predictions of electric power provision or consumption. Various embodiments described herein are also generally directed to selectively using selected one(s) of such per meter models to make such predictions. More precisely, raw supply meter data from supply meters of and/or raw load meter data from load meters of a power grid are each integrated with asset data describing supply and/or endpoint assets of the power gird and/or proxy load meter data descriptive of characteristics of endpoint assets to generate merged meter data. During such integration, cleansed weather data and/or calendar data correlating dates to days of a week and/or months of a year are used to perform cleansing of meter data to fill in gaps and/or to replace outlier values in what becomes the merged meter data. Subsequently, the merged meter data is used, along with the cleansed weather data, the calendar data and/or economic data descriptive of economic conditions at locations throughout the area covered by the power grid, to generate a champion model, along with second-stage short and long range models, of power provision for each supply meter and of power consumption for each load meter. With such per meter models generated, the champion model and/or the second-stage short or long range models for one or more supply meters and/or load meters may be selectively used to generate a prediction of power provision and/or consumption in response to a request for a prediction for a specified range of dates.

As will be familiar to those skilled in the art, the raw meter data received from the supply and load meters of a power grid may be associated with different industry standards for data communication that may include differences in units of measure, intervals of time between measurements, and/or other parameters affecting its content. More specifically, as a result of the integration of at least some of the supply meters into larger control systems used to control the operation of generation facilities and/or other supply assets within a power grid, the supply meters may be designed or otherwise configured to adhere to various aspects of the Supervisory Control and Data Acquisition (SCADA) process control architecture that has gained wide acceptance in many different industries for controlling a wide variety of industrial processes. In contrast, as a result of numerous governmental and industry efforts around the world and over multiple decades to develop "smart grids" of differing types and ranges of capability, various forms of Advanced Metering Infrastructure (AMI) have been developed. Unfortunately, due, at least in part, to the differing development histories of SCADA and AMI, it is not uncommon for the supply and load meters to measure differing aspects of electric power, at different intervals of time and/or while using differing techniques to do so, thereby, resulting in raw supply meter data and raw load meter data that are not able to be used directly together in performing analyses of the operation of a power grid.

In addition to such differences from raw supply meter data, raw load meter data typically includes gaps arising from instances of load meter malfunction and/or changes made in endpoint assets and/or at endpoint locations, which tend to occur with greater frequency than with supply meters and supply assets at supply locations. As will be familiar to those skilled in the art, changes made to supply assets at any one supply location tend to be made in as part of and/or in coordination with changes to other supply assets across multiple supply locations. As a result, changes made to supply assets that may affect raw supply meter data tend to be sufficiently conservative in nature and occur relatively infrequently. In contrast, changes made to endpoint assets at any one endpoint location tend to be made solely under the control of a home owner or business owner of that endpoint location, and without any coordination with any similar activity by any other home owner or business owner of any other endpoint location. Such changes at endpoint locations often arise from the building, expansion and/or replacement of homes and/or business structures, thereby resulting in instances in which power consumption demands are changed by the addition of new endpoint locations and/or the addition of more endpoint assets at existing endpoint locations. As a result of such uncoordinated activities at endpoint locations, and since a typical power grid has vastly more endpoint locations than supply locations, the raw load meter data tends to include greater and more frequently occurring fluctuations in its measurements than the raw supply meter data.

Such differences in the content of the raw supply meter data versus the raw load meter data, along with such greater and more frequently occurring fluctuations in the raw load meter data, have long thwarted efforts to employ these two forms of raw meter data together in analyses of power grids. As a result, raw supply meter data is often maintained and processed entirely separately from raw load meter data. Indeed, it is not uncommon for the raw supply meter data to be employed in analyses of the operation of a power grid, entirely without reference to the raw load meter data, while the raw load meter data is relegated to use in generating invoices that are sent to users of electric power provided by the power grid.

As part of overcoming these and other difficulties associated in using both forms of raw meter data in analyses of a power grid, various integration and cleansing operations may be separately performed with both raw supply meter data and raw load meter data prior to generating merged meter data that includes derivative forms of both. More specifically, portions of the raw supply meter data from each supply meter of a power grid that cover a preselected historical time period may be augmented with asset data specifying various aspects of each supply meter and/or supply asset(s) associated with each supply meter. Among the aspects of each supply meter and/or associated supply asset(s) with which the raw supply meter data may be so augmented may be supply meter and/or supply asset identifiers, and/or indications of geographic locations of the supply locations of the supply meters and/or associated supply assets. Correspondingly, portions of the raw load meter data from each load meter of the power grid that cover the same preselected historical time period may be augmented with similar asset data specifying various aspects of each load meter and/or endpoint asset(s) associated with each load meter. Among the aspects of each load meter and/or associated endpoint asset(s) with which the raw load meter data may be so augmented may be load meter and/or endpoint asset identifiers, and/or indications of geographic locations of the endpoint locations of the load meters and/or associated endpoint assets.

However, in addition to such augmentation of the raw load meter data with such asset data information, the raw load meter data may also be augmented with simulated raw load meter data generated for load meters that have not been connected to the power grid throughout a portion of the historical time period. It may be that a particular load meter was temporarily disconnected from the power grid as a result of extensive remodeling or replacement of a house or place of business at the endpoint location of that load meter. Alternatively, it may be that a new load meter for a new endpoint location was added at a time between the start and end of the historical time period. As a result the raw load meter data values associated with each of such load meters may include a gap in its raw load meter data values that spans a relatively large portion of the historical time period, thereby complicating the use of the raw load meter data for those load meters. To address this, for each load meter for which there is such a gap, simulated raw load meter data values may be generated to fill that gap. Such simulated raw load meter data values may be generated based on proxy load meter data that describes electrical characteristics of the endpoint asset(s) associated with each such load meter. In some embodiments, such endpoint asset electrical characteristics may be based on electrical characteristics of endpoint assets known through records to actually be present at the endpoint site of each such load meter. Alternatively, in other embodiments, such endpoint asset electrical characteristics may be derived based on characteristics of the structure and/or structure owner at the endpoint site of each such load meter (e.g., whether the structure is a residence or a place of business).

Following such augmentation of the raw supply meter data with supply asset data information, the raw supply meter data values present within the raw supply meter data for each supply meter may be converted from measures of characteristics of electric power provided at intervals to corresponding power provision values that directly indicate amounts of electric power provided at those same intervals in a corresponding initial supply meter data. Correspondingly, following such augmentation of the raw load meter data with endpoint asset data information, as well as with simulated raw load meter data values, the raw load meter data values present within the raw load meter data for each load meter may be converted from measures of characteristics of electric power consumed at intervals to corresponding power consumption values that directly indicate amounts of electric power consumed at those same intervals in a corresponding initial load meter data. In some embodiments, the power provision values of the initial supply meter data and the power consumption values of the initial load meter data may be given the same preselected unit of measure (or relatively similar preselected units of measure) to enable the power provision values and power consumption values to be used together in performing analyses of the power grid.

Following the generation of the initial supply meter data from the raw supply meter data, the initial supply meter data may be cleansed to generate cleansed supply meter data in which there is a complete time series of power provision values covering the historical time period at a recurring interval for each supply meter. Correspondingly, following the generation of the initial load meter data from the raw load meter data, the initial load meter data may be cleansed to generate cleansed load meter data in which there is a complete time series of power consumption values covering the historical time period at a recurring interval for each load meter.

As will be familiar to those skilled in the art, even if a supply meter or load meter has been installed and connected to the power grid for the entirety of the historical time period such that no relatively large gaps in power provision values or power consumption values exist as a result of a lengthy period of lack of connection to the power grid, any of a variety of other circumstances, including and not limited to, meter malfunctions, power outages, communications network malfunctions, etc. may also cause relatively small gaps. As part of cleansing the initial supply meter data, the power provision values therein for each supply meter may be analyzed to identify gaps in which one or more power provision values that should be present at a recurring interval are missing. Correspondingly, the power consumption values within the initial load meter data for each load meter may be analyzed to identify gaps in which one or more power consumption values that should be present at a recurring interval are missing The cleansing of the initial supply meter data and the initial load meter data may continue with a set of meter data value buckets being defined in which each bucket is associated with a different range of weather conditions (e.g., a different range of temperatures), or in which each bucket is associated with a different combination of range of weather conditions and range of dates. Within the initial supply meter data and for supply meter, each power provision value may be assigned to one of the buckets based on the particular weather conditions associated with that data value, or the particular combination of weather conditions and date associated with that data value. Correspondingly, within the initial load meter data and for each load meter, each power consumption value may be assigned to one of the buckets based on the particular weather conditions associated with that data value, or the particular combination of weather conditions and date associated with that data value.

With all of such assignments to buckets having been made, separate descriptive statistics may be derived for the power provision values assigned to each bucket, including and not limited to, a mean, a median, a minimum, a maximum, a standard deviation, a variance and/or percentiles. Correspondingly, separate descriptive statistics may be derived for the power consumption values assigned to each bucket, also including and not limited to, a mean, a median, a minimum, a maximum, a standard deviation, a variance and/or percentiles. From such descriptive statistics, separate upper and lower bounds for power provision values and for power consumption values may be derived for each bucket. The upper and lower bounds for power provision values for each bucket may then be used to identify outlier power provision values among those that are assigned to that bucket, which will be treated in the same manner as missing power provision values for purposes of cleansing. Correspondingly, the upper and lower bounds for power consumption values for each bucket may then be used to identify outlier power consumption values among those that are assigned to that bucket, which will similarly be treated in the same manner as missing power consumption values for purposes of cleansing.

With both missing and outlier power provision values identified within the initial supply meter data for each supply meter, the remaining power provision values within the initial supply meter data for each supply meter (i.e., those that are not missing and that are not identified as outliers for that supply meter) are used through linear regression to derive a separate naive power provision model for each supply meter. Correspondingly, with both missing and outlier power consumption values identified within the initial supply meter data for each load meter, the remaining power consumption values within the initial load meter data for each load meter (i.e., those that are not missing and that are not identified as outliers for that load meter) are used through linear regression to derive a separate naive power consumption model for each load meter.

With a separate naive power provision model generated for each supply meter, the power provision values for each supply meter are analyzed to determine the width of each gap of one or more missing and/or outlier power provision values. In other words, for each supply meter, the quantity of power provision values that are needed to replace each missing and/or outlier power provision value within each gap as part of creating a fully complete time series of power provision values is determined. In some embodiments, for each gap having a quantity of consecutive missing and/or outlier power provision values that exceeds a predetermined threshold quantity power provision values, the corresponding naive power provision model may be used to derive each of the power provision values needed to fill that gap. For each gap having a quantity of consecutive missing or outlier power provision values that does not exceed the predetermined threshold quantity of power provision values, interpolation based on the power provision values adjacent to each end of the gap may be used to derive each of the power provision values needed to fill that gap. In so filling such gaps, the cleansed supply meter data corresponding to the initial supply meter data is generated.

Correspondingly, with a separate naive power consumption model generated for each load meter, the power consumption values for each load meter are analyzed to determine the width of each gap of one or more missing and/or outlier power consumption values. In other words, for each load meter, the quantity of power consumption values that are needed to replace each missing and/or outlier power consumption value within each gap as part of creating a fully complete time series of power consumption values is determined. In some embodiments, for each gap having a quantity of consecutive missing and/or outlier power consumption values that exceeds a predetermined threshold quantity power consumption values, the corresponding naive power consumption model may be used to derive each of the power consumption values needed to fill that gap. For each gap having a quantity of consecutive missing or outlier power consumption values that does not exceed the predetermined threshold quantity of power consumption values, interpolation based on the power consumption values adjacent to each end of the gap may be used to derive each of the power consumption values needed to fill that gap. In so filling such gaps, the cleansed load meter data corresponding to the initial load meter data is generated.

It should be noted that, prior to its use in assigning power provision values and power consumption values to meter value buckets, the weather data so used may be also be cleansed. As will be familiar to those skilled in the art, each of the weather stations that covers a portion of the geographic area covered by a power grid may be subject to incidents of equipment malfunction, communications access malfunctions and/or other circumstances that may result in gaps in various weather measurements within the weather data. As part of cleansing the weather data, various techniques (e.g., interpolation and/or the use of naive models, as previously described in reference to power provision values and power consumption values) may be used to fill in such gaps in the weather data. As will also be familiar to those skilled in the art, there may also be differences in the measuring techniques used among those weather stations such a particular measure of a weather parameter may not have quite the same meaning from one weather station to another. By way of example, there are different approaches that may be used among different weather stations to measuring temperature, such as the difference between the "dry bulb" and "wet bulb" methods in which humidity is accounted for in different ways. As part of cleansing the weather data, various conversion operations may be performed to normalize such weather values as temperature, humidity, precipitation levels, etc. to eliminate such differences in meaning, thereby enabling the weather data values from all of the weather stations included in the weather data to be used in a single consistent manner.

Following such generation of the cleansed supply meter data and cleansed load meter data, both forms of cleansed meter data may be merged to generate a merged meter data that includes both the completed time series of power provision values associated with each supply meter and the completed time series of power consumption values associated with each load meter within a single data structure. In some embodiments, asset data that correlates the supply asset(s) at each supply location with the particular multitude of endpoint assets at the endpoint locations that are provided with electric power by those supply asset(s) at that supply location to correlate each time series of power provision values with a different multitude of time series of power consumption values. With such correlations having been made, each such multitude of time series of power consumption values may be aggregated to generate a time series of aggregate power consumption values that is then stored within the merged meter data in a manner that is correlated to the corresponding time series of power provision values.

With the merged meter data having been generated, as described above, the merged meter data, along with the cleansed weather data, the calendar data and/or economic data, may be used to derive separate sets of power provision models for each supply meter and separate sets of power consumption models for each load meter that may be used in making short range, mid range and/or long range predictions concerning the power grid. More specifically, portions of the time series of power provision values within the merged meter data for each supply meter and portions of the time series of power consumption values within the merged data for each load meter that cover a preselected training time period may be retrieved for use as part of a training data. Also, portions of the cleansed weather data, the calendar data and/or the economic data that also cover the preselected training time period may be retrieved for use as the remainder of the training data. The economic data may include various measures of economic conditions for each of various portions of the geographic area covered by the power grid. It should be noted that the training time period is limited to extending within the historical time period covered by the merged meter data. For each supply meter, the training data is used in multiple linear regressions to generate a set of candidate power provision models of a preselected set of power provision model types. Correspondingly, for each load meter, the training data is used in multiple linear regressions to generate a set of candidate power consumption models of a preselected set of power consumption model types.

With such a set of candidate power provision models generated for each supply meter and such a set of candidate power consumption models generated for each load meter, testing is performed to identify the champion model within each set. More specifically, portions of the time series of power provision values within the merged meter data for each supply meter and portions of the time series of power consumption values within the merged meter data for each load meter that cover a preselected testing time period may be retrieved for use as part of a testing data. Also, portions of the cleansed weather data, the calendar data and/or the economic data that also cover the preselected testing time period may be retrieved for use as the remainder of the training data. As with training time period, the testing time period is limited to extending within the historical time period covered by the merged meter data. For each set of candidate power provision models corresponding to one of the supply meters, the testing data is used to test each of the candidate power provision models to identify a champion power provision model based on a measure of accuracy (e.g., based on minimizing a measure of error). For each set of candidate power consumption models corresponding to one of the load meters, the testing data is used to test each of the candidate power consumption models to identify a champion power consumption model, also based on a measure of accuracy. Following such derivation and identification of champion models, in some embodiments, the merged meter data may be augmented with indications of the model type and input parameters of the champion power provision model for each supply meter and of the model type and input parameters of the champion power consumption model for each load meter.

In some embodiments, the training time period and/or the testing time period used in the derivation and identification of a champion model for each supply and load meter may be selected to cover a length of time that at least roughly corresponds to mid range time periods that are expected to be specified in requests to use the champion models to make predictions. However, as will be familiar to those skilled in the art, this may result in one or more of the champion models being overfitted when used to make predictions for short range time periods that may be a fraction of the length of training and testing time periods, or for long range time periods that may be multiple times the length of the training and testing time periods. To address such potential shortcomings of the champion models, separate second-stage short range and long range models may be derived to augment the champion models, thereby completing the separate sets of models for each supply meter and each load meter.

More specifically, portions of the time series of power provision values within the merged meter data for each supply meter and portions of the time series of power consumption values within the merged data for each load meter that cover a preselected short range training time period may be retrieved for use as part of a short range training data, where the length of the short range training time period is shorter than the training period used in generating the champion models. Research work performed by the inventors in this present application has revealed that, for power provision and consumption within a power grid over a relatively short range time period, weather conditions tend to exert considerably more influence than economic conditions. In contrast, the same research work reveals that the reverse is tends to apply over a relatively long range time period. Therefore, portions of the cleansed weather data and/or the calendar data that also cover the preselected short range training time period may be retrieved for use as the remainder of the short range training data, but not portions of the economic data. For each supply meter, the short range training data is used to generate a second-stage short range power provision model of a preselected short range power provision model type. Correspondingly, for each load meter, the short range training data is used to generate a second-stage short range power consumption model of preselected short range power consumption model type.

Correspondingly, portions of the time series of power provision values within the merged meter data for each supply meter and portions of the time series of power consumption values within the merged data for each load meter that cover a preselected long range training time period may be retrieved for use as part of a long range training data, where the length of the long range training time period is longer than the training period used in generating the champion models. Portions of the economic data and/or the calendar data that also cover the preselected long range training time period may be retrieved for use as the remainder of the long range training data, but not portions of the cleansed weather data. For each supply meter, the long range training data is used to generate a second-stage long range power provision model of a preselected long range power provision model type. Correspondingly, for each load meter, the long range training data is used to generate a second-stage long range power consumption model of preselected long range power consumption model type. Following such derivation second-stage short range and long range models, in some embodiments, the merged meter data may be augmented with indications of the model type and/or input parameters of the second-stage short range and long range models for each supply meter and for each load meter.

Regardless of the exact manner in which indications of the model types and/or input parameters of each set of models for each supply meter and each load meter may be stored, differing combinations of the models within one or more of those sets may be selectively used in response to a request for a prediction concerning the power grid. More specifically, in response to the receipt of a request for a prediction of power provision and/or consumption within a specified portion of the power grid and across a specified prediction time period, supply and/or endpoint asset data integrated into the merged meter data may be used to first identify which supply and/or load meters are included within the specified portion of the power grid. Then, a determination may be made as to whether the length of the specified prediction time period is a short range time period, a mid range time period or a long range time period. Such a determination may take into account the lengths of the training time period used in generating the champion models, as well as the lengths of the short range time period and the long range time period used in generating the second-stage short range and long range models, respectively. If the prediction time period is determined to be a mid range time period, then the champion models of the one or more identified supply and/or load meters are used to generate the requested prediction without augmentation by second-stage models. However, if the prediction time period is determined to be a short range time period, then the champion models of the one or more identified supply and/or load meters are used together with corresponding second-stage short range meters to generate the requested prediction. Alternatively, if the prediction time period is determined to be a long range time period, then the champion models of the one or more identified supply and/or load meters are used together with corresponding second-stage long range meters to generate the requested prediction.

In a distributed processing system that may be employed to prepare and use raw meter data to derive models of power provision and consumption, one or more node devices may store raw meter data, in addition to generating models therefrom. In such embodiments, the node devices may receive and store the raw meter data, as it is generated, from the supply and load meters of a power grid. Alternatively, the supply and load meters may provide raw meter data to data storage devices, as it is generated, in preparation for subsequent retrieval of the raw meter data therefrom by the node devices. Regardless of the exact manner in which the node devices of a distributed processing system may be provided with the raw meter data, each of the node devices may be provided with a subset of the raw meter data generated by a particular subset of supply and/or load meters of the power grid. Each node device may then locally generate and store a corresponding subset of the various derivative forms of meter data from its corresponding subset of raw meter data, at least partially in parallel with the other node devices, but without sharing or otherwise exchanging meter data with the other node devices as an approach to increasing processing efficiency and minimizing bandwidth use across the network by which the node devices may be interconnected. Additionally, each node device may similarly locally generate and store the power provision and/or consumption from its corresponding derivative forms of meter data, at least partially in parallel with the other node devices, but again, without sharing or otherwise exchanging models with the other node devices.

A control device of such a distributed processing system may coordinate such parallel performances of operations by the node devices. More specifically, a control may distribute indications of various rules among the node devices that control the at least partially parallel performances of the integration and cleansing of meter data to generate merged meter data, and/or of the generation of per-meter models of power provision and/or consumption. Such rules may include a specification of the historical time period of the raw meter data to be collected and used, the models types of models to be generated, the short range and long range time periods used in generating models, and/or the bases for the selection of champion models. Alternatively or additionally, the control device may coordinate the sharing of statistical information among the node devices needed to develop naive models to be employed in cleansing outlier meter values as a further approach to increasing processing efficiency and/or minimizing network bandwidth use in communications among the node devices. Also alternatively or additionally, the control device may coordinate the selection of node devices and operation of the node devices, at least partially in parallel, to employ one or more of the per meter sets of models to derive power provision and/or power consumption predictions in response to prediction requests.

With general reference to notations and nomenclature used herein, portions of the detailed description that follows may be presented in terms of program procedures executed by a processor of a machine or of multiple networked machines. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include machines selectively activated or configured by a routine stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Systems depicted in some of the figures may be provided in various configurations. In some embodiments, the systems may be configured as a distributed system where one or more components of the system are distributed across one or more networks in a cloud computing system and/or a fog computing system.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
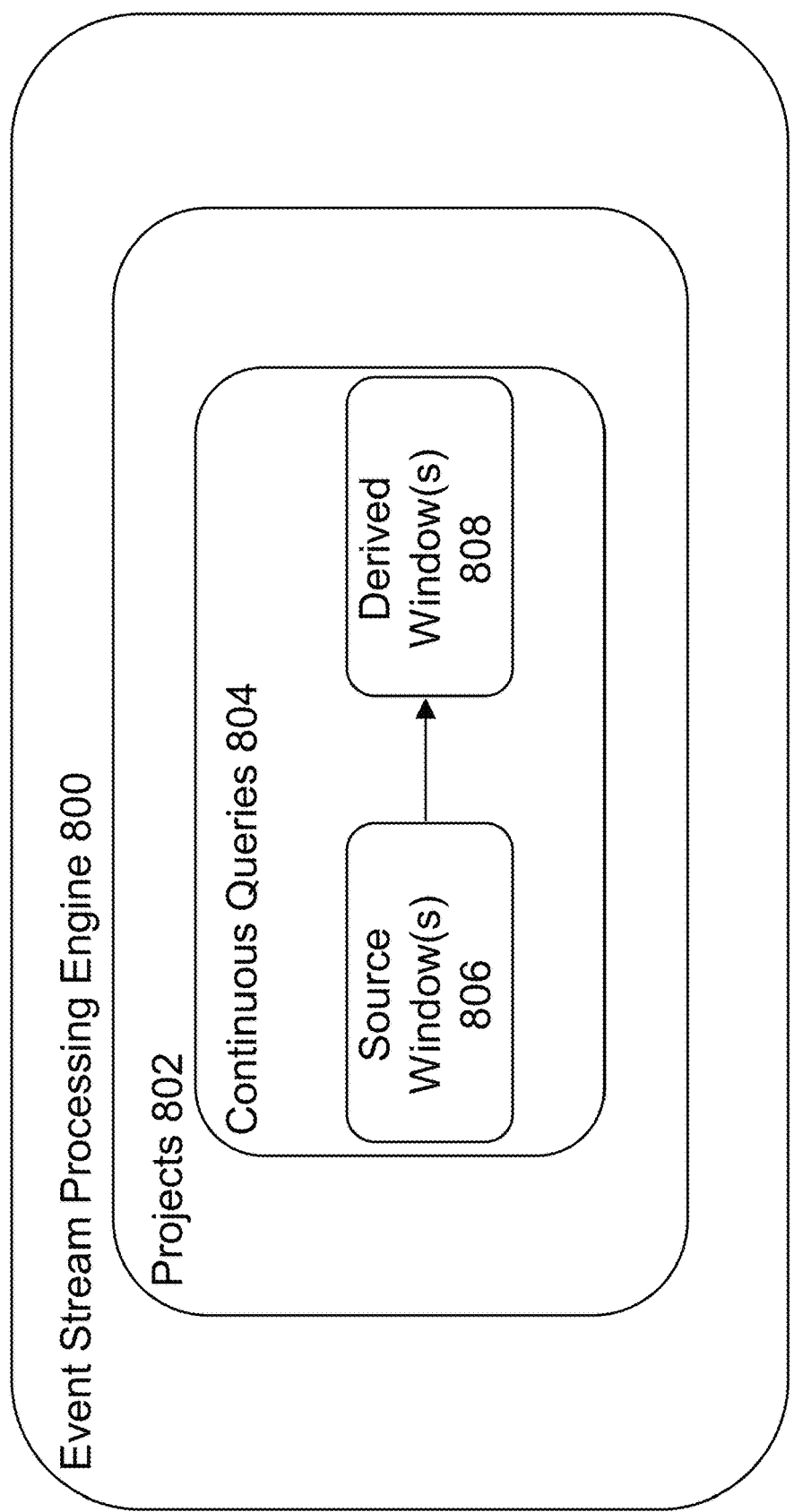
FIG. 8 illustrates a block diagram including components of an Event Stream Processing Engine (ESPE), according to embodiments of the present technology.
Figure 9:
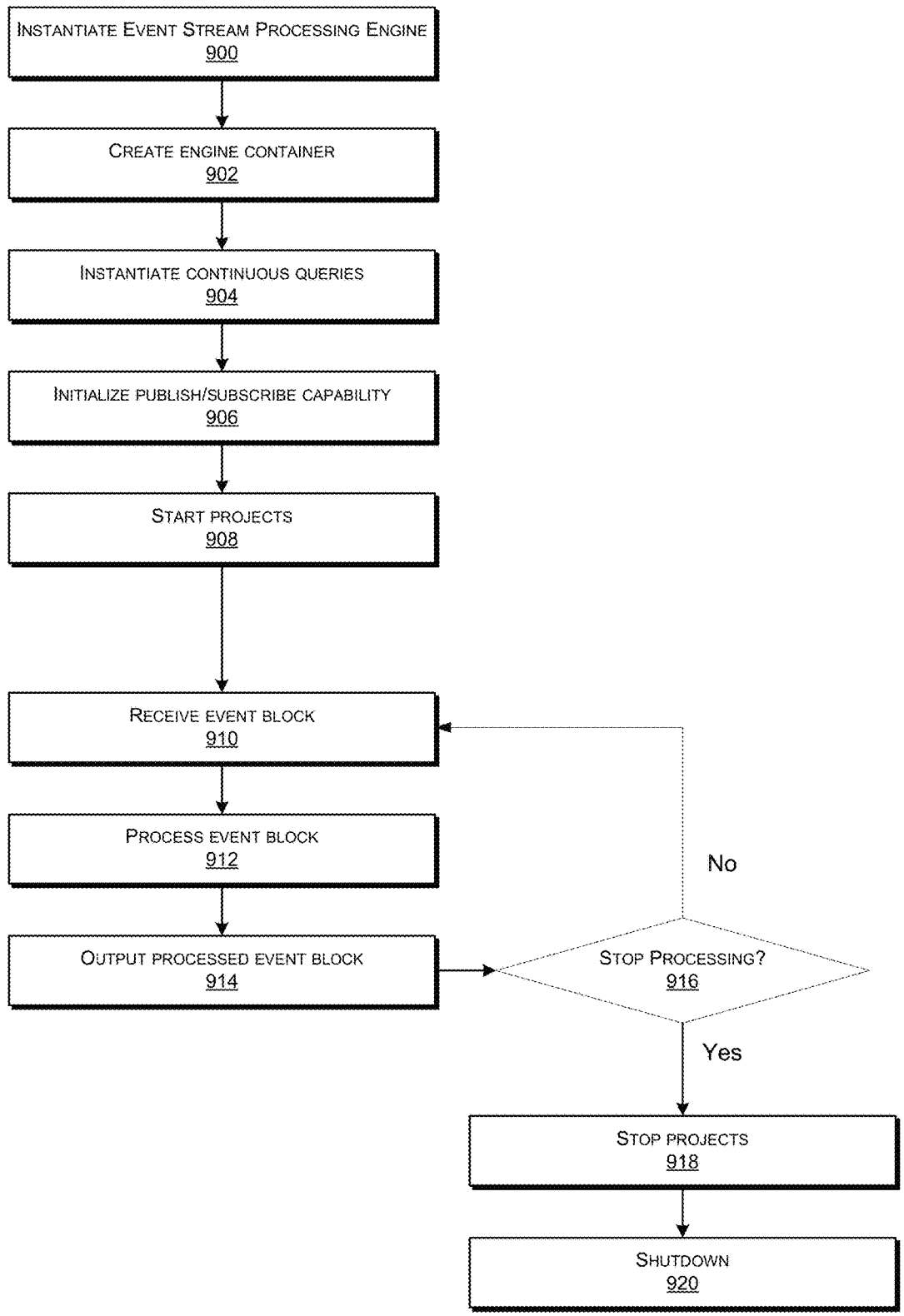
FIG. 9 illustrates a flow chart showing an example process including operations performed by an event stream processing engine, according to some embodiments of the present technology.
Figure 10:
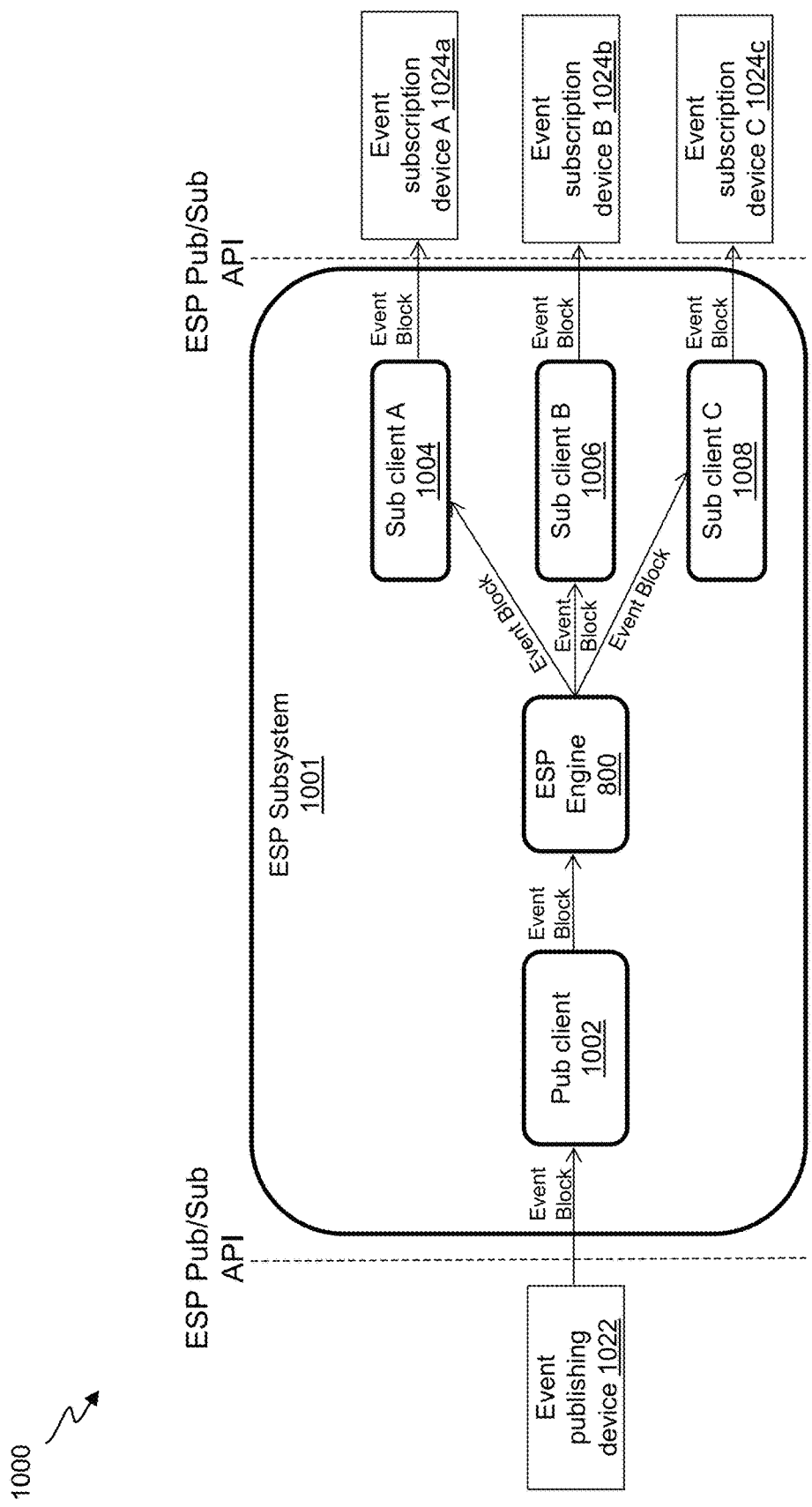
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLU-ETOOTH® communication channel or a BLUETOOTH® Low Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
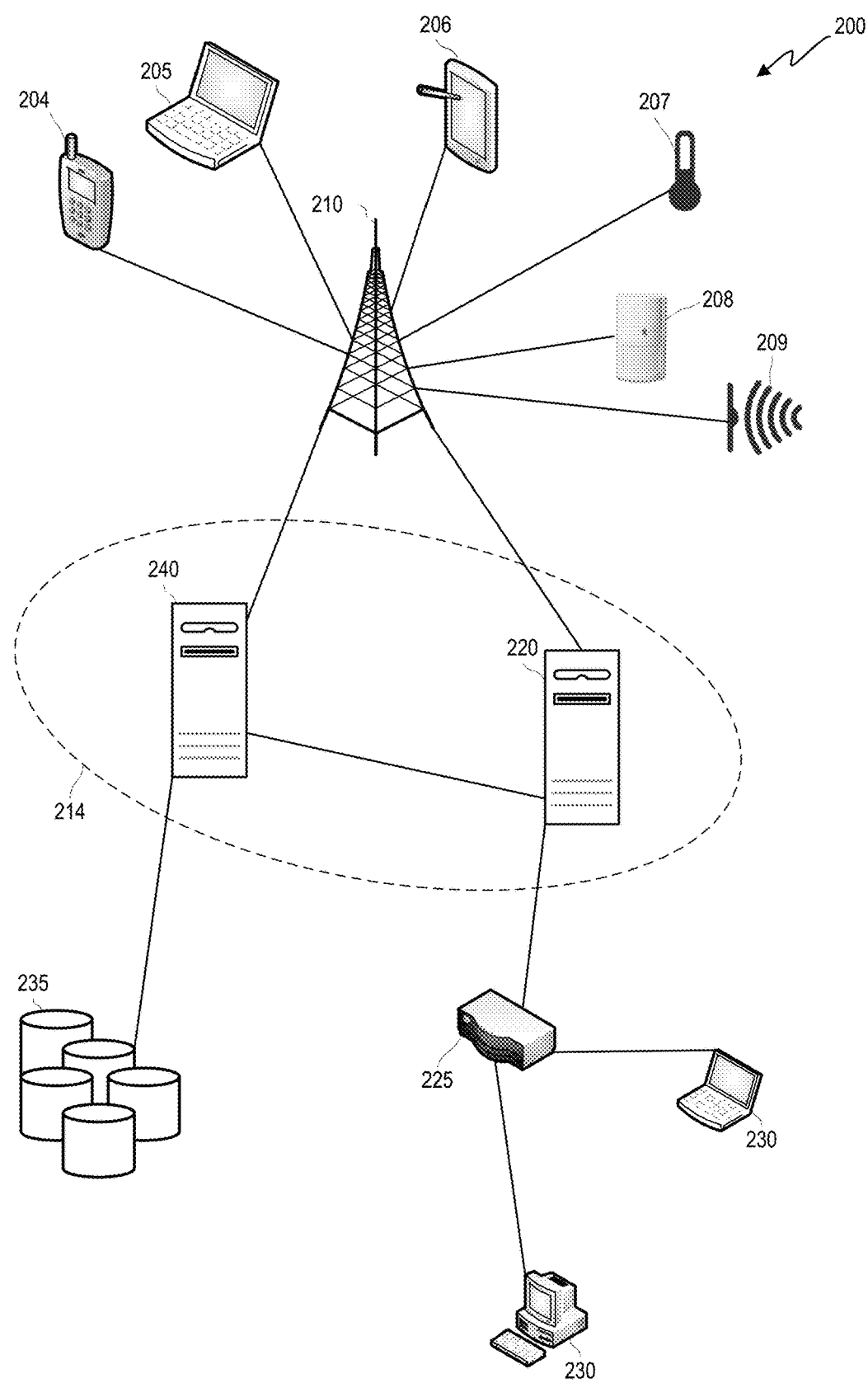
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
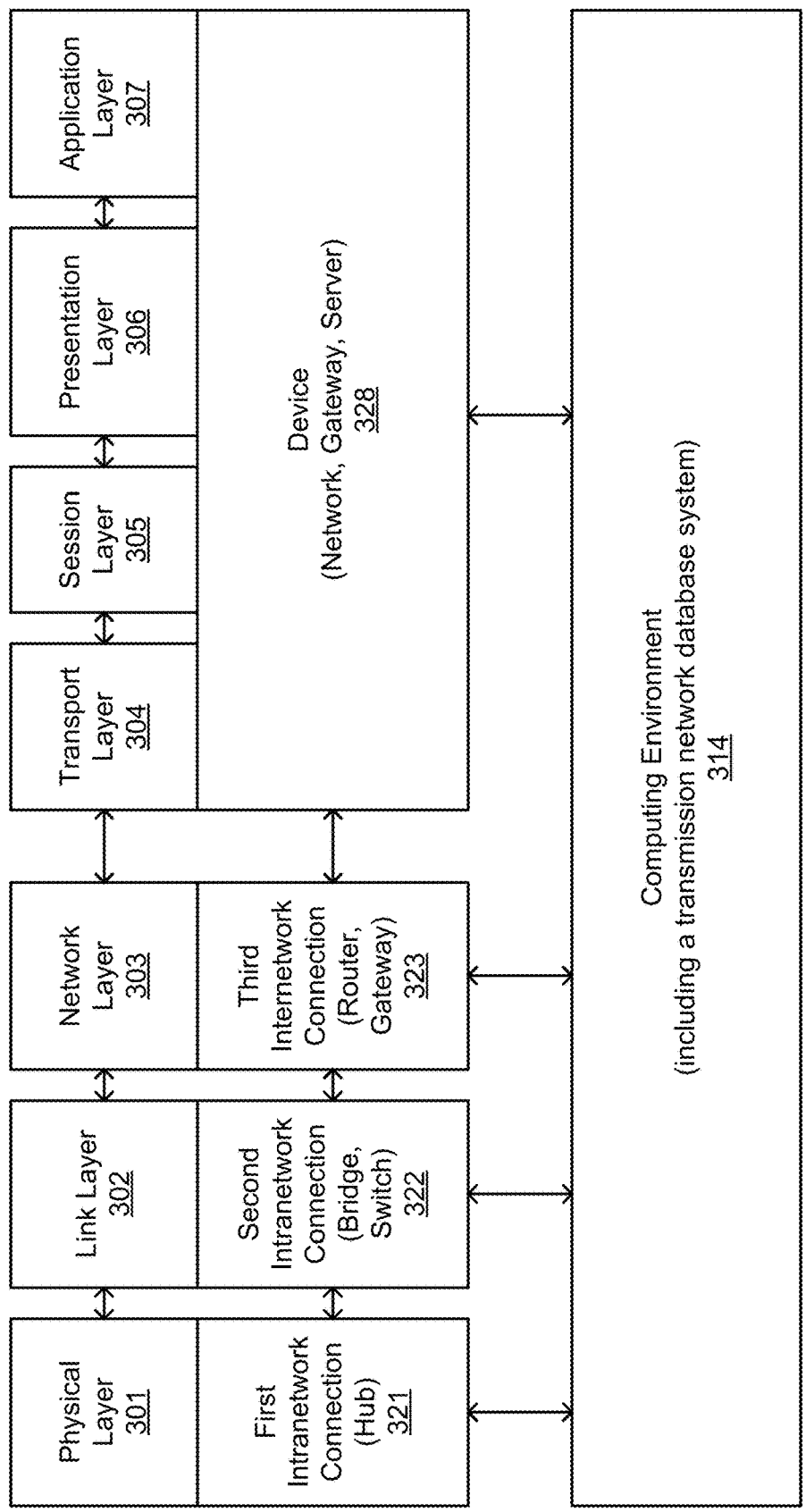
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
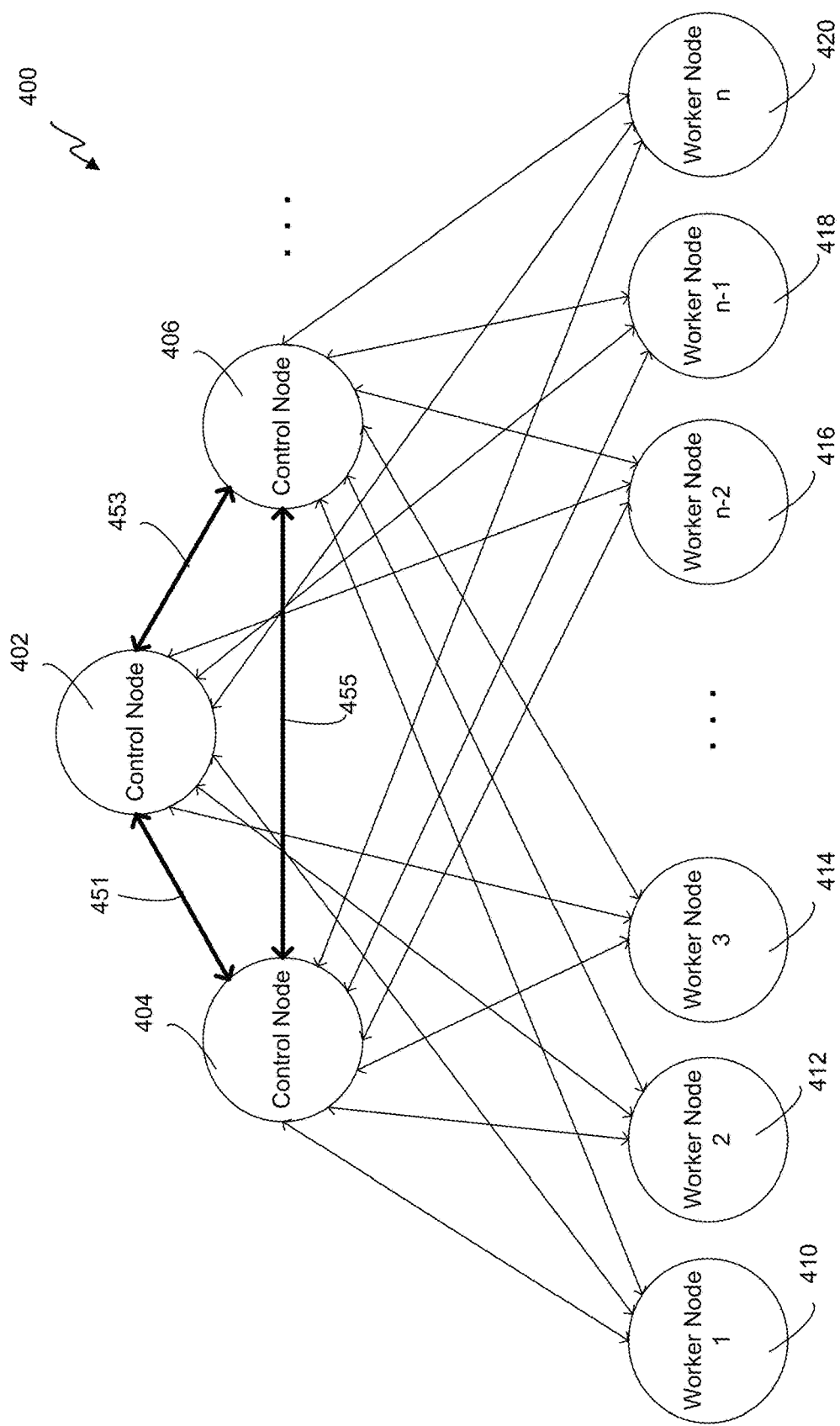
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
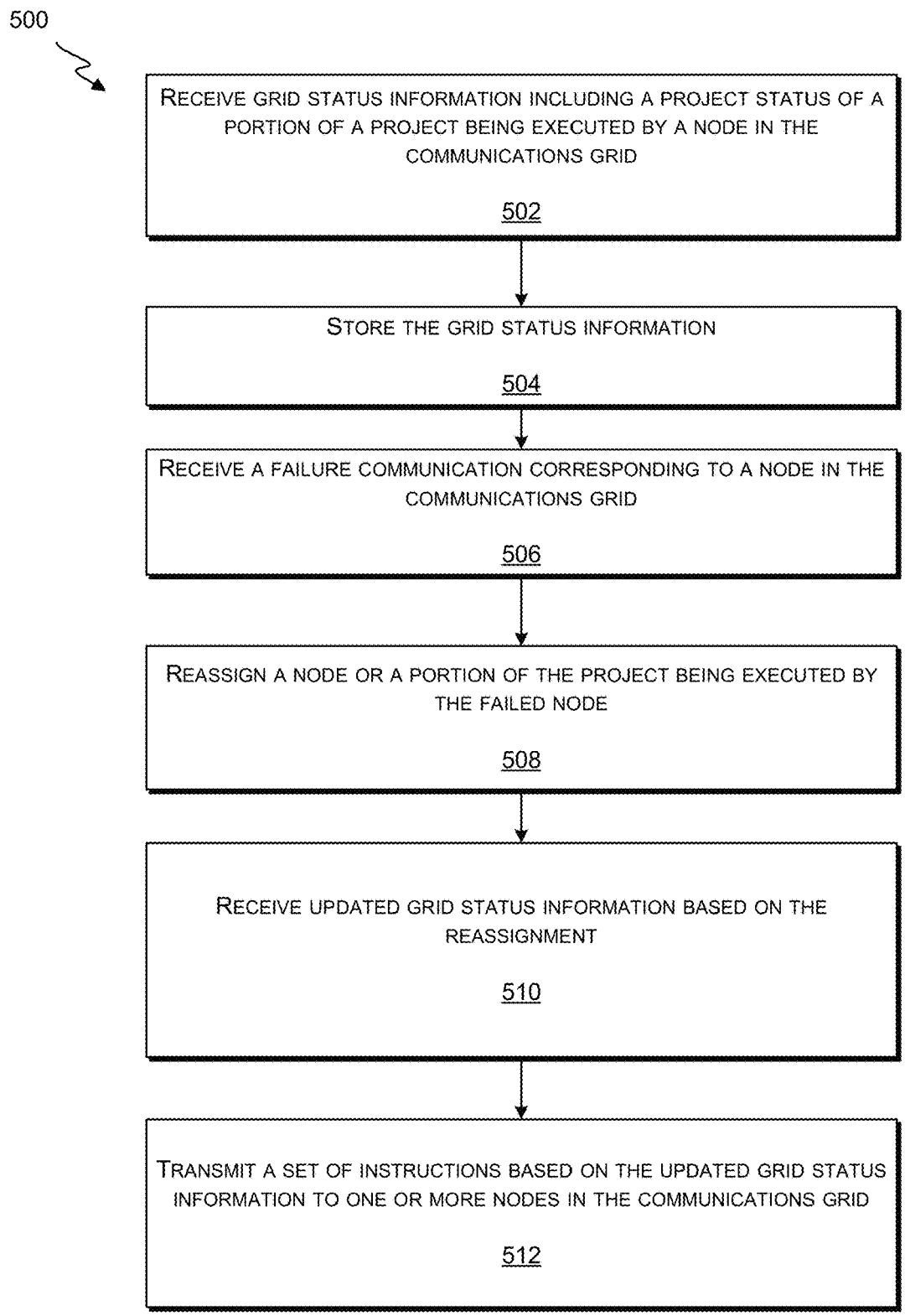
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
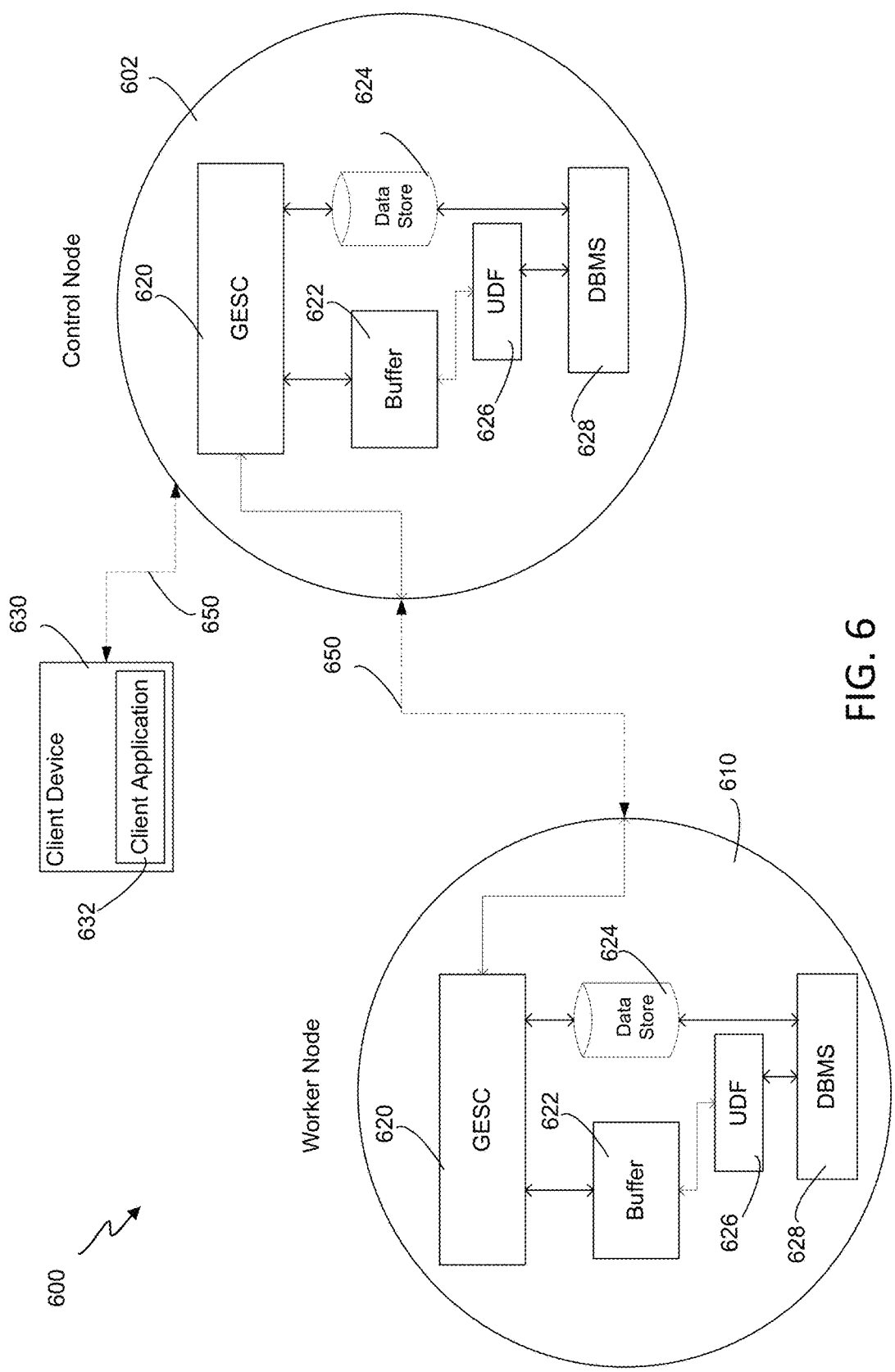
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), and receive information from worker node 610 via path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client deice 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
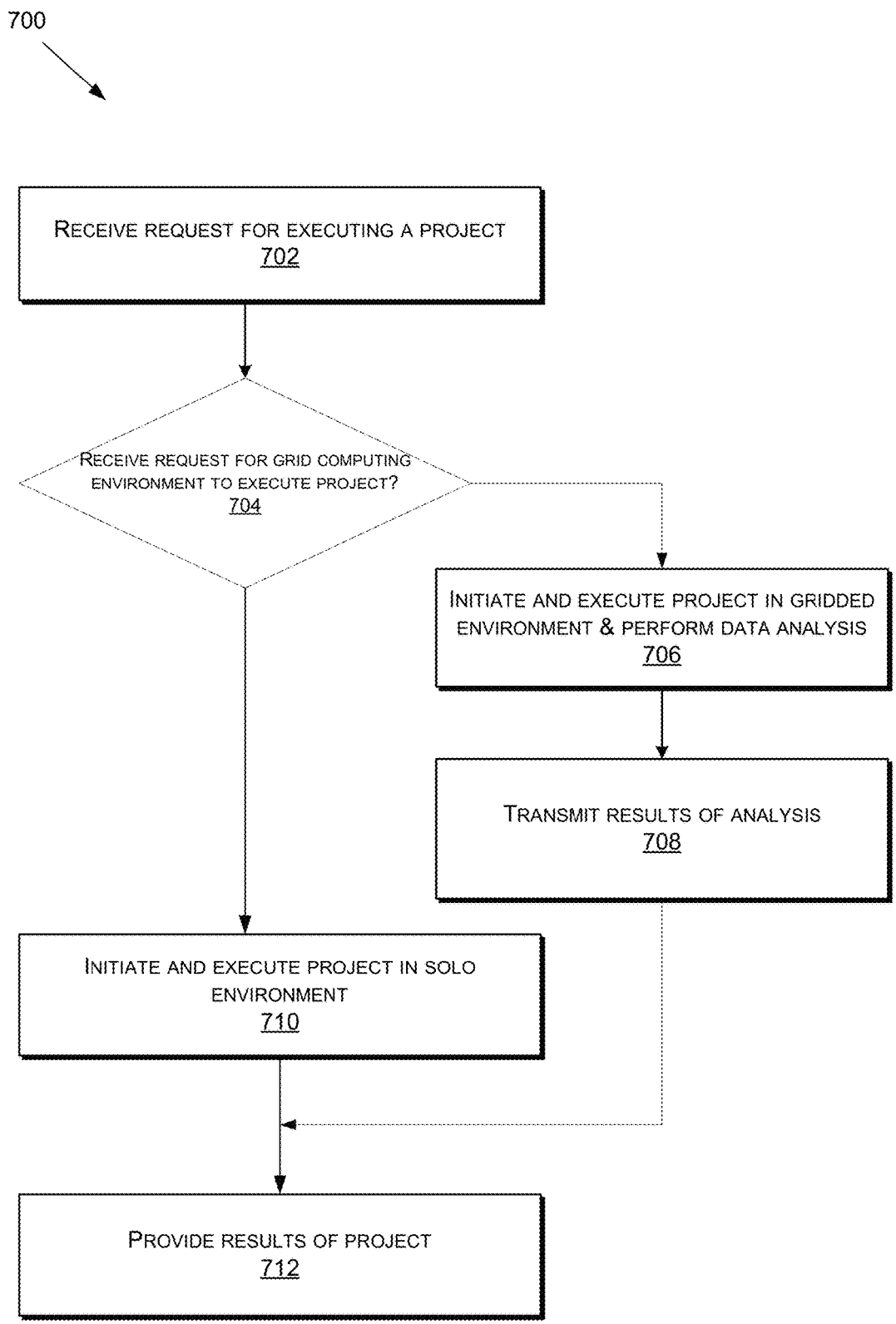
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024a-c, according to embodiments of the present technology. ESP system 1000 may include ESP device or subsystem 851, event publishing device 1022, an event subscribing device A 1024a, an event subscribing device B 1024b, and an event subscribing device C 1024c. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
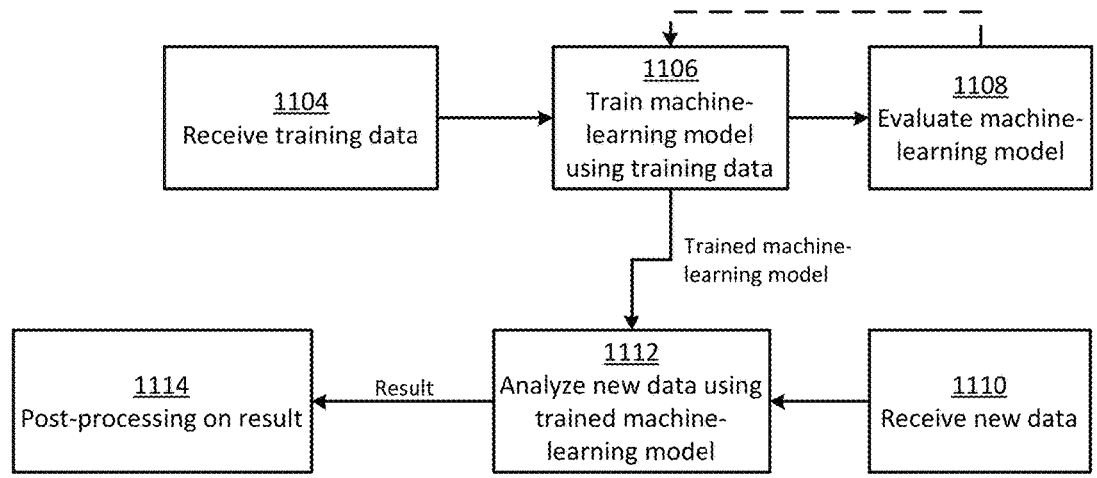
FIG. 11 illustrates a flow chart showing an example process of generating and using a machine-learning model according to some aspects.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
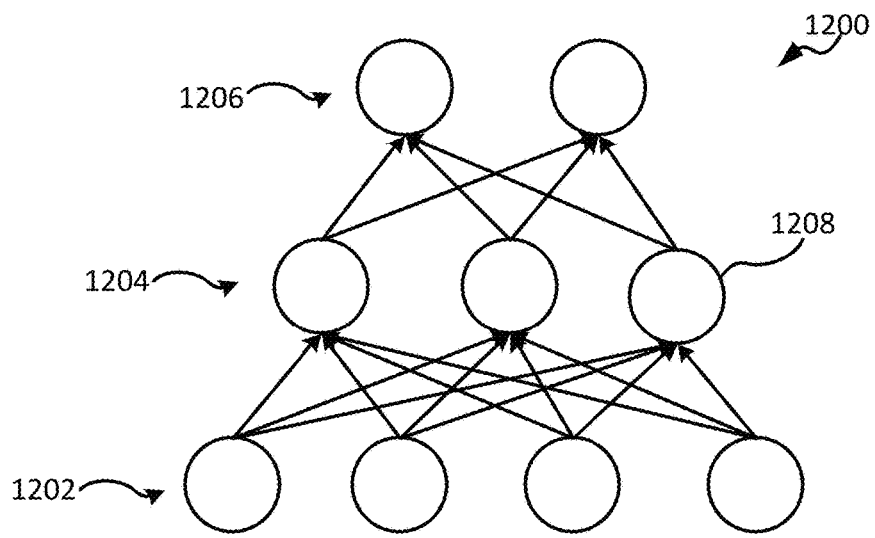
FIG. 12 illustrates an example machine-learning model based on a neural network.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network

1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Figure 13A:
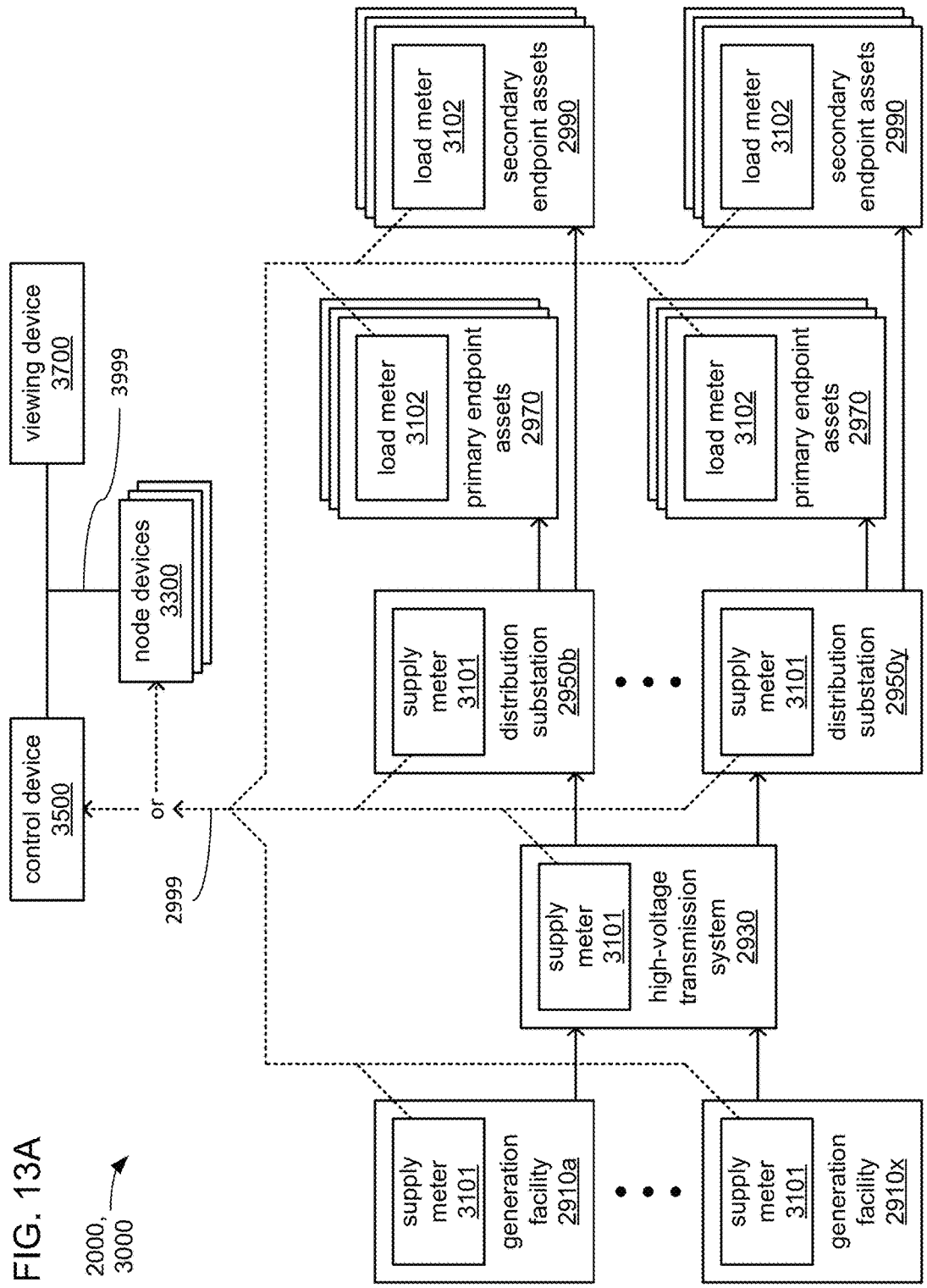
FIGS. 13A and 13B, together, illustrate an example embodiment of a distributed processing system.
Figure 13B:
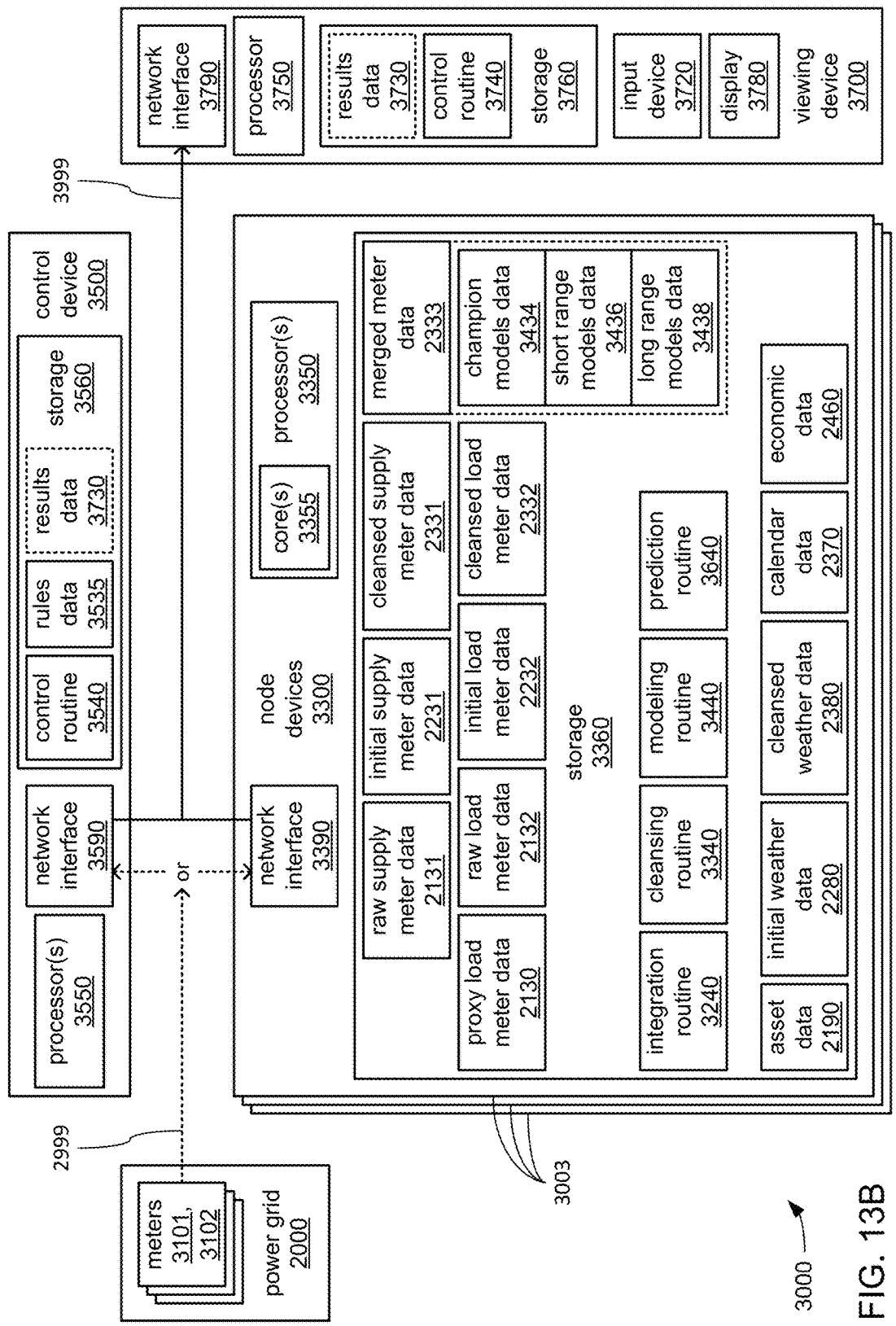

FIG. 13A illustrates a block diagram of an example embodiment of an electric power grid 2000 monitored by a distributed processing system 3000, and FIG. 13B illustrates a block diagram of the distributed processing system 3000. The power grid 2000 incorporates multiple supply assets 2910 2930 and 2950 that generate and convey electric power to multiple endpoint assets 2970 and 2990 at which the electric power is consumed. The generation and/or conveyance of electric power by each supply asset 2910, 2930 and 2950 is measured at intervals by a corresponding supply meter 3101, and the consumption of electric power by each endpoint asset 2970 and 2990 is measured at intervals by a corresponding load meter 3102. The measurements taken by the meters 3101 and 3102 are conveyed as raw meter data via a power grid communications network 2999 to one or more other devices 3300 and/or 3500 of the distributed processing system 3000 for storage and/or processing to generate sets of models of power provision and power consumption for various portions of the power grid 2000. Such processing may be coordinated through a network 3999 of the distributed processing system 3000, which may also convey requests from a viewing device 3700 for predictions to be made using those sets of models.

Turning to FIG. 13A, the supply assets of the power grid 2000 may include one or more generation facilities 2910 (designated 2910*a* through 2910*x*) at various supply locations where each employs any of a variety of technologies (e.g., coal, oil, natural gas, wind, hydroelectric, geothermal, solar, nuclear, etc.) to generate electricity. The supply assets of the power grid 2000 may include a high-voltage transmission system 2930 in which the electric power provided by the one or more generation facilities 2910 is stepped up in voltage, and is then both combined and conveyed from the supply locations of the one or more generation facilities 2910 across considerable geographic distances to one or more other supply locations. At those one or more other supply locations, the supply assets of the power grid 2000 may include one or more distribution substations 2950 (designated 2950*b* through 2950*y*) where the electric power conveyed thereto by the high-voltage transmission system 2930 is stepped back down in voltage in preparation for distribution to the primary endpoint assets 2970 and/or secondary endpoint assets 2990 at endpoint locations to be consumed. However, as explained elsewhere in this application, it is becoming increasingly commonplace for endpoint locations to have endpoint assets that include generators (e.g., rooftop solar, windmills, plug-in electric vehicles with batteries serving as a source, etc.), and there may be times when such endpoints actually become net suppliers of electricity back to a power grid. At each of the supply locations at which a generation facility 2910, various components of the high-voltage transmission system 2930 and/or a distribution substation 2950 is located, the supply meter(s) 3101 thereat may measure various parameters of all three phases of the provided electric power. At each of the endpoint locations at which the primary endpoint assets 2970 or the secondary endpoint assets 2990 include a generator, the load meter(s) 3102 thereat may measure various parameters of both the consumption of electric power from and provision of electric power back to the power grid 2000.

As will be familiar to those skilled in the art, over a number of decades, it has become common practice to generate and convey electricity in a three-phase configuration. This has been found to be a rather efficient way to configure the coils on the rotary generators that are used to convert the kinetic energy of rotary motion (provided by any of a variety of sources) into electrical energy, and correspondingly, has been found to be a rather efficient way to configure the coils of large electric motors that are often in use in any of a wide variety of industries. As a result, it is common practice for the high-voltage transmission system 2930 to convey electric power in a three-phase configuration with a stepped up voltage, and for the one or more distribution substations 2950 to convey electric power in a three-phase configuration with a stepped down voltage via primary distribution lines (not specifically shown) to at least the primary endpoint assets 2970, which tend to be industry-related endpoint assets at endpoint locations at which there are places of business. At each of the endpoint locations at which primary endpoint asset(s) 2970 are located, the load meter 3102 thereat may measure various parameters of all three phases of the electric power consumed at that location.

In contrast, secondary endpoint assets 2990, which tend to be non-industrial endpoint assets at endpoint locations at which there are residences, are usually provided with electric power via secondary distribution lines (not specifically shown) in a two-pole single-phase configuration that is often derived from one of the three phases of the electricity provided to the primary endpoint assets 2970 through a transformer (also not specifically shown). At each of the endpoint locations at which secondary endpoint asset(s) 2990 are located, the load meter 3102 thereat may measure various parameters of both poles of the single phase of the electric power consumed at that location.

Turning to FIG. 13B, the distributed processing system 3000 may include the meters 3101 and 3102 distributed among the aforementioned components of the power grid 2000, multiple node devices 3300, a control device 3500 and/or a viewing device 3700. At least the devices 3300, 3500 and 3700 may be interconnected by the network 3999. The raw meter data conveyed from meters 3101 and 3102 may be provided through the power grid communications network 2999 to the node devices 3300 and/or the control device 3500. In at least some embodiments, the control device 3500 may coordinate the operation of the multiple node devices 3300 to perform various operations, at least partially in parallel, in which the raw meter data from the meters 3101 and 3102 is processed, and then used, along with other data, to generate sets of models that correspond to each of the meters 3101 and 3102. Additionally, in response to a request received from the viewing device 3700, the control device 3500 may coordinate the operation of the multiple node devices 3300 to perform various operations, at least partially in parallel, to selectively use one or more of the models within one or more of the sets of models to generate a prediction concerning at least a portion of the power grid 2000.

In various embodiments, each of the node devices 3300 may incorporate one or more processors 3350, a storage 3360, and/or a network interface 3390 to couple each of the node devices 3300 to the network 3999. Each processor 3350 may incorporate one or more processing cores 3355. The storage 3360 may store multiple routines, including and not limited to, an integration routine 3240, a cleansing routine 3340, a modeling routine 3440, and/or a prediction routine 3640; multiple forms of meter data, including and not limited to, proxy load meter data 2130, raw supply meter data 2131, raw load meter data 2132, initial supply meter data 2231, initial load meter data 2232, cleansed supply meter data 2331, cleansed load meter data 2332, and/or merged meter data 2333; and/or other data, including and not limited to, asset data 2190, weather data 2280 and/or 2380, calendar data 2370, and/or economic data 2460. Each of the routines 3240, 3340, 3440 and 3640 may incorporate a sequence of instructions operative on the processor(s) 3350 of each of the node devices 3300 to implement logic to perform various functions, at least partially in parallel with the processor(s) 3350 of others of the node device 3300.

In various embodiments, the control device 3500 may incorporate one or more processors 3550, a storage 3560, and/or a network interface 3590 to couple the control device 3500 to the network 3999. The storage 3560 may store a control routine 3540, a rules data 3535 and/or a results data 3730. The control routine 3540 may incorporate a sequence of instructions operative on the processor(s) 3550 to implement logic to perform various functions.

In various embodiments, the viewing device 3700 may incorporate a processor 3750, a storage 3760, an input device 3720, a display 3780, and/or a network interface 3790 to couple the viewing device 3700 to the network 3999. The storage 3760 may store a control routine 3740 and/or the results data 3730. The control routine 3740 may incorporate a sequence of instructions operative on the processor 3750 to implement logic to perform various functions.

In executing each of the routines 3240, 3340, 3440 and/or 3640, the processor(s) 3350 of each of the node devices 3300 may be caused to perform various operations with the multiple forms of meter data and/or the other data, at least partially in parallel, to generate sets of models corresponding to each of the meters 3101 and/or 3102, and/or to selectively use models within selected ones of such sets of models to make predictions. In so doing, the processor(s) 3350 of each of the node devices 3300 may be caused to operate corresponding ones of the network interfaces 3390 to receive raw meter data transmitted by the meters 3101 and 3102 via the power grid communications network 2999. Also in so doing, the processor(s) 3350 of each of the node devices 3300 may be caused to operate corresponding ones of the network interfaces 3390 to communicate with the control device 3500 via the network 3999 to enable the control device 3500 to coordinate the operations performed by the node devices 3300.

In executing the control routine 3540, the processor(s) 3550 of the control device 3500 may be caused to operate the network interface 3590 to communicate with the multiple node devices 3300 via the network 3999 as part of coordinating the operations performed by the node devices 3300 to generate the sets of models in preparation for their use in making predictions. In preparation for the generation of the sets of models, the processor(s) 3550 may be caused to operate the network interface 3590 to communicate with the multiple node devices 3300 via the network 3999 as part of coordinating the distribution of raw meter data transmitted by the meters 3101 and 3102 among the node devices 3300.

Following such coordinated generation of the sets of models, the processor(s) 3550 may also be caused to monitor for the receipt of any requests by other devices, such as the viewing device 3700, for a prediction concerning power production and/or power consumption within a specified portion of the power grid 2000, and during a specified prediction time period. In response to such a request, the processor(s) 3550 may be caused to operate the network interface 3590 to relay aspects of the request to selected one(s) of the node devices 3300 to cause the selective use of models of one or more sets of models to generate portions of the requested prediction. Upon receiving the portions of the prediction from the selected one(s) of the node devices 3300, the processor(s) 3550 may then assemble the portions into a response to the request, and operate the network interface 3590 to transmit the response, as the results data 3730 to the requesting device (e.g., the viewing device 3700).

In executing the control routine 3740, the processor 3750 of the viewing device 3700 may operate the input device 3720 and/or the display 3780 to provide a user interface by which an operator of the viewing device 3700 may enter a request for a prediction of power provision and/or power consumption. In response to the entry of such a request, the processor 3750 may be caused to operate the network interface 3790 to transmit that request via the network 3999 to the control device 3500. The processor 3750 may then be caused to continue to operate the network 3790 to await and then receive, via the network 3999, the results data 3730 providing the response from the control device 3500 to the request.

Figure 14A:
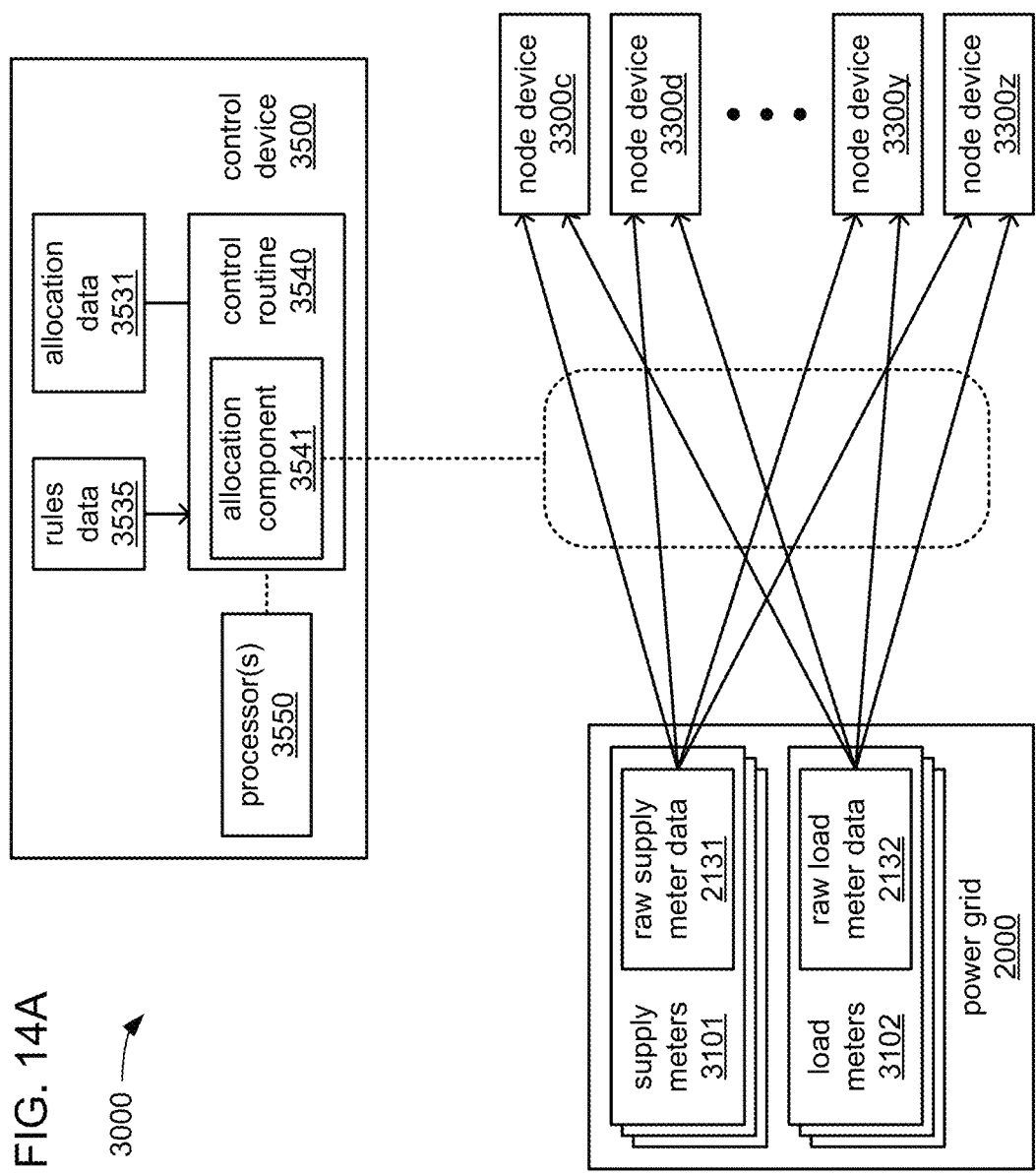
FIGS. 14A, 14B and 14C, together, illustrate an example of operations to prepare for, and to perform, the making of predictions of power provision and/or consumption in a power grid.
Figure 14B:
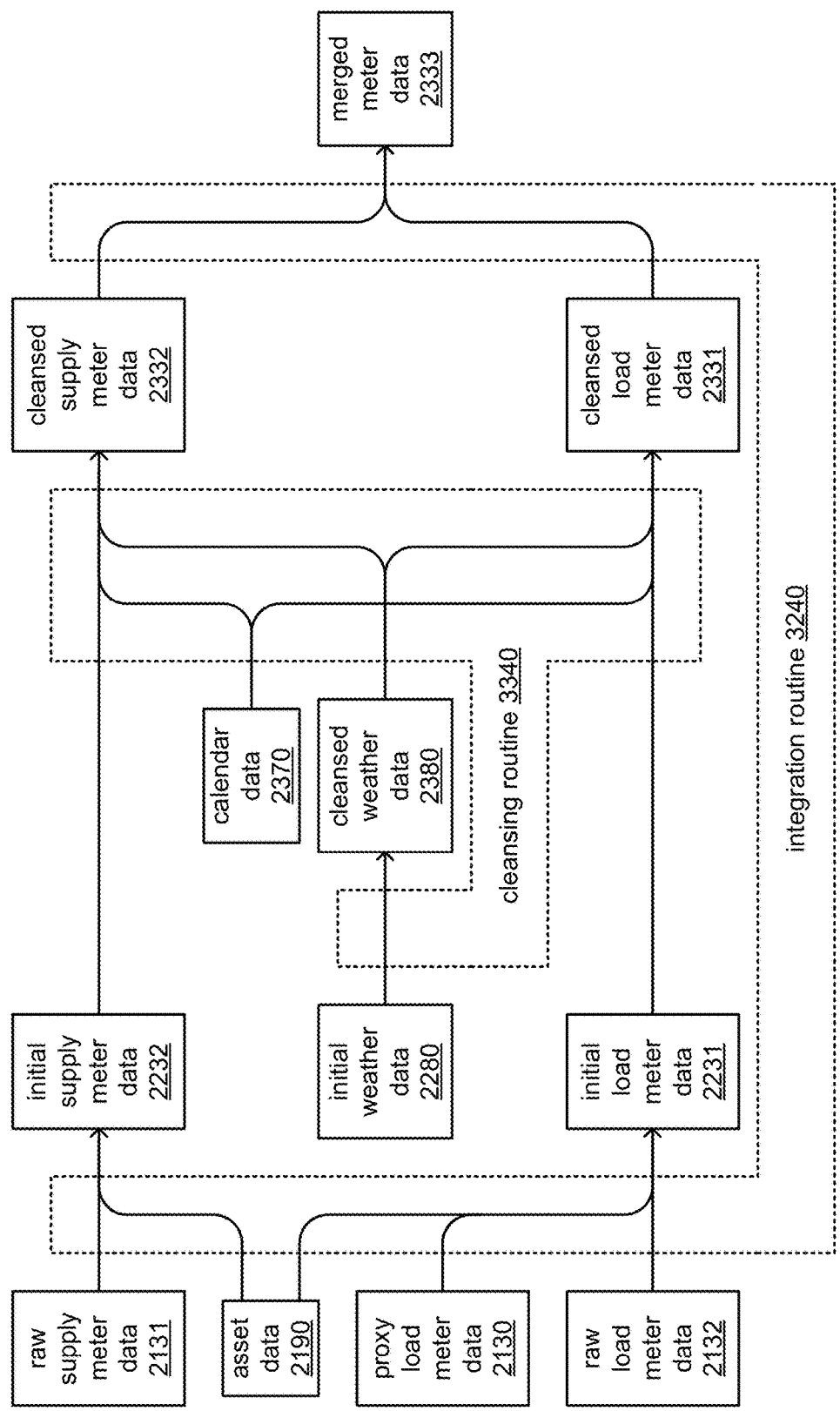
Figure 14C:
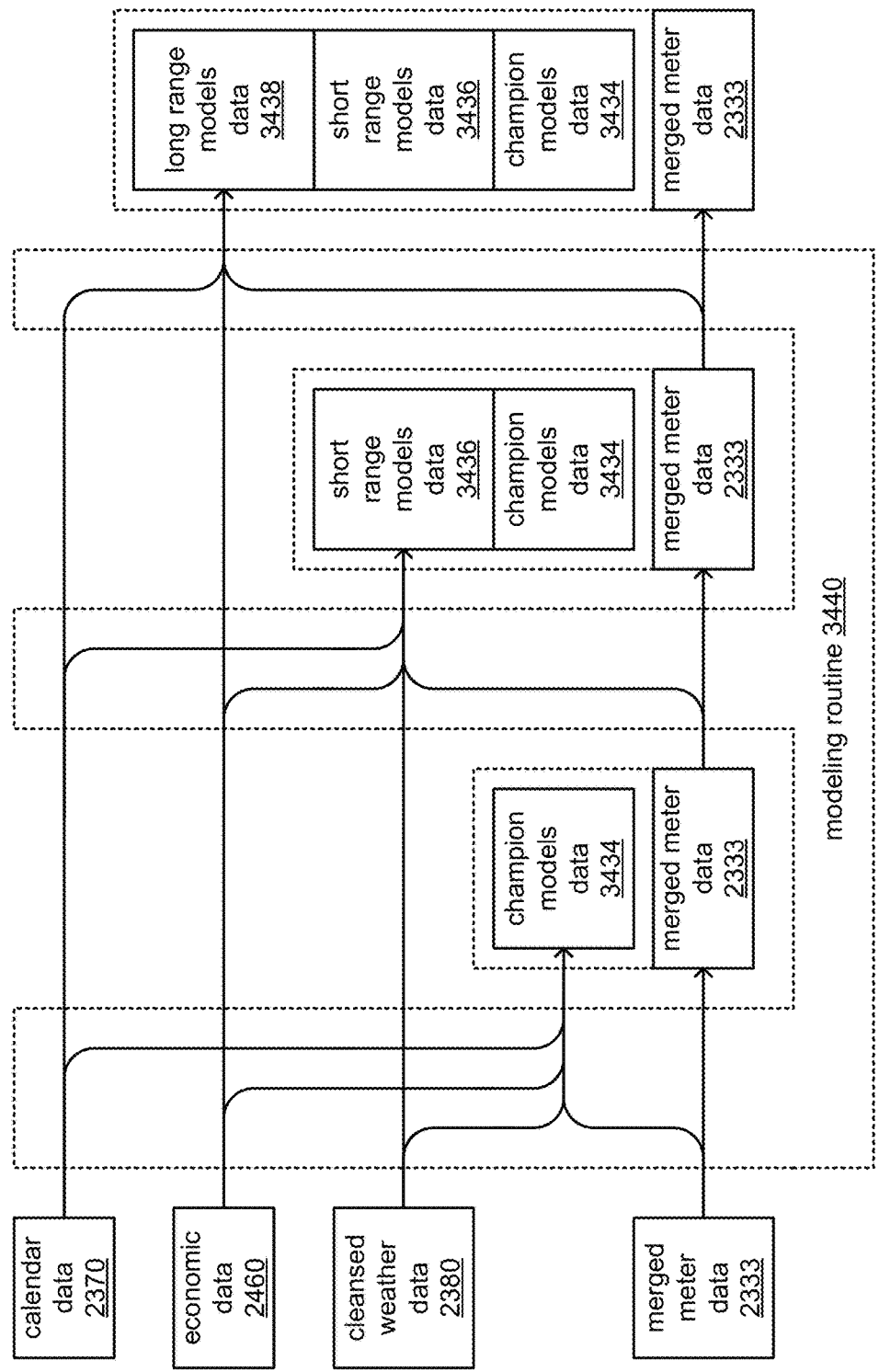

FIGS. 14A, 14B and 14C, together, illustrate an example overview of the distributed processing performed by at least the node devices 3300, as coordinated by the control device 3500, to generate sets of power provision models and of power consumption models concerning portions of the power grid 2000 in preparation for their use in making power provision and power consumption predictions. FIG. 14A provides an overview of an example of distribution of the raw supply meter data 2131 and the raw load meter data 2132 among the node devices 3300. FIG. 14B provides an overview of an example of processing the raw supply meter data 2131 and the raw load meter data 2132 to generate the merged meter data 2333. FIG. 14C provides an overview of the use of the merged meter data 2333, along with other data, to generate a separate set of models for each supply meter 3101 and each load meter 3102. FIGS. 15A-D, 16A-E and 17A-D present various aspects of what is depicted in FIGS. 14B-C in greater detail. Among those details is the use of various other types of data, in addition to the raw supply meter data 2131 and the raw load meter data 2132, as inputs in generating the merged meter data 2333, and then the separate set of models for each supply meter 3101 and for each load meter 3102. In particular, the use of the initial weather data 2280, the calendar data 2370, and the economic data 2460 are presented and discussed as specific examples of such other types of data. However, it should be noted that still other types of data may be used, either in addition to or in lieu of, the initial weather data 2280, the calendar data 2370 and/or the economic data 2460, including and not limited to, demographic data, climate data, governmental jurisdiction data, etc.

As will be familiar to those skilled in the art, each of the integration routine 3240, the cleansing routine 3340, the modeling routine 3440, the control routine 3540, the prediction routine 3640 and the control routine 3740, including the components of which each may be composed, are selected to be operative on whatever type of processor or processors that are selected to implement applicable ones of the processors 3350, 3550 and/or 3750. In various embodiments, each of these routines may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for execution by the processors 3350, 3550 and/or 3750. Where one or more device drivers are included, those device drivers may provide support for any of a variety of other components, whether hardware or software components, of the node devices 3300, the control device 3500 and/or the viewing device 3700.

Turning to FIG. 14A, as depicted, the control routine 3540 of the control device 3500 may include an allocation component 3541. In executing the control routine 3540, the processor(s) 3550 of the control device 3500 may be caused by the allocation component 3541 to control the allocation, among the node devices 3300, of subsets of the raw supply meter data 2131 generated by the supply meters 3101 and/or of the raw load meter data 2132 generated by the load metes 3102 in accordance with any of a variety of load balancing algorithms (which may be specified in the rules data 3535) to achieve a balanced distribution of such raw meter data among the node devices 3300. In so doing, the processor(s) 3550 may be caused effectively assign subsets of the supply meters 3101 and/or of the load meters 3102 each of the node devices 3300 so as to cause all of the raw supply meter data 2131 associated with each supply meter 3101 to be distributed to a single one of the node devices 3300, and/or to similarly cause all of the raw load meter data 2132 associated with each load meter 3102 to be distributed to a single one of the node devices 3300. In this way, instances in which the raw supply meter data 2131 from any of the supply meters 3101 might be split up among multiple node devices 3300 are avoided, as also are instances in which the raw load meter data 2132 from any of the load meters 3102 might be split up among multiple node devices 3300. This may be done as an approach to increasing the efficiency with which distributed processing of such raw meter data is able to be performed by the node devices 3300 at least partially in parallel by avoiding instances in which portions of such raw meter data must be exchanged among the node devices 3300 as a result of dependencies between operations being performed between different ones of the node devices 3300. The processor(s) 3550 may store indications of these assignments of subsets of supply meters 3101 and/or of load meters 3102 to each of the node devices 3300 as an allocation data 3531 maintained within the storage 3560 of the control device 3500.

Turning to FIG. 14B, as depicted, the processor(s) 3350 of each of the node devices 3300 may be caused to execute both the integration routine 3240 and the cleansing routine 3340, at least partially in parallel, to generate the merged meter data 2333 from the raw supply meter data 2131 and the raw load meter data 2132. FIGS. 15A, 15B, 15C and 15D depict aspects of the execution of the integration routine 3240 in greater detail.

Figure 15A:
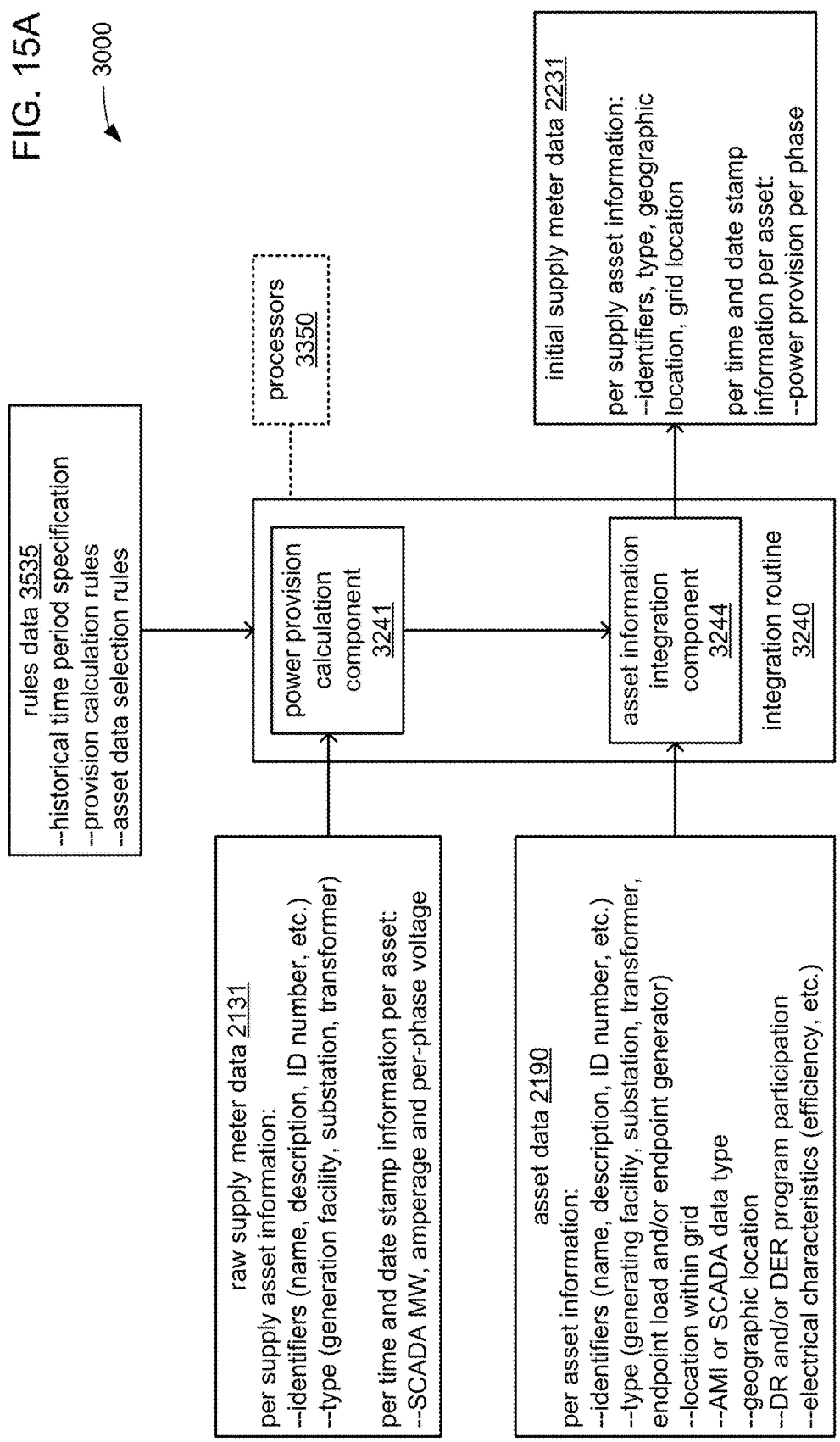

Turning to FIG. 15A, as depicted, the asset data 2190 may include numerous pieces of information about each supply asset and each endpoint asset of the power grid, including and not limited to, identifiers, type of asset (indicating at least whether each asset is a supply asset or an endpoint asset), the location of each asset within the hierarchy of electric power delivery within the power grid, an indication of geographic location of each asset within the geographic area covered by the power grid (e.g., geographic coordinates), various electrical characteristics of each asset (e.g., an efficiency rating, various absolute maximum ratings, etc.), an indication of what industrial standards for communication and/or measurements that each asset has been designed to adhere to (e.g., a version of SCADA or AMI), and/or indications of any power provision and/or power consumption control programs that each asset may be configured and/or assigned to participate in (e.g., a demand response (DR) program and/or a distributed energy resources (DER) program).

As also depicted in FIG. 15A, the raw supply meter data 2131 may include various pieces of information about each supply asset of a power grid, including and not limited to, an indication of the type of supply asset (e.g., generating facility, transmission system component, distribution substation, distribution transformer, etc.); and/or one or more identifiers used to uniquely identify each supply asset, such as a name given to each supply asset, a description of each supply asset (e.g., a human readable textual description), and/or an identification number that may be assigned to each supply asset. Additionally, for each supply meter 3101 that corresponds to one of the supply assets, the raw supply meter data 2131 may include a set of measures of characteristics of electric power provided by that supply asset as taken by a corresponding supply meter 3101 at recurring intervals, including and not limited to, a combination of measurements of megawatts, amperage and/or voltage per phase taken at each interval. In some embodiments, the particular combination of measurements taken at each interval and/or the units of measure used may be determined by the adherence of the corresponding supply meter 3101 to a specific industrial standard, such as SCADA.

As further depicted in FIG. 15A, the integration routine 3240 of each of the node devices 3300 may include a power provision calculation component 3241 and an asset information integration component 3244. In executing the integration routine 3240, the processor(s) 3350 within each node device may be caused by the power provision calculation component 3241 to, for each set of measures taken by a corresponding supply meter 3101, convert each combination of measurements taken at one of the intervals into a corresponding power provision value indicative of an amount or power provided by the corresponding supply asset for that interval. Stated differently, and by way of example, each combination of measures of megawatts, amperage and/or per-phase voltage taken at each interval is used in a power provision calculation to derive a corresponding power provision value for that interval. As each such set of measures taken at intervals by a supply meter 3101 is so converted, the resulting set of power provision values that corresponds to that supply meter 3101 is stored as part of the initial supply meter data 2231.

Also, in executing the integration routine 3240, the processor(s) 3350 of each node device 3300 are caused by the asset information integration component 3244 to augment the set of power provision values derived for each supply meter 3101 with preselected pieces of information concerning that supply meter and/or its corresponding supply asset, including and not limited to, identifier(s), type of supply asset, geographic location, and/or location of the supply asset within the hierarchy of electric power delivery within the power grid.

It should be noted that such conversion of combinations of measurements into corresponding power provision values may be limited to combinations of measurements taken at intervals that fall within a preselected historical time period that may be specified by the rules data 3535 and/or elsewhere. Alternatively or additionally, the rules data 3535 may specify the particular calculation operations to be performed to convert each combination of measurements taken at an interval into a corresponding power provision value, and/or may specify which pieces of information concerning each supply meter and/or its corresponding supply asset are to be included in the initial supply meter data 2231.

Turning to FIG. 15B, as depicted, the proxy load meter data 2130 may include numerous pieces of information for each endpoint asset and corresponding load meter 3102 that may not have been connected to the grid throughout the entirety of the historical time period, including and not limited to, identifiers; type of endpoint asset (e.g., an endpoint load and/or an endpoint generator, such as roof-mounted solar panels); an identification number that may be assigned to each endpoint asset; and/or an indication of whether each endpoint asset is configured to and/or assigned to participate in any power provision and/or power consumption control program (e.g., DR and/or DER); start and/or stop dates of service (i.e., an indication of when the endpoint asset was and/or was not connected to the power grid); and/or various electrical characteristics of the endpoint asset (e.g., ramp-up time, ramp-down time, scaling, etc.).

As also depicted in FIG. 15B, the raw load meter data 2132 may include various pieces of information about each endpoint asset of a power grid, including and not limited to, an indication of the type of endpoint asset; one or more identifiers used to uniquely identify each endpoint asset, such as a name given to each endpoint asset, a description of each endpoint asset (e.g., a human readable textual description), and/or an identification number that may be assigned to each endpoint asset; and/or an indication of whether each endpoint asset is configured to and/or assigned to participate in any power provision and/or power consumption control program. Additionally, for each load meter 3102 that corresponds to one or more of the endpoint assets, the raw load meter data 2132 may include a set of measures of characteristics of electric power consumed by that endpoint asset as taken by a corresponding load meter 3102 at recurring intervals, including and not limited to, a combination of measurements of kilowatts and/or voltage per phase taken at each interval. In some embodiments, the particular combination of measurements taken at each interval and/or the units of measure used may be determined by the adherence of the corresponding load meter 3102 to a specific industrial standard, such as a specific version of AMI.

In some situations, the combination of measurements taken by a particular load meter 3102 may include one or more additional measured characteristics that are also measured at each interval. By way of example, where the endpoint asset(s) corresponding to a particular load meter 3102 include an endpoint generator that is able to serve as a source of electric power to the power grid (e.g., as a result of participating in a DER program), the combination of measurements taken by the particular load meter 3102 may include additional measurements for any instances of such provision of electric power to the power grid as measured by the particular load meter 3102.

As further depicted in FIG. 15A, the integration routine 3240 of each of the node devices 3300 may additionally include a proxy data generation and combining component 3242, and a power consumption calculation component 3243. In executing the integration routine 3240, the processor(s) 3350 within each node device 3300 may be caused by the power provision calculation component 3241 to, for each endpoint asset and corresponding load meter 3102 that was not connected to the power grid throughout the entirety of the historical time period, generate simulated measures to fill in the corresponding set of measures with measures that were not able to be taken by the load meter 3102 as a result of that lack of connection to the power grid. In so doing, the processor(s) 3350 within each node device 3300 may be caused to derive the simulated measures based on the electrical characteristics for the corresponding endpoint load indicated in the proxy load meter data 2130.

In some embodiments, the electrical characteristics indicated in the proxy load meter data 2130 may be derived from known specifications of the endpoint asset(s) known to be present at the corresponding endpoint location. In other embodiments, the electrical characteristics indicated in the proxy load meter data 2130 may be assumed from knowledge of other characteristics of the corresponding endpoint location, such as whether the endpoint location is a residence or a place of business, etc. Additionally, where the endpoint asset(s) are known to include an endpoint generator capable of providing electric power back to the power grid, the simulated measures may include one or more additional simulated measures of instances of such provision of electric power to the power grid.

Also, in executing the integration routine 3240, the processor(s) 3350 of each node device 3300 are caused by the power consumption calculation component 3243 to, for each set of measures taken by a corresponding load meter 3102, convert each combination of measurements taken at one of the intervals into a corresponding power consumption value indicative of an amount or power consumed by the corresponding endpoint asset(s) for that interval. Stated differently, and by way of example, each combination of measures of kilowatts and/or per-phase voltage taken at each interval is used in a power consumption calculation to derive a corresponding power consumption value for that interval. As each such set of measures taken at intervals by a load meter 3102 is so converted, the resulting set of power consumption values that corresponds to that load meter 3102 is stored as part of the initial load meter data 2232. In a situation where the corresponding endpoint asset(s) includes an endpoint generator capable of providing electric power to the power grid such that there may be one or more additional measures taken by the corresponding load meter 3102 at each interval for an amount of electric power so provided to the power grid, such conversion to power consumption values may take into account amounts of power so provided to the power grid versus amounts of power consumed.

In further executing the integration routine 3240, the processor(s) 3350 of each node device 3300 are caused by the asset information integration component 3244 to augment the set of power consumption values derived for each load meter 3102 with preselected pieces of information concerning that load meter and/or its corresponding endpoint asset(s), including and not limited to, identifier(s), type of endpoint asset(s), geographic location, and/or location of the endpoint asset(s) within the hierarchy of electric power delivery within the power grid.

It should be noted that such conversion of combinations of measurements into corresponding power consumption values may be limited to combinations of measurements taken at intervals that fall within a preselected historical time period that may be specified by the rules data 3535 and/or elsewhere. Alternatively or additionally, the rules data 3535 may specify the particular calculation operations to be performed to convert each combination of measurements taken at an interval into a corresponding power consumption value, and/or may specify which pieces of information concerning each load meter and/or its corresponding endpoint asset(s) are to be included in the initial load meter data 2232.

Figure 15C:
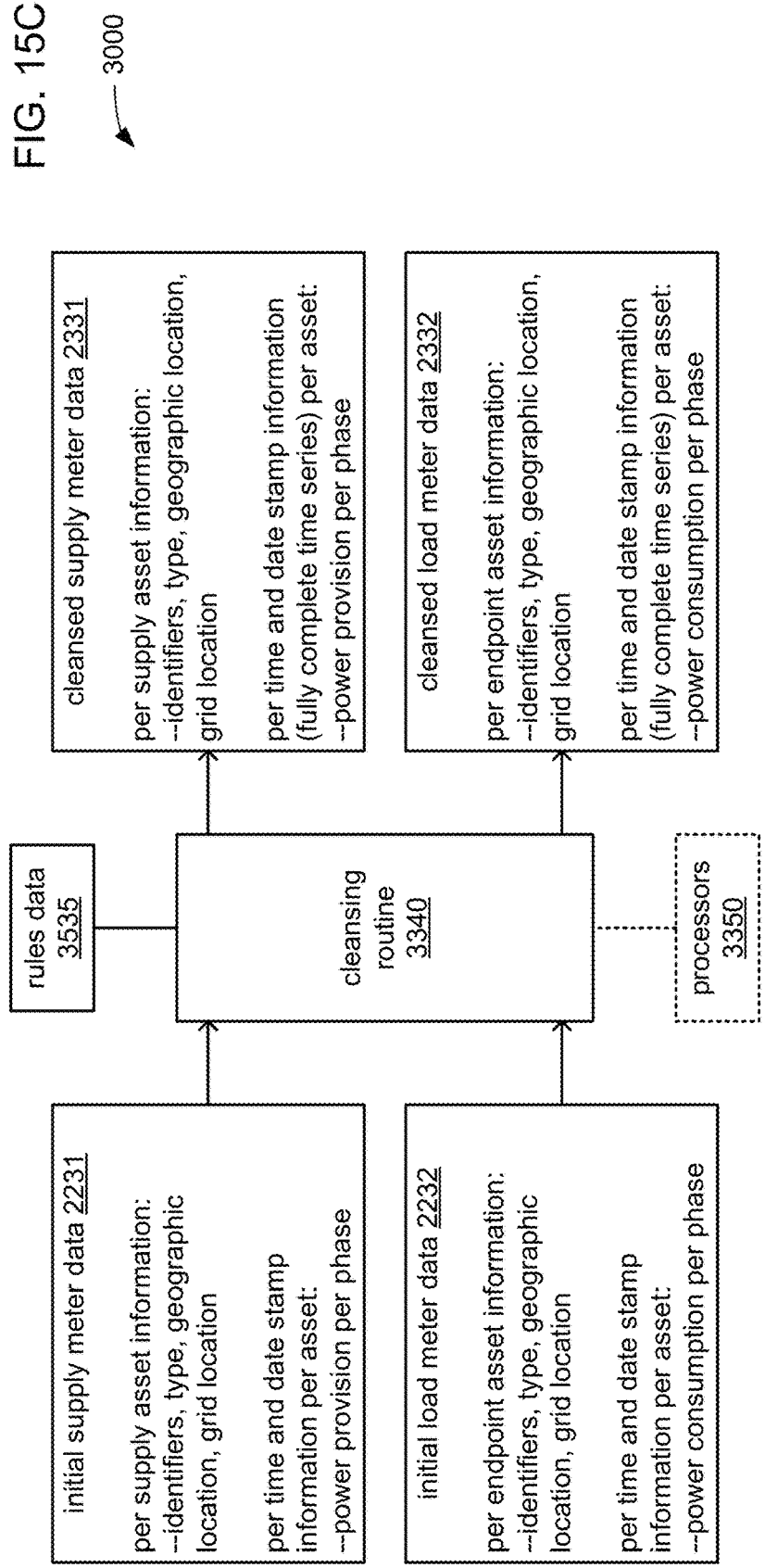

Turning to FIG. 15C, as depicted, the contents of the cleansed supply meter data 2331 and of the cleansed load meter data 2332 are similar in many ways to the contents of the initial supply meter data 2231 and of the initial load meter data 2232, respectively. However, as will be described in greater detail in FIGS. 16A-E, the power provision values of the cleansed supply meter data 2331 are a cleansed form of the power provision values of the initial supply meter data 2231, and correspondingly, the power consumption values of the cleansed load meter data 2332 are a cleansed form of the power consumption values of the initial load meter data 2232.

Turning to FIG. 15D, the integration routine 3240 of each of the node devices 3300 may additionally include a power consumption aggregation component 3245, and a meter data integration component 3246. In further executing the integration routine 3240, the processor(s) 3350 within each of the node devices 3300 may be caused by the meter data integration component 3246 to merge the contents of the cleansed supply meter data 2331 and of the cleansed load meter data 2332 into the merged meter data 2333.

In still further executing the integration routine 3240, the processor(s) 3350 within each node devices 3300 may be caused by the power consumption aggregation component to use indications in the cleansed supply meter data 2331 of locations of supply assets within the hierarchy of the power grid along with indications in the cleansed load meter data 2332 of endpoint assets within the hierarchy of the power grid to correlate each supply asset to the multiple endpoint assets that it provides with electric power. Then, for each supply asset, the processor(s) 3350 may use the derived correlation of that supply asset to the multiple endpoint assets that it provides with electric power to generate aggregate power consumption values that correspond to its power provision values from the power consumption values of the individual ones of those endpoint assets in the cleansed load meter data 2332. The processor(s) 3350 of the node devices 3300 may then augment the data within the merged meter data 2333 for each supply asset with its corresponding aggregate power consumption values.

FIGS. 16A, 16B, 16C, 16D and 16E depict aspects of the execution of the cleansing routine 3340 in greater detail.

Figure 16A:
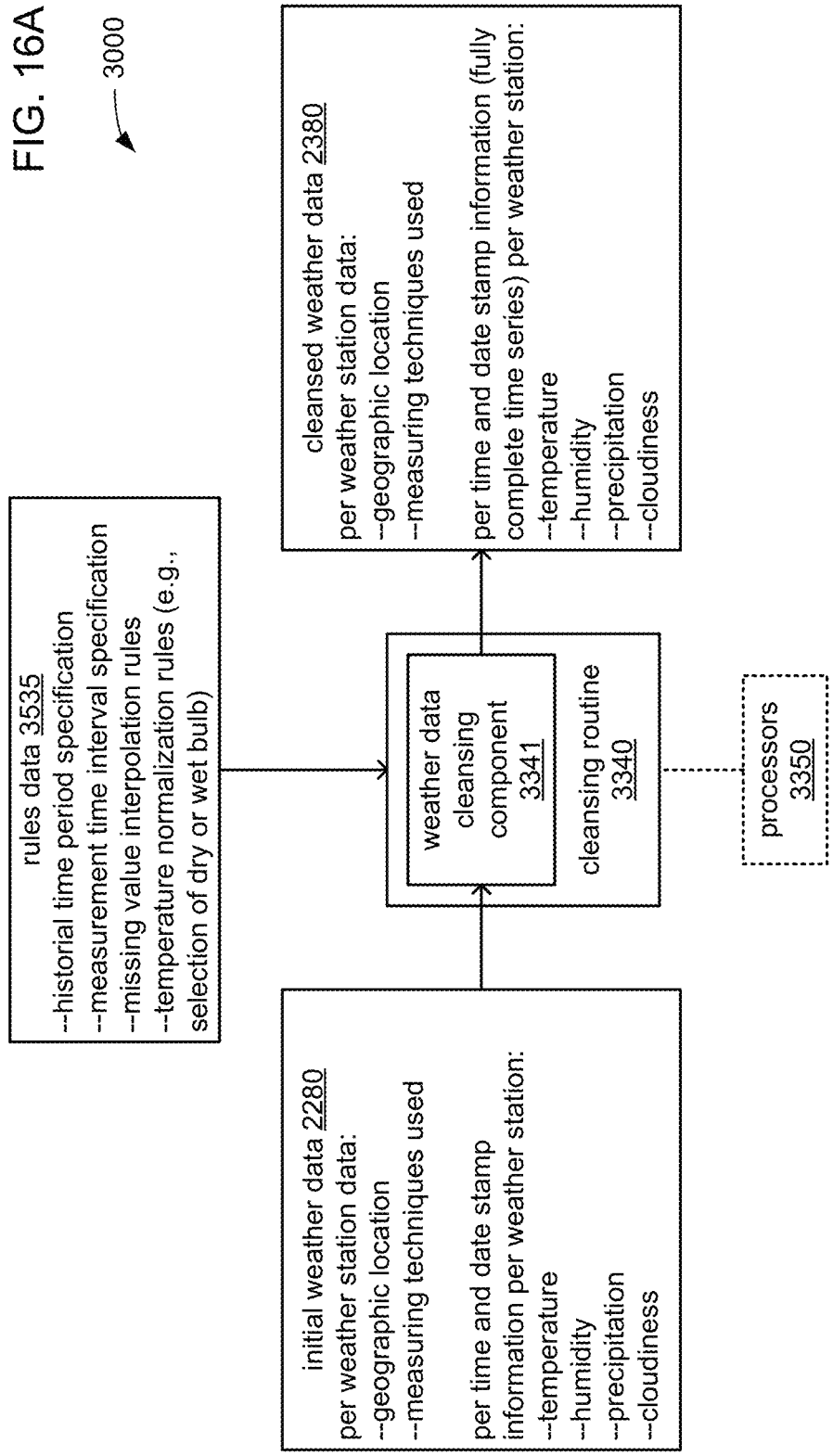
FIGS. 16A, 16B, 16C, 16D and 16E, together, illustrate an example of cleansing initial meter data to generate cleansed meter data as part of the integration of FIGS. 15A-D.

Turning to FIG. 16A, as depicted, the initial weather data 2280 may include various pieces of information about weather stations within the geographic area covered by the power grid, including and not limited to, indications of the geographic location of each weather station (e.g., geographic coordinates and/or street address), and/or techniques used in performing measurements (e.g., dry bulb vs. wet bulb technique for measuring temperature, etc.). Additionally, for each weather station, the initial weather data 2280 may include a set of weather measurements taken by the weather station at recurring intervals, including and not limited to, temperature, humidity, precipitation, degree of cloudiness, etc.

As further depicted in FIG. 16A, the cleansing routine 3340 of each of the node devices 3300 may include a weather data cleansing component 3341. In executing the cleansing routine 3340, the processor(s) 3350 within each node device 3300 may be caused by the weather data cleansing component 3341 to cleanse each set of weather measurements taken by a corresponding weather station. In so doing, the processor(s) 3350 are caused to analyze weather measurement values within each set that were taken at intervals within the historical time period to identify missing and/or outlier values, and to replace those missing and/or outlier weather measurement values to create a fully complete time series of weather values for each weather station during the historical time period. As each such complete time series is so generated for one of the weather stations, the resulting completed time series of weather values that corresponds to that weather station is stored as part of the cleansed weather data 2380.

The rules data 3535 may specify the expected interval of time between weather measurements taken by each weather station to use as a mechanism to detect missing weather measurements. Alternatively or additionally, the rules data 3535 may specify the particular calculation operations to be performed to generate replacement weather measurement values to be used to replace missing and/or outlier weather measurement values. Also alternatively or additionally, where normalization among multiple techniques of measuring a weather parameter (e.g., temperature, humidity, etc.) are required, the rules data 3535 may specify the operations to be performed to effect such normalization.

Figure 16B:
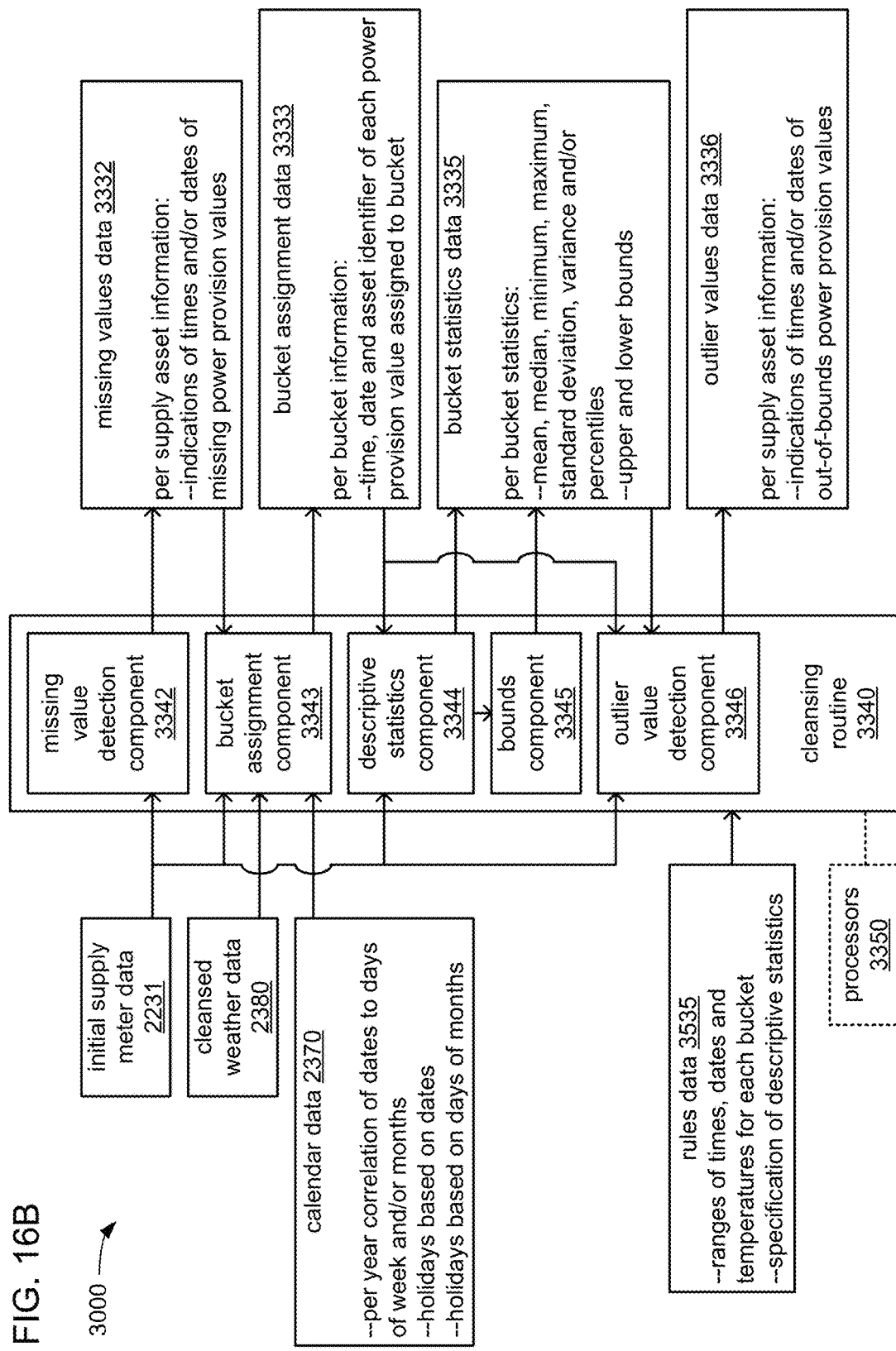
Figure 16C:
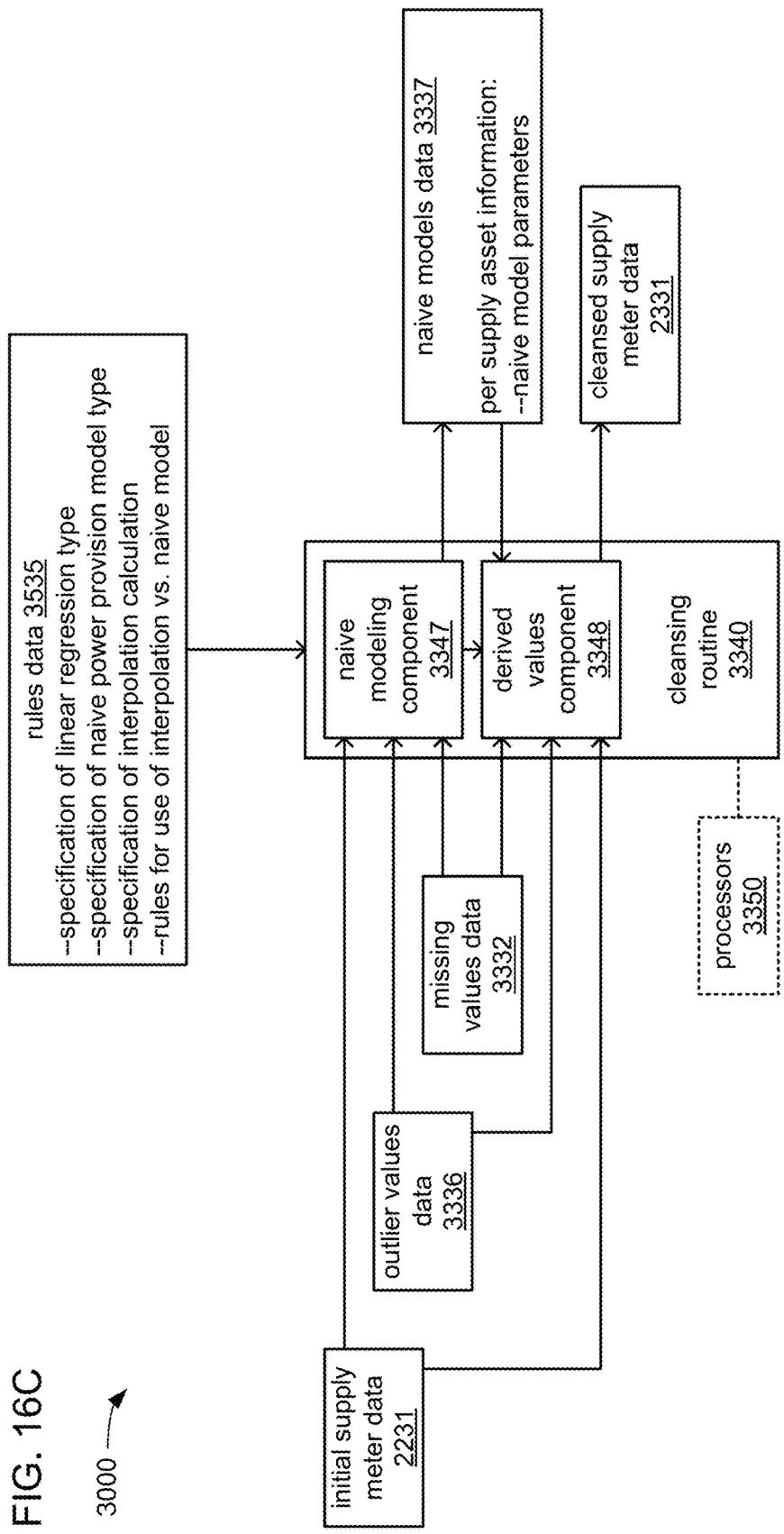

Turning to FIGS. 16B-C, as depicted, the calendar data 2370 may include various pieces of information concerning dates of one or more years, including and not limited to, correlations of dates to days of a week for one or more years, correlations of dates to months of a year for one or more years, and/or dates of holidays applicable to the geographic area covered by the power grid. As further depicted in FIGS. 16B-C, the cleansing routine 3340 of each of the node devices 3300 may include a missing value detection component 3342, a bucket assignment component 3343, a descriptive statistics component 3344, a bounds component 3345, an outlier value detection component 3346, naive modeling component 3347 and a derived values component 3348.

As previously discussed, the initial supply meter data 2231 may include various pieces of information about each supply asset that may be drawn from the raw supply meter data 2131 and the asset data 2190, including and not limited to, the type of supply asset, geographic location of the supply asset, location of the supply asset within the hierarchy of the power grid, and/or one or more identifiers used to uniquely identify each supply asset. Additionally, for each supply meter 3101 that corresponds to one of the supply assets, the initial supply meter data 2231 may include a set of power provision values indicating amounts of power provided by the supply asset at recurring intervals. However, as also previously discussed, meter and/or connection malfunctions or other issues may result in there being missing measurements in the raw supply meter data 2131, and as a result, one or more of the sets of power provision values in the raw supply meter data 2131 may not include a power provision value for every interval of time throughout the historical time period. Additionally, as will be familiar to those skilled in the art, even without the occurrence of meter and/or connection malfunctions or other issues, various circumstances may arise in the monitoring of the provision of electric power that may result in errant measurements such that one or more of the sets of power provision values may include one or more outlier values.

In executing the cleansing routine 3340, the processor(s) 3350 within each node device 3300 may be caused by the missing value detection component 3342 to, for each set of power provision values corresponding to a supply meter 3101, identify any missing power provision values that prevent that set of power provision values from forming a complete time series that covers the historical time period. As such missing power provision values are identified, indications of which interval(s) of time within each set of power provision values are missing power provision values (if any) may be stored in a temporary data structure, such as the depicted missing values data 3332.

In further executing the cleansing routine 3340, the processor(s) 3350 within each node device 3300 may be caused by the bucket assignment component 3343 to define a set of meter data value buckets in which each bucket is associated with a different range of weather conditions (e.g., a different range of temperatures), or in which each bucket is associated with a different combination of range of weather conditions and range of dates. The rules data 3535 may specify ranges of times, dates, temperatures and/or other weather conditions that are used to define each bucket. With the buckets so defined, the processor(s) 3350 may be caused to assign each power provision value that is present within each set of power provision values to one of the buckets based on the particular weather conditions at the supply location of the corresponding supply meter at the time and/or date associated with the each power provision value. As such assignments are made, indications of which bucket that each power provision value of each set of power provision values is assigned to may be stored in a temporary data structure, such as the depicted bucket assignment data 3333.

In still further executing the cleansing routine 3340, the processor(s) 3350 within each node device 3300 may be caused by the descriptive statistics component 3344 to derive separate descriptive statistics for the power provision values assigned to each bucket (as indicated in the bucket assignment data 3333). The particular descriptive statistics that are so derived may be specified in rules data 3535, and for each bucket, these may include and not be limited to, a mean, a median, a minimum, a maximum, a standard deviation, a variance and/or percentiles. With the descriptive statistics for each bucket so derived, the processor(s) 3350 may be caused by the bounds components 3345 to derive separate upper and lower bounds for power provision values for each bucket. As such descriptive statistics, as well as the upper and lower bounds, are derived for each bucket, such per bucket statistics may be stored in a temporary data structure, such as the depicted bucket statistics data 3335.

In continuing to execute the cleansing routine 3340, the processor(s) 3350 within each node device 3300 may be caused, for each bucket, to use the upper and lower bounds for power provision values (as stored within the bucket statistics data 3335) to identify outlier power provision values among those that are assigned to that bucket (again, as indicated in the bucket assignment data 3333). For the sake of clarity, it should be noted that the values for upper and lower bounds are not the same as the maximum and minimum among the descriptive statistics. The maximum and minimum for each bucket indicate the highest and lowest power provision values among the power provision values, respectively, that are assigned to that bucket. In contrast, the upper and lower bounds are the upper and lower threshold power provision values that are used to identify outlier power provision values that are either too high or too low, respectively, such that they should be filtered out and not used in subsequent data analysis. More specifically, it is expected that the value of the upper bound will be lower than that of the maximum, and that the value of the lower bound will be higher than that of the minimum. As such outlier power provision values are identified, indications of which interval(s) of time within each set of power provision values have outlier power provision values (if any) may be stored in a temporary data structure, such as the depicted outlier values data 3336. As will shortly be explained, each outlier power provision value may be treated in the same manner as a missing power provision value. Thus, in alternate embodiments, such indications of outlier power provision values may be stored in a converged data structure with the indications of missing power provision values.

As execution of the cleansing routine 3340 continues, and with both missing and outlier power provision values identified within each set of power provision values within the initial supply meter data 2231 for each supply meter 3101, the processor(s) 3350 are caused to use the remaining power provision values within each set of power provision values (i.e., those within each set that are not missing and that are not identified as outliers) through linear regression to derive a separate naive power provision model for the power provision values of each supply meter 3101. The rules data 3535 may specify aspects of the linear regression performed and/or the naive power provision model type. As each naive power provision model is derived for one of the sets of power provision values of one of the supply meters 3101, indications of at least the parameters of each naive power provision model may be stored in a temporary data structure, such as the depicted naive models data 3337.

As execution of the cleansing routine 3340 still continues, and with a separate naive power provision model generated for each set of power provision values corresponding to one of the supply meters 3101, the processor(s) 3350 may be caused by the derived values component 3348 to use the indications of missing power provision values stored in the missing values data 3332 and/or the indications of outlier power provision values stored in the outlier values data 3336 to determine the width of each gap of one or more missing and/or outlier power provision values that is present in one or more of the sets of power provision values. In other words, for each set of power provision values, the quantity of power provision values that are needed to replace each missing and/or outlier power provision value within each gap to form a fully complete time series of power provision values is determined.

In some embodiments, the processor(s) 3350 may be caused to select from among multiple approaches to deriving power provision values to fill each such gap based on its width. By way of example, in some embodiments, the rules data 3535 may specify a predetermined threshold quantity of missing and/or outlier power provision values that is used in making such a selection. Thus, in such embodiments, for each gap having a quantity of consecutive missing and/or outlier power provision values that exceeds the predetermined threshold quantity of power provision values, the processor(s) 3350 may be caused to use the corresponding naive power provision model to derive each of the power provision values needed to fill that gap. However, for each gap having a quantity of consecutive missing and/or outlier power provision values that does not exceed the predetermined threshold quantity of power provision values, the processor(s) 3350 may be caused to use interpolation based on the power provision values adjacent to each end of the gap to derive each of the power provision values needed to fill that gap.

For each set of power provision values within the initial supply meter data 2231 that has no gaps (i.e., no missing or outlier power provision values), the processor(s) 3350 may be caused to simply store such sets of power provision values as part of the cleansed supply meter data 2331, since each such set without gaps already forms a fully completed time series of power provision values. Also, as the gaps are filled within each set of power provision values that are identified as having gaps (i.e., having one or more missing and/or outlier power provision values), the processor(s) 3350 may store such newly completed sets of power provision values also as part of the cleansed supply meter data 2331, since each such set now forms a fully completed time series of power provision values.

Figure 16D:
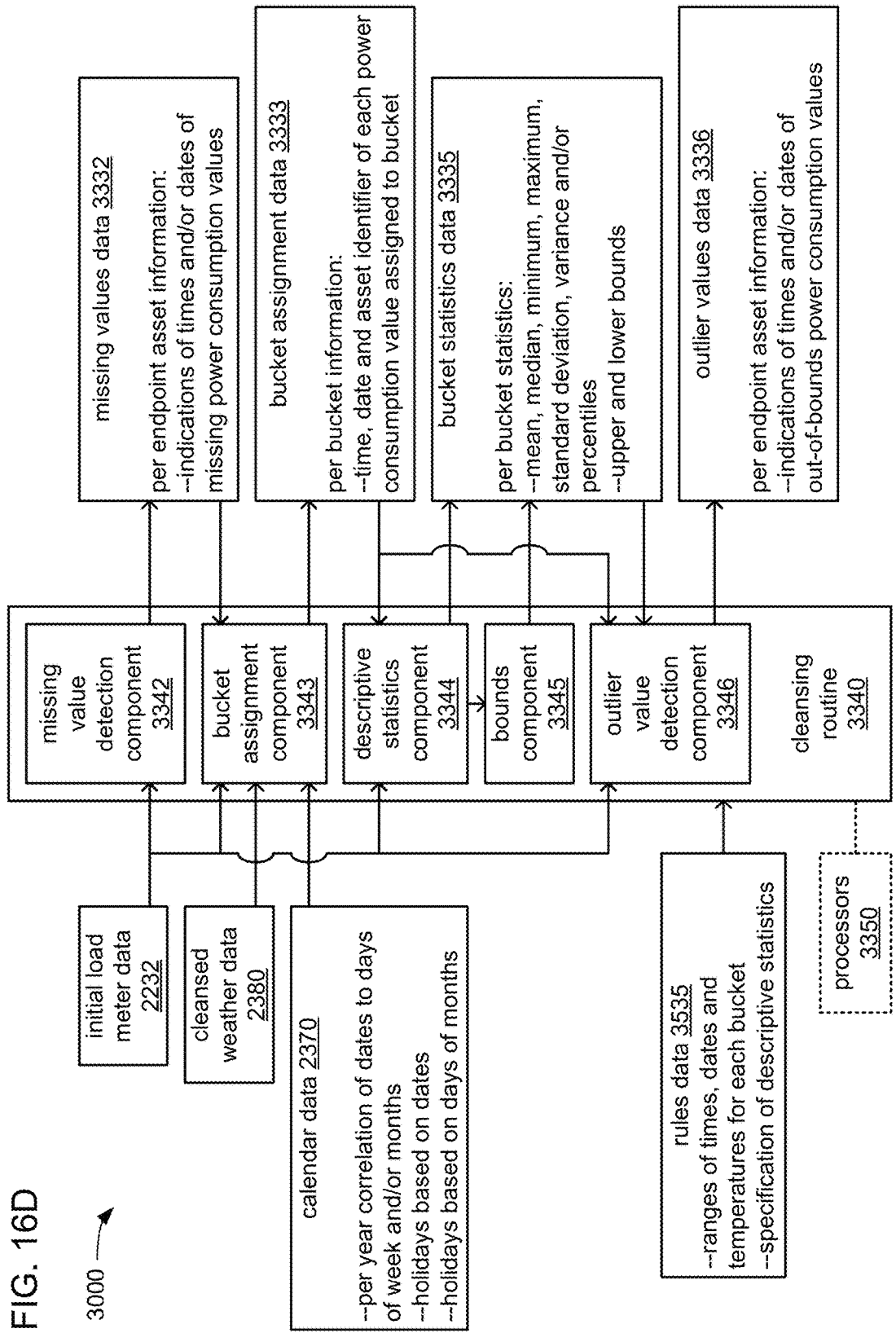
Figure 16E:
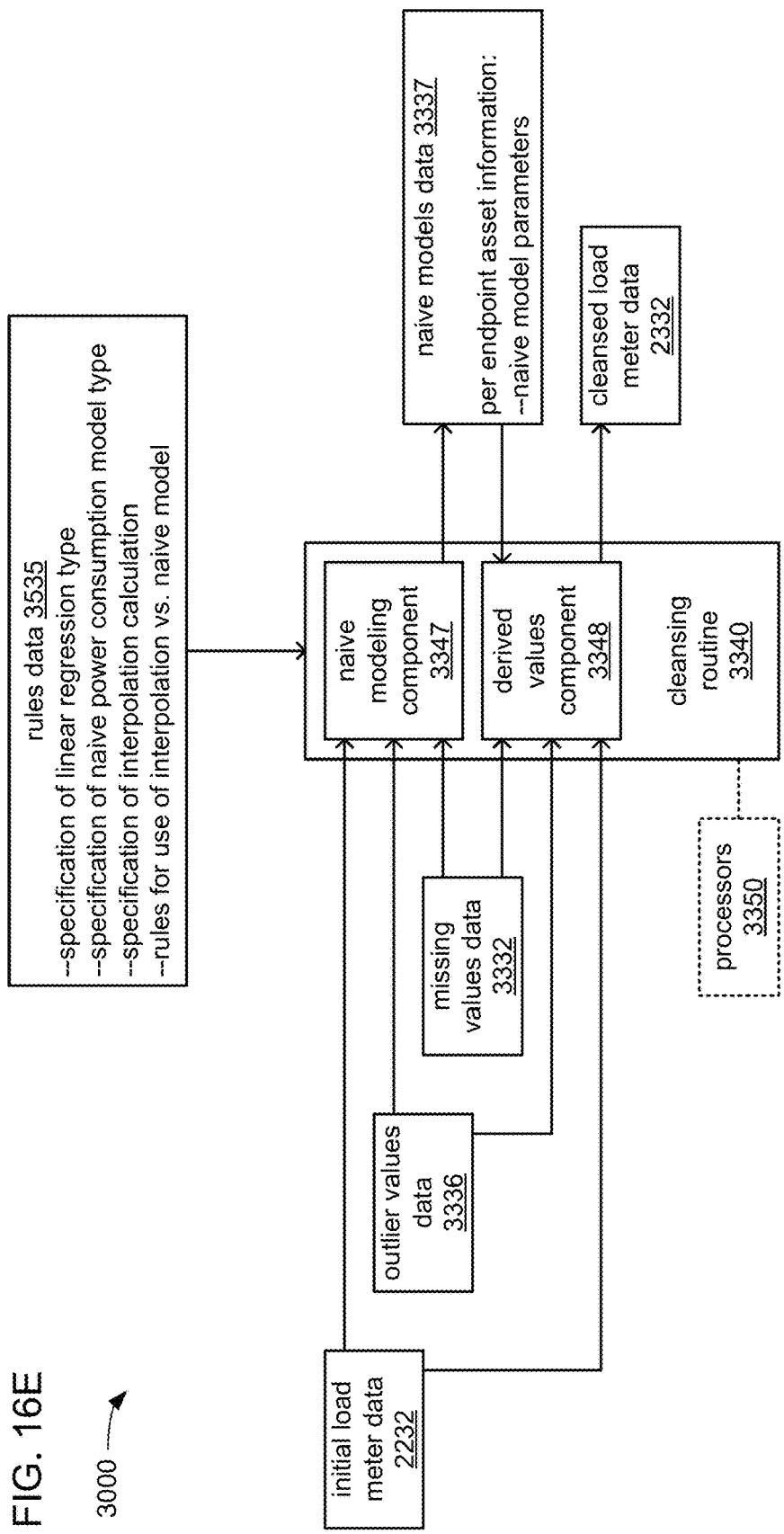

Turning to FIGS. 16D-E, the initial load meter data 2232 is cleansed in a manner substantially similar to what is described just above for cleansing of the initial supply meter data 2231 in FIGS. 16B-C.

As previously discussed, the initial load meter data 2232 may include various pieces of information about each endpoint asset that may be drawn from the raw load meter data 2132 and the asset data 2190, including and not limited to, the type of each endpoint asset at an endpoint location, geographic location of the endpoint asset(s), location of the endpoint asset(s) within the hierarchy of the power grid, one or more identifiers used to uniquely identify each endpoint asset, and/or indications of endpoint asset(s) being configured for, provided for or otherwise associated with power saving and/or control programs such as demand response (DR) or distributed energy resource (DER) programs. Additionally, for each load meter 3102 that corresponds to one or more endpoint assets at an endpoint location, the initial load meter data 2232 may include a set of power consumption values indicating amounts of power consumed by the endpoint asset(s) at that endpoint location at recurring intervals. However, as also previously discussed, meter and/or connection malfunctions or other issues may result in there being missing measurements in the raw load meter data 2132, and as a result, one or more of the sets of power consumption values within the raw load meter data 2132 may not include a power consumption value for every interval of time throughout the historical time period. Additionally, as will be familiar to those skilled in the art, even without the occurrence of meter and/or connection malfunctions or other issues, various circumstances may arise in the monitoring of the consumption of electric power that may result in errant measurements such that one or more of the sets of power consumption values may include one or more outlier values.

In executing the cleansing routine 3340, the processor(s) 3350 within each node device 3300 may be caused by the missing value detection component 3342 to, for each set of power consumption values corresponding to a load meter 3102, identify any missing power consumption values that prevent that set of power consumption values from forming a complete time series that covers the historical time period. As such missing power consumption values are identified, indications of which interval(s) of time within each set of power consumption values are missing power consumption values (if any) may be stored in a temporary data structure, such as the depicted missing values data 3332.

Again, in further executing the cleansing routine 3340, the processor(s) 3350 within each node device 3300 may be caused by the bucket assignment component 3343 to define a set of meter data value buckets in which each bucket is associated with a different range of weather conditions, or in which each bucket is associated with a different combination of range of weather conditions and range of dates. In some embodiments, the buckets that are defined for use in cleansing power provision values may be the same buckets that are defined for use in cleansing power consumption values, and indeed, may be used by the processor(s) 3350 in cleansing both at least partially in parallel. With the buckets so defined, the processor(s) 3350 may be caused to assign each power consumption value that is present within each set of power consumption values to one of the buckets based on the particular weather conditions at the endpoint location of the corresponding load meter at the time and/or date associated with the each power consumption value. As such assignments are made, indications of which bucket that each power consumption value of each set of power consumption values is assigned to may be stored in a temporary data structure, such as the depicted bucket assignment data 3333.

In still further executing the cleansing routine 3340, the processor(s) 3350 within each node device 3300 may be caused by the descriptive statistics component 3344 to derive separate descriptive statistics for the power consumption values assigned to each bucket (as indicated in the bucket assignment data 3333). Again, the particular descriptive statistics that are so derived may be specified in rules data 3535, and for each bucket, these may include and not be limited to, a mean, a median, a minimum, a maximum, a standard deviation, a variance and/or percentiles. With the descriptive statistics for each bucket so derived, the processor(s) 3350 may be caused by the bounds components 3345 to derive separate upper and lower bounds for power consumption values for each bucket. As such descriptive statistics, as well as the upper and lower bounds, are derived for each bucket, such per bucket statistics may be stored in a temporary data structure, such as the depicted bucket statistics data 3335.

In continuing to execute the cleansing routine 3340, the processor(s) 3350 within each node device 3300 may be caused, for each bucket, to use the upper and lower bounds for power consumption values (as stored within the bucket statistics data 3335) to identify outlier power consumption values among those that are assigned to that bucket (again, as indicated in the bucket assignment data 3333). As such outlier power consumption values are identified, indications of which interval(s) of time within each set of power consumption values have outlier power consumption values (if any) may be stored in a temporary data structure, such as the depicted outlier values data 3336. As will shortly be explained, each outlier power consumption value may be treated in the same manner as a missing power consumption value. Thus, as with outlier and missing power provision values, in alternate embodiments, such indications of outlier power consumption values may be stored in a converged data structure with the indications of missing power consumption values.

As execution of the cleansing routine 3340 continues, and with both missing and outlier power consumption values identified within each set of power consumption values within the initial load meter data 2232 for each load meter 3102, the processor(s) 3350 are caused to use the remaining power consumption values within each set of power consumption values (i.e., those within each set that are not missing and that are not identified as outliers) through linear regression to derive a separate naive power consumption model for the power consumption values of each load meter 3102. The rules data 3535 may specify aspects of the linear regression performed and/or the naive power consumption model type. As each naive power consumption model is derived for one of the sets of power consumption values of one of the load meters 3102, indications of at least the parameters of each naive power consumption model may be stored in a temporary data structure, such as the depicted naive models data 3337.

As execution of the cleansing routine 3340 still continues, and with a separate naive power consumption model generated for each set of power consumption values corresponding to one of the load meters 3102, the processor(s) 3350 may be caused by the derived values component 3348 to use the indications of missing power consumption values stored in the missing values data 3332 and/or the indications of outlier power consumption values stored in the outlier values data 3336 to determine the width of each gap of one or more missing and/or outlier power consumption values that is present in one or more of the sets of power consumption values. In other words, for each set of power consumption values, the quantity of power consumption values that are needed to replace each missing and/or outlier power consumption value within each gap to form a fully complete time series of power consumption values is determined.

In some embodiments, the processor(s) 3350 may be caused to select from among multiple approaches to deriving power consumption values to fill each such gap based on its width. By way of example, in some embodiments, the rules data 3535 may specify a predetermined threshold quantity of missing and/or outlier power consumption values that is used in making such a selection, which could be a different quantity from the predetermined threshold quantity of missing and/or outlier power provision values. Thus, in such embodiments, for each gap having a quantity of consecutive missing and/or outlier power consumption values that exceeds the predetermined threshold quantity of power consumption values, the processor(s) 3350 may be caused to use the corresponding naive power consumption model to derive each of the power consumption values needed to fill that gap. However, for each gap having a quantity of consecutive missing and/or outlier power consumption values that does not exceed the predetermined threshold quantity of power consumption values, the processor(s) 3350 may be caused to use interpolation based on the power consumption values adjacent to each end of the gap to derive each of the power consumption values needed to fill that gap.

For each set of power consumption values within the initial load meter data 2232 that has no gaps (i.e., no missing or outlier power consumption values), the processor(s) 3350 may be caused to simply store such sets of power consumption values as part of the cleansed load meter data 2332, since each such set without gaps already forms a fully completed time series of power consumption values. Also, as the gaps are filled within each set of power consumption values that are identified as having gaps (i.e., having one or more missing and/or outlier power consumption values), the processor(s) 3350 may store such newly completed sets of power consumption values also as part of the cleansed load meter data 2332, since each such set now forms a fully completed time series of power consumption values.

Turning back to FIG. 14C, as depicted, the processor(s) 3350 of each of the node devices 3300 may be caused to execute the modeling routine 3440, at least partially in parallel, to generate champion models, as well as accompanying second-stage short range and long range models, from the merged meter data 2333. FIGS. 17A, 17B, 17C and 17D depict aspects of the execution of the modeling routine 3440 in greater detail.

Turning to FIG. 17A, as depicted, the economic data 2460 may include various pieces of information about economic conditions at various locations within the geographic area covered by the power grid, including and not limited to, indications of where the various locations are (e.g., geographic coordinates, zip codes, street names, names of neighborhoods, etc.), and/or indications of economic conditions within each such location over time (e.g., gross domestic product, tax rates, employment rates, average income, etc.). Alternatively or additionally, the economic data 2460 may include various pieces of economic information that is specific to each endpoint location at which there is a load meter 3102, including and not limited to, indications of pricing for power consumed, property value/assessment and/or tax payments (may be drawn from publicly available taxation records), and/or pricing for participation on power control or conservation programs such as DR or DER.

As further depicted in FIG. 17A, the modeling routine 3440 of each of the node devices 3300 may include a training data component 3441 and a candidate models fitting component 3442. In executing the modeling routine 3440, the processor(s) 3350 within each node device 3300 may be caused by the training data component to 3441 to retrieve, from the merged meter data 2333, portions of the time series of power provision values for each supply meter 3101 and portions of the time series of power consumption values for each load meter 3102 that fall within a training time period for use as part of training data, which may be stored as the depicted training data 3431. The processor(s) 3350 may also be caused by the training data component 3441 to retrieve, from the cleansed weather data 2380, portions of the time series of weather measurements applicable to the supply locations of each supply meter 3101 and to the endpoint locations of each load meter 3102 during the training time period for use as another part of the training data. The processor(s) 3350 may be further caused by the training data component 3441 to retrieve, from the calendar data 2370, information concerning correlation of dates to days of weeks and/or months of years, and/or holidays that fall within the training time period, also for use as another part of the training data. The processor(s) 3350 may be still further caused by the training data component 3441 to retrieve, from the economic data 2460, portions of economic data that are applicable to the supply locations of each supply meter 3101 and to the endpoint locations of each load meter 3102 during the training time period for use as another part of the training data.

It should be noted that, since at least the merged meter data 2333 (if not also the cleansed weather data 2380) is limited to covering the historical time period, the training time period may be limited to extending within (i.e., being a subset of) the historical time period. The rules data 3535 may specify the start and/or end dates of the training time period, and may do so by specifying a calculation for the derivation of the start and/or end dates of the training time period from the start and/or end dates of the historical time period.

In further executing the modeling routine 3440, the processor(s) 3350 within each node device 3300 may be caused by the candidate models fitting component 3442 to use the training data (which, again, may be stored as the training data 3431) in multiple performances of linear regression to generate a set of candidate power provision models of a preselected set of candidate power provision model types for each time series of power provision values within the training data, and to correspondingly generate a set of candidate power consumption models of a preselected set of candidate power consumption model types for each time series of power consumption values within the training data. The rules data 3535 may specify aspects of each preselected candidate power provision model type of the preselected set of candidate power provision models, and/or may specify aspects of each preselected candidate power consumption model type of the preselected set of candidate power consumption model types. As each set of candidate power provision models is generated, indications of at least the parameters of each candidate power provision model of each generated set of candidate power provision models may be stored as part of the depicted candidate models data 3432. Correspondingly, as each set of candidate power consumption models is generated, indications of at least the parameters of each candidate power consumption model of each generated set of candidate power consumption models may also be stored as part of the depicted candidate models data 3432.

Figure 17B:
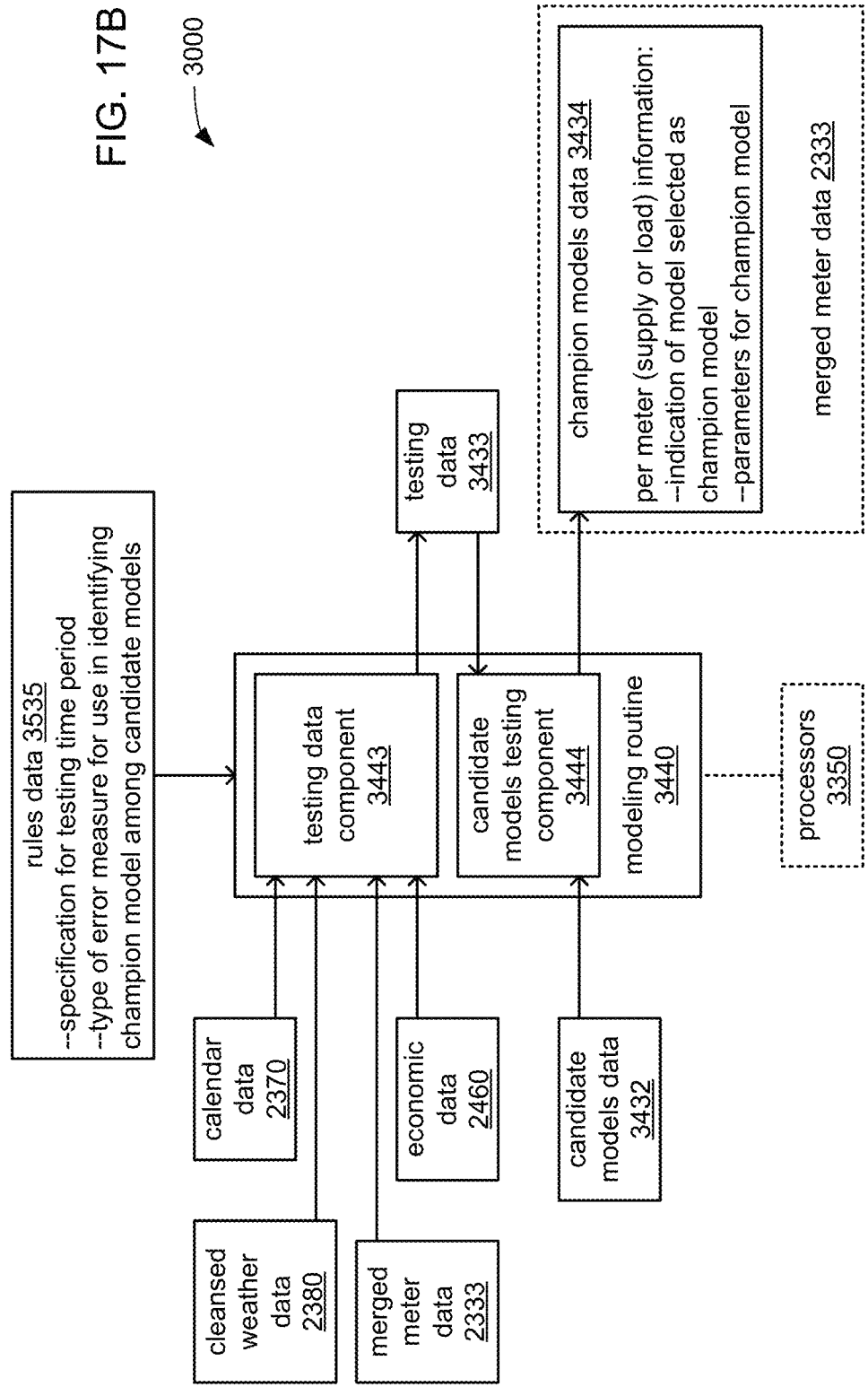

Turning to FIG. 17B, as depicted, the modeling routine 3440 of each of the node devices 3300 may further include a testing data component 3443 and a candidate models testing component 3444. As execution of the modeling routine 3440 continues, and with a set of candidate power provision models generated for each supply meter 3101 and a set of candidate power consumption models generated for each load meter 3102, the processor(s) 3350 may be caused by the testing data component 3443 to retrieve, from the merged meter data 2333, portions of the time series of power provision values for each supply meter 3101 and portions of the time series of power consumption values for each load meter 3102 that fall within a testing time period for use as part of testing data, which may be stored as the depicted training data 3433. The processor(s) 3350 may also be caused by the testing data component 3443 to retrieve, from the cleansed weather data 2380, portions of the time series of weather measurements applicable to the supply locations of each supply meter 3101 and to the endpoint locations of each load meter 3102 during the testing time period for use as another part of the testing data. The processor(s) 3350 may be further caused by the testing data component 3443 to retrieve, from the calendar data, information concerning correlation of dates to days of weeks and/or months of years, and/or holidays that fall within the testing time period, also for use as another part of the training data. The processor(s) 3350 may be still further caused by the testing data component 3443 to retrieve, from the economic data 2460, portions of economic data that are applicable to the supply locations of each supply meter 3101 and to the endpoint locations of each load meter 3102 during the testing time period for use as another part of the testing data.

As with the training time period, it should be noted that, since at least the merged meter data 2333 (if not also the cleansed weather data 2380) is limited to covering the historical time period, the testing time period may also be limited to extending within (i.e., being a subset of) the historical time period. The rules data 3535 may specify the start and/or end dates of the testing time period, and may do so by specifying a calculation for the derivation of the start and/or end dates of the training time period from the start and/or end dates of the training time period and/or the historical time period.

In further executing the modeling routine 3440, the processor(s) 3350 within each node device 3300 may be caused by the candidate models testing component 3444 to use the testing data (which, again, may be stored as the testing data 3433) to test the degree of accuracy of each candidate power provision model within each set of power provision models to identify a champion power provision model within each set of candidate power provision models. Correspondingly, the processor(s) 3350 within each node device 3300 may be caused by the candidate models testing component 3444 to also use the testing data to test the degree of accuracy of each candidate power consumption model within each set of power consumption models to identify a champion power consumption model within each set of candidate power consumption models. The rules data 3535 may specify aspects of the type of error measure and/or other criteria used in selecting champion power provision models and champion power consumption models. As each champion power provision model and each champion power consumption model is identified, indications of which candidate power provision model is identified as the champion in each set of candidate power provision models and indications of which candidate power consumption model is identified as the champion in each set of candidate power consumption models may be stored, along with their parameters, as part of the depicted champion models data 3434. As also depicted, in some embodiments, the merged meter data 2333 may be augmented to include the champion models data 3434.

Figure 17C:
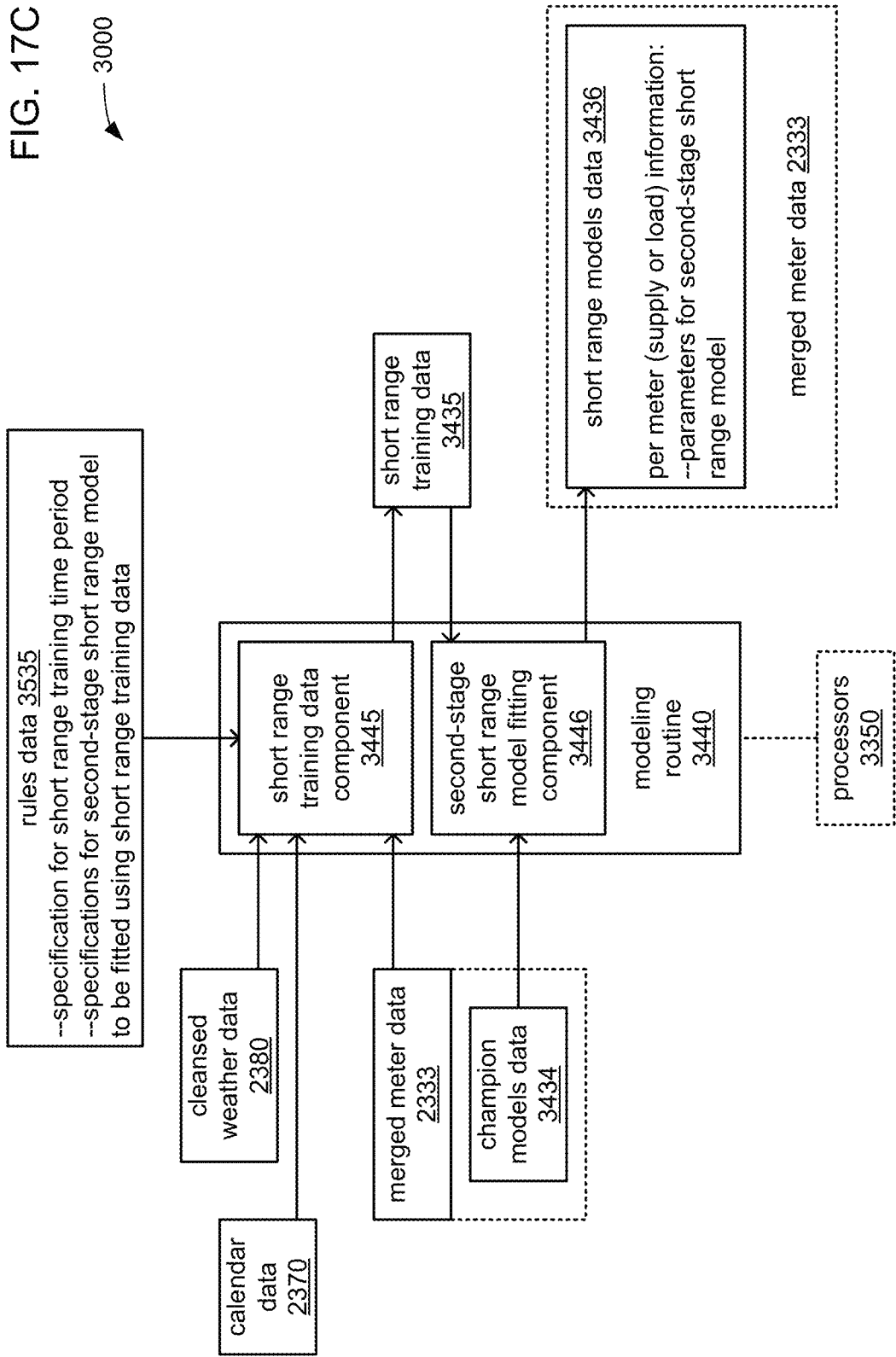

Turning to FIG. 17C, as depicted, the modeling routine 3440 of each of the node devices 3300 may further include a short range training data component 3445 and a second-stage short range model fitting component 3446. As execution of the modeling routine 3440 continues, and with a champion power provision model provided for each supply meter 3101 and a champion power consumption model provided for each load meter 3102, the processor(s) 3350 may be caused by the short range training data component 3445 to retrieve, from the merged meter data 2333, portions of the time series of power provision values for each supply meter 3101 and portions of the time series of power consumption values for each load meter 3102 that fall within a short range training time period for use as part of short range training data, which may be stored as the depicted short range training data 3435. The processor(s) 3350 may also be caused by the short range training data component 3445 to retrieve, from the cleansed weather data 2380, portions of the time series of weather measurements applicable to the supply locations of each supply meter 3101 and to the endpoint locations of each load meter 3102 during the short range training time period for use as another part of the short range training data. The processor(s) 3350 may be further caused by the short range training data component 3445 to retrieve, from the calendar data, information concerning correlation of dates to days of weeks and/or months of years, and/or holidays that fall within the short range training time period, also for use as another part of the short range training data. As previously discussed, research by the inventors hereof has lead to the determination that economic factors does not exert nearly as significant an influence over relatively short range time periods, and so it may be that no part of the economic data 2460 is used as part of the short range training data.

As with the training time period and the testing time period, the short range training time period may also be limited to extending within (i.e., being a subset of) the historical time period. The rules data 3535 may specify the start and/or end dates of the short range training time period, and may do so by specifying a calculation for the derivation of the start and/or end dates of the short range training time period from the start and/or end dates of the training time period, the testing time period and/or the historical time period.

In further executing the modeling routine 3440, the processor(s) 3350 within each node device 3300 may be caused by the second-stage short range model fitting component 3446 to use the short range training data (which, again, may be stored as the short range training data 3435), along with the stored information in the champion models data 3434 concerning the separate champion power provision model provided for each supply meter 3101, to generate a corresponding second-stage short range power provision model for each champion power provision model. Correspondingly, the processor(s) 3350 within each node device 3300 may be caused by the second-stage short range model fitting component 3446 to use the short range training data, along with the stored information in the champion models data 3434 concerning the separate champion power consumption model provided for each load meter 3102, to generate a corresponding second-stage short range power consumption model for each champion power consumption model. In this way, and as previously discussed, where a champion power provision model or champion power consumption model is used in making a prediction that covers a short range prediction time period, the corresponding second-stage short range power provision model or second-stage short range power consumption model may be used to counteract the overfitting that may otherwise occur for a short range prediction time period that may be substantially shorter than the training time period originally used in generating the champion power provision models and champion power consumption models.

Figure 17D:
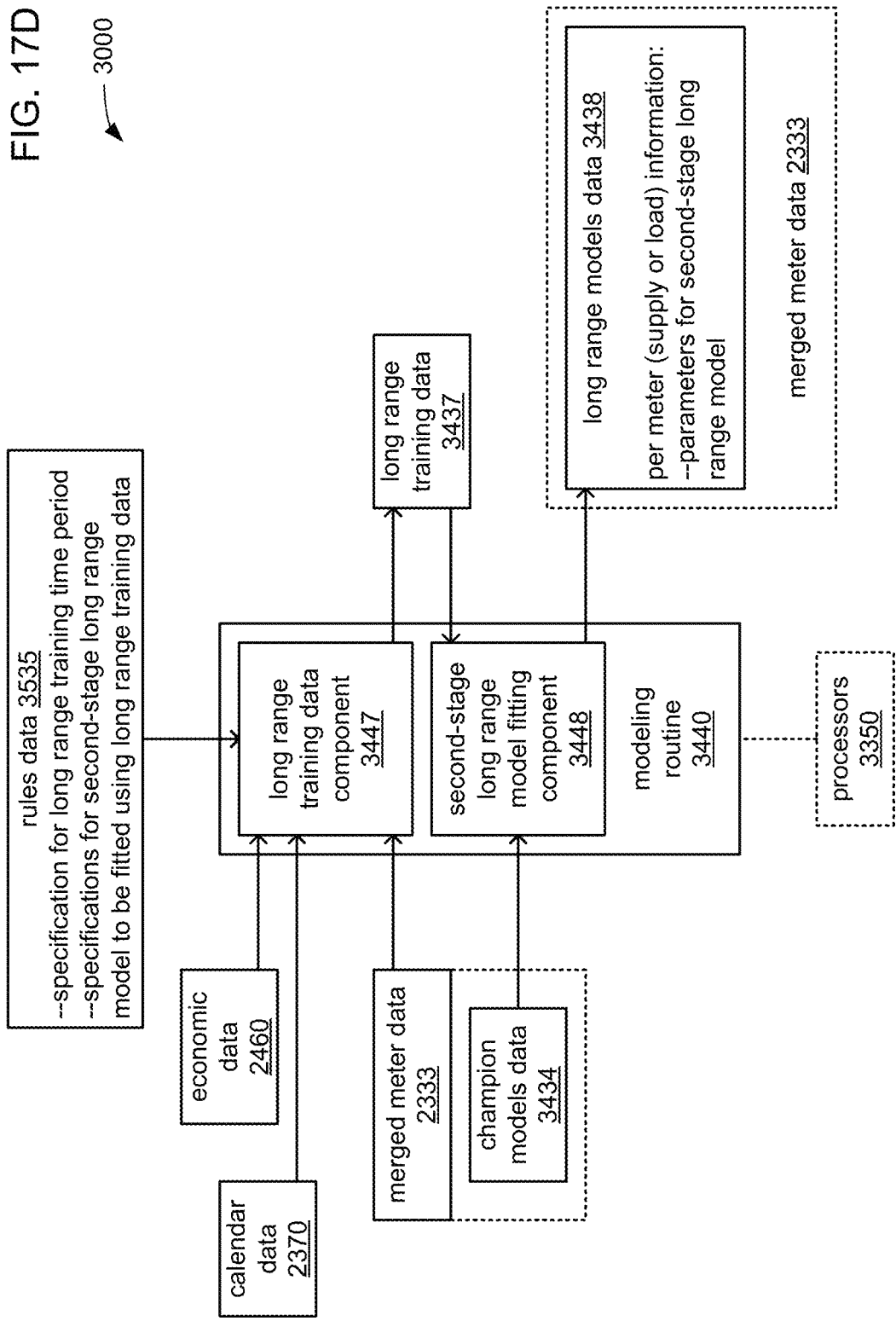

Turning to FIG. 17D, as depicted, the modeling routine 3440 of each of the node devices 3300 may further include a long range training data component 3447 and a second-stage long range model fitting component 3448. As execution of the modeling routine 3440 continues, and with a champion power provision model provided for each supply meter 3101 and a champion power consumption model provided for each load meter 3102, the processor(s) 3350 may be caused by the long range training data component 3447 to retrieve, from the merged meter data 2333, portions of the time series of power provision values for each supply meter 3101 and portions of the time series of power consumption values for each load meter 3102 that fall within a long range training time period for use as part of long range training data, which may be stored as the depicted long range training data 3437. The processor(s) 3350 may also be caused by the long range training data component 3447 to retrieve, from the economic data 2460, portions of economic data that are applicable to the supply locations of each supply meter 3101 and to the endpoint locations of each load meter 3102 during the long range training time period for use as another part of the long range training data. The processor(s) 3350 may be further caused by the long range training data component 3447 to retrieve, from the calendar data, information concerning correlation of dates to days of weeks and/or months of years, and/or holidays that fall within the long range training time period, also for use as another part of the long range training data. As previously discussed, research by the inventors hereof has lead to the determination that weather does not exert nearly as significant an influence over relatively long range time periods, and so it may be that no part of the cleansed weather data 2380 is used as part of the long range training data.

As with the training time period and the testing time period, the long range training time period may also be limited to extending within the historical time period. The rules data 3535 may specify the start and/or end dates of the long range training time period, and may do so by specifying a calculation for the derivation of the start and/or end dates of the long range training time period from the start and/or end dates of the training time period, the testing time period and/or the historical time period.

In further executing the modeling routine 3440, the processor(s) 3350 within each node device 3300 may be caused by the second-stage long range model fitting component 3448 to use the long range training data (which, again, may be stored as the long range training data 3437), along with the stored information in the champion models data 3434 concerning the separate champion power provision model provided for each supply meter 3101, to generate a corresponding second-stage long range power provision model for each champion power provision model. Correspondingly, the processor(s) 3350 within each node device 3300 may be caused by the second-stage long range model fitting component 3446 to use the long range training data, along with the stored information in the champion models data 3434 concerning the separate champion power consumption model provided for each load meter 3102, to generate a corresponding second-stage long range power consumption model for each champion power consumption model. In this way, and as previously discussed, where a champion power provision model or champion power consumption model is used in making a prediction that covers a long range prediction time period, the corresponding second-stage long range power provision model or second-stage long range power consumption model may be used to counteract the overfitting that may otherwise occur for a long range prediction time period that may be substantially longer than the training time period originally used in generating the champion power provision models and champion power consumption models.

Figure 18A:
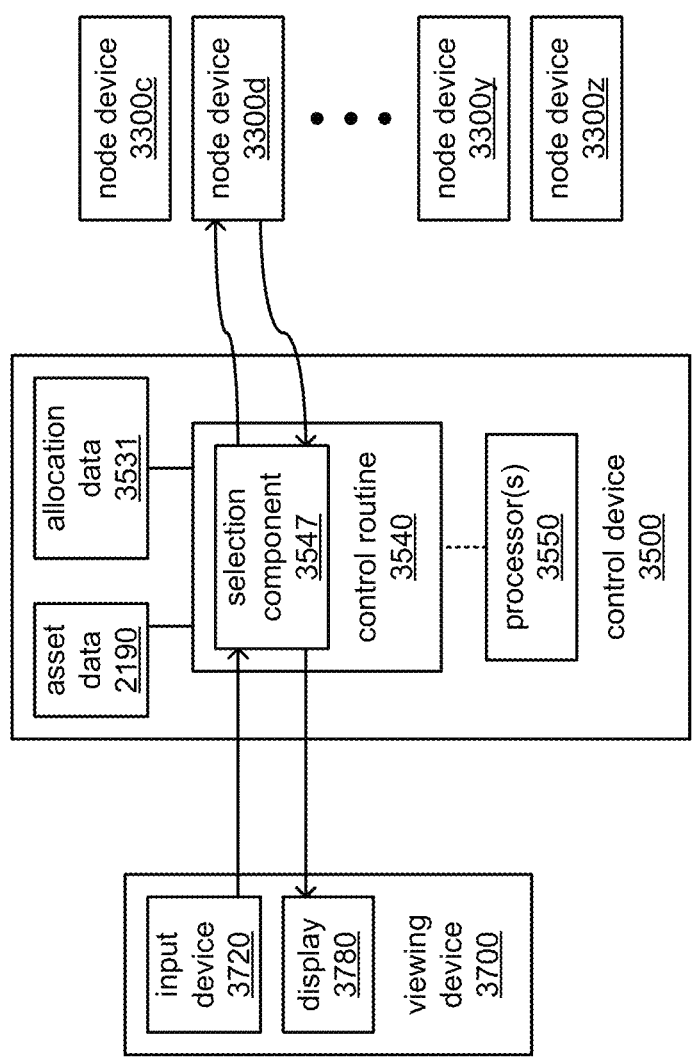
FIGS. 18A and 18B, together, illustrate an example of use of the models of FIGS. 17A-D in making a prediction of power provision or consumption.
Figure 18B:
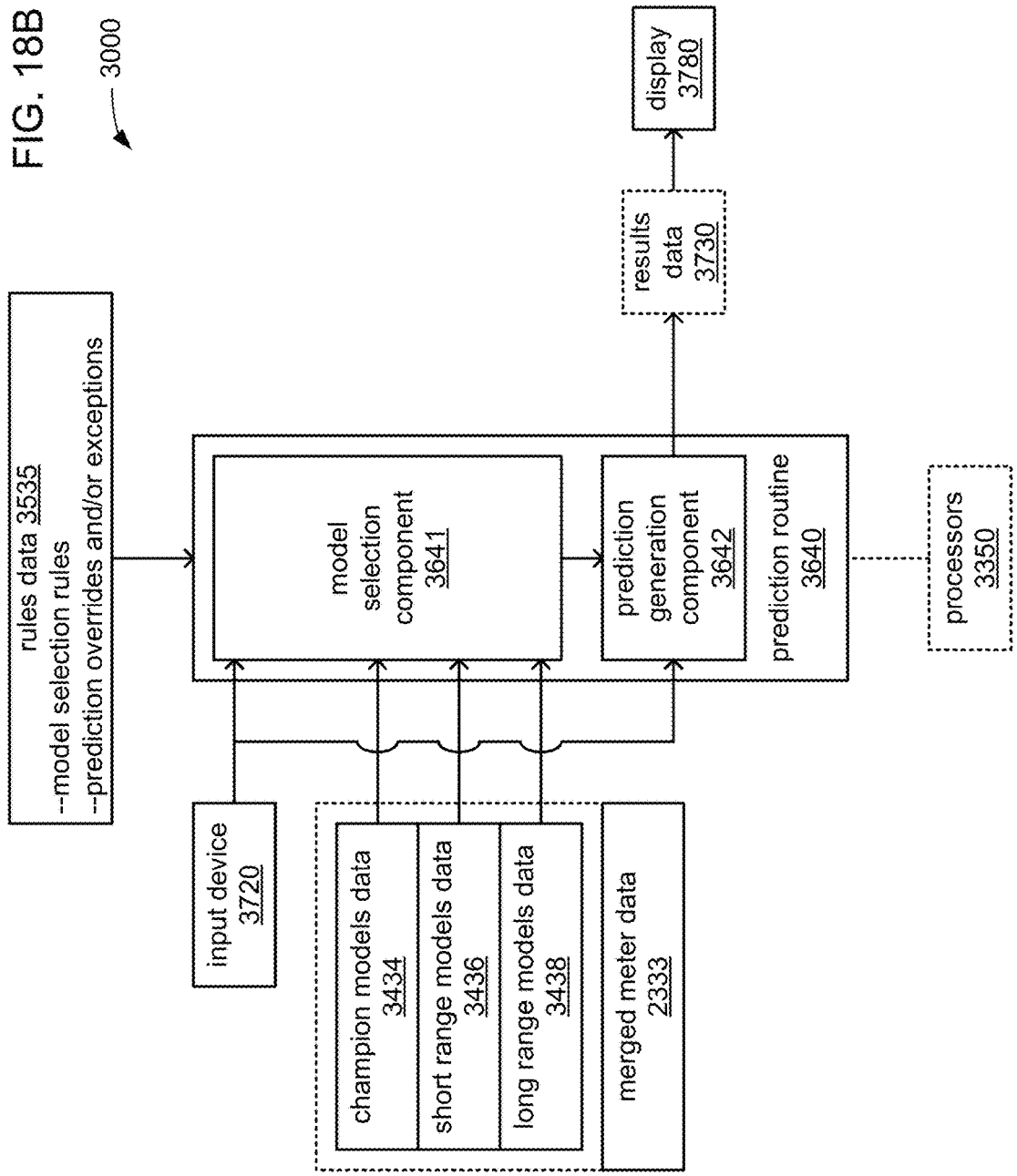

FIGS. 18A and 18B, together, illustrate an example overview of the distributed processing performed by at least the node devices 3300, as coordinated by the control device 3500, to make a short range, mid range or long range prediction concerning power provision and/or power consumption concerning at least a portion of the power grid 2000. FIG. 18A provides an overview of an example of selection, by the control device 3500, of one or more node devices 3300 to perform operations in making a prediction in response to receiving a request for the prediction. FIG. 14B provides an overview of an example of using champion model(s), corresponding second-stage short range model(s) and/or corresponding second-stage long range model(s) in making the requested prediction.

Turning to FIG. 18A, as depicted, the control routine 3540 of the control device 3500 may include a selection component 3547. In executing the control routine 3540, the processor(s) 3550 of the control device 3500 may be caused by the selection component 3547, and in response to the receipt of a request from the viewing device 3700 (which may be entered via the input device 3720) for a power provision and/or power consumption prediction concerning a particular specified portion of the power grid 2000, to retrieve and use the asset data 2190 to determine what supply and/or endpoint locations are included in the specified portion of the power grid. Upon identifying one or more supply and/or endpoint locations that are so included, and thereby identifying one or more corresponding supply meters 3101 and/or load meters 3102, the processor(s) 3550 may be further caused to retrieve and use the allocation data 3531 to identify which one(s) of the node devices 3300 may already store portions of the merged meter data 2333, champion models data 3434, short range models data 3436 and/or long range models data 3438 that correspond to the identified one or more supply meters 3101 and/or load meters 3102 that are included in the portion of the grid specified in the request. Upon so identifying the one or more node devices 3300 that may already store such portions of data, the processor(s) 3550 of the control device may be caused to relay indications of the request to those one or more node devices 3300. In so doing, the processor(s) 3550 may be caused to include an indication of the prediction time period to be covered by the requested prediction, as also specified in the request.

Turning to FIG. 18B, as depicted, the prediction routine 3640 within each of the node devices 3300 may include a model selection component 3641 and a prediction generation component 3642. In response to receiving, from the control device, an indication of the request for a prediction, including an indication of the prediction time period, the processor(s) 3350 within each of the node devices 3300 so signaled by the control device 3500 may analyze the prediction time period to determine whether it is a short range time period, a mid range time period or a long range time period. The processor(s) 3350 of the signaled node device(s) 3300 may be caused by the model selection component 3641 to retrieve the champion power provision models and/or the champion power consumption models from the champion models data 3434 that correspond to the identified one or more supply meters 3101 and/or load meters 3102 for which each of the signaled node device(s) 3300 store such champion models, as well as corresponding time series of power provision values and/or power consumption values, respectively. The processor(s) 3350 within each of the signaled node device(s) 3300 then uses the retrieved champion models and corresponding time series to generate a prediction for each identified supply meter 3101 and/or load meter 3102.

If the prediction time period is determined to be a mid range time period, then the processor(s) 3350 within each of the signaled node device(s) 3300 may then simply transmit the prediction(s) generated through use of the retrieved champion models to the control device 3500 to be assembled to form the requested prediction, which the control device 3500 may then transmit to the viewing device 3700 for presentation (which may be via the display 3780).

Alternatively, if the prediction time period is determined to be a short range time period, then the processor(s) 3350 within each of the signaled node device(s) 3300 may additionally retrieve second-stage short range power provision models and/or second-stage short range power consumption models from the short range models data 3436 that correspond to the retrieved champion models, and may use those second-stage models along with the champion models to additionally generate corresponding second-stage short range predictions to correct for short range overfitting in the predictions generated using the retrieved champion models. The processor(s) 3350 of the signaled node device(s) 3300 may then transmit the corrected predictions to the control device 3500.

Alternatively, if the prediction time period is determined to be a long range time period, then the processor(s) 3350 within each of the signaled node device(s) 3300 may additionally retrieve second-stage long range power provision models and/or second-stage long range power consumption models from the long range models data 3438 that correspond to the retrieved champion models, and may use those second-stage models along with the champion models to additionally generate corresponding second-stage long range predictions to correct for long range overfitting in the predictions generated using the retrieved champion models.

The processor(s) 3350 of the signaled node device(s) 3300 may then transmit the corrected predictions to the control device 3500.

Returning to FIGS. 13A and 13B, in various embodiments, each of the processors 3350, 3550 and 3750 may include any of a wide variety of commercially available processors. Further, one or more of these processors may include multiple processors, a multi-threaded processor, a multi-core processor (whether the multiple cores coexist on the same or separate dies), and/or a multi-processor architecture of some other variety by which multiple physically separate processors are linked.

However, in a specific embodiment, the processor(s) 3550 of the control device 3500 may be selected to efficiently perform allocation of sets of data values associated within individual meters 3101 and/or 3102 among the node devices 3350, and to efficiently perform allocation of tasks among the node devices 3350 to generate and use portions of the merged meter data 2333 and/or each set of models that corresponds to one of the meters 3101 or 3102. Alternatively or additionally, the processor(s) 3350 of each of the node devices 3300 may be selected to efficiently perform a regression analyses to fit power provision and/or power consumption models to power provision and/or power consumption values, respectively, at least partially in parallel. By way of example, the processor(s) 3350 may incorporate a single-instruction multiple-data (SIMD) architecture, may incorporate multiple processing pipelines, and/or may incorporate the ability to support multiple simultaneous threads of execution per processing pipeline.

In various embodiments, each of the storages 3360, 3560 and 3760 may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, non-volatile storage class memory, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

However, in a specific embodiment, the storage 3360 of one or more of the node devices 3300 may be implemented with a redundant array of independent discs (RAID) of a RAID level selected to provide fault tolerance to prevent loss of one or more of these datasets and/or to provide increased speed in accessing one or more of these datasets.

In various embodiments, the input device 3720 may each be any of a variety of types of input device that may each employ any of a wide variety of input detection and/or reception technologies. Examples of such input devices include, and are not limited to, microphones, remote controls, stylus pens, card readers, finger print readers, virtual reality interaction gloves, graphical input tablets, joysticks, keyboards, retina scanners, the touch input components of touch screens, trackballs, environmental sensors, and/or either cameras or camera arrays to monitor movement of persons to accept commands and/or data provided by those persons via gestures and/or facial expressions. In various embodiments, the display 3780 may each be any of a variety of types of display device that may each employ any of a wide variety of visual presentation technologies. Examples of such a display device includes, and is not limited to, a cathode-ray tube (CRT), an electroluminescent (EL) panel, a liquid crystal display (LCD), a gas plasma display, etc. In some embodiments, the display 3780 may be a touchscreen display such that the input device 3720 may be incorporated into the display 3780. In such embodiments, the input device 3720 may be a touch-sensitive component of the display 3780.

In various embodiments, the network interfaces 3390, 3590 and 3790 may employ any of a wide variety of communications technologies enabling these devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processors (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11ad, 802.11ah, 802.11ax, 802.11b, 802.11g, 802.16, 802.20 (commonly referred to as "Mobile Broadband Wireless Access"); the BLUETOOTH® standard; the ZIGBEE® standard; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

However, in a specific embodiment, the network interface 3390 of one or more of the node devices 3300 may be implemented with multiple copper-based or fiber-optic based network interface ports to provide redundant and/or parallel pathways in exchanging the envisioned large quantities of power provision and/or power consumption data with external storage devices, and/or to receive such data from the envisioned vast quantity of meters 3101 and/or 3102.

Figure 19A:
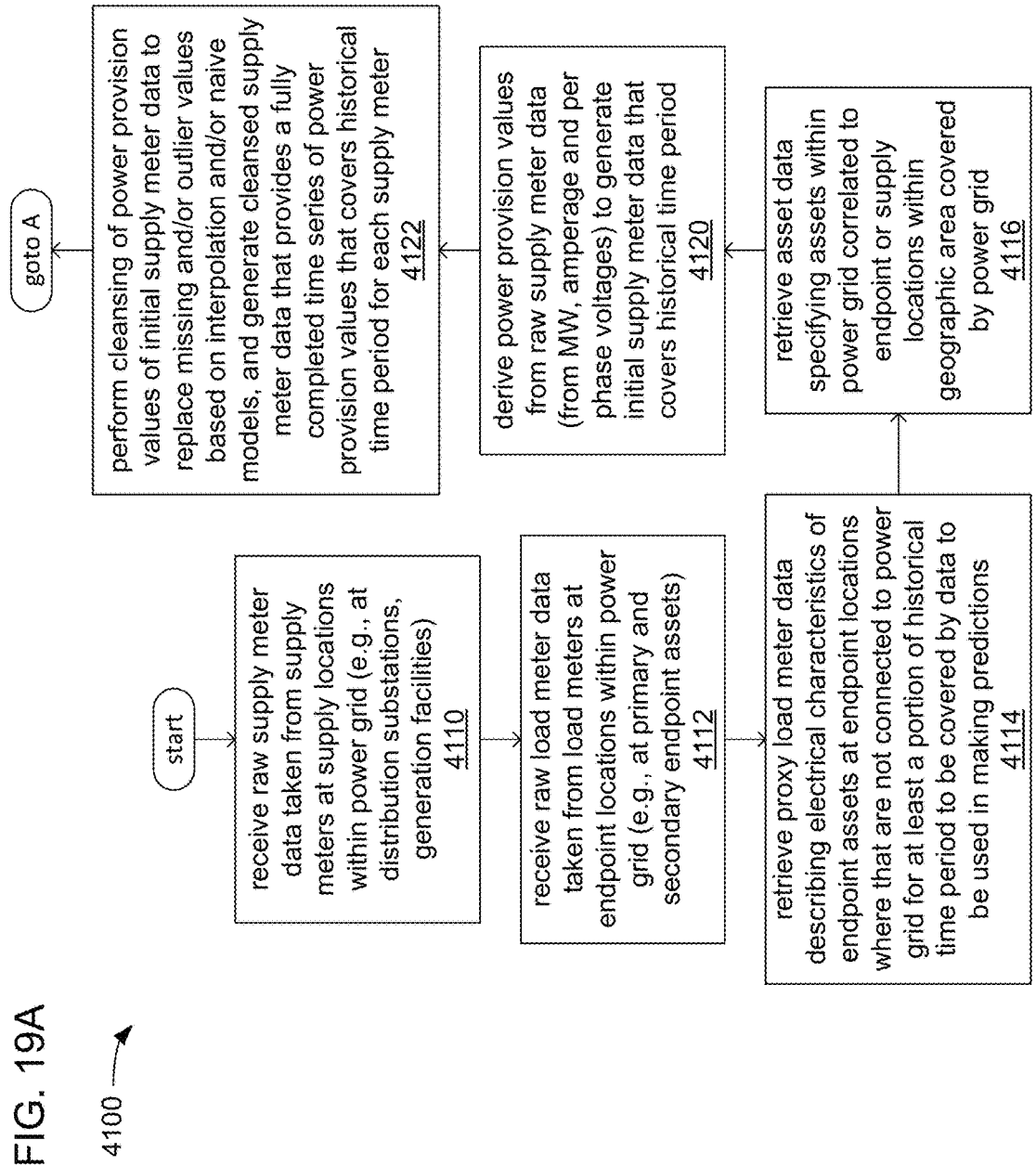
FIGS. 19A and 19B, together, illustrate an example embodiment of a logic flow of integrating portions of raw meter data to generate merged meter data.
Figure 19B:
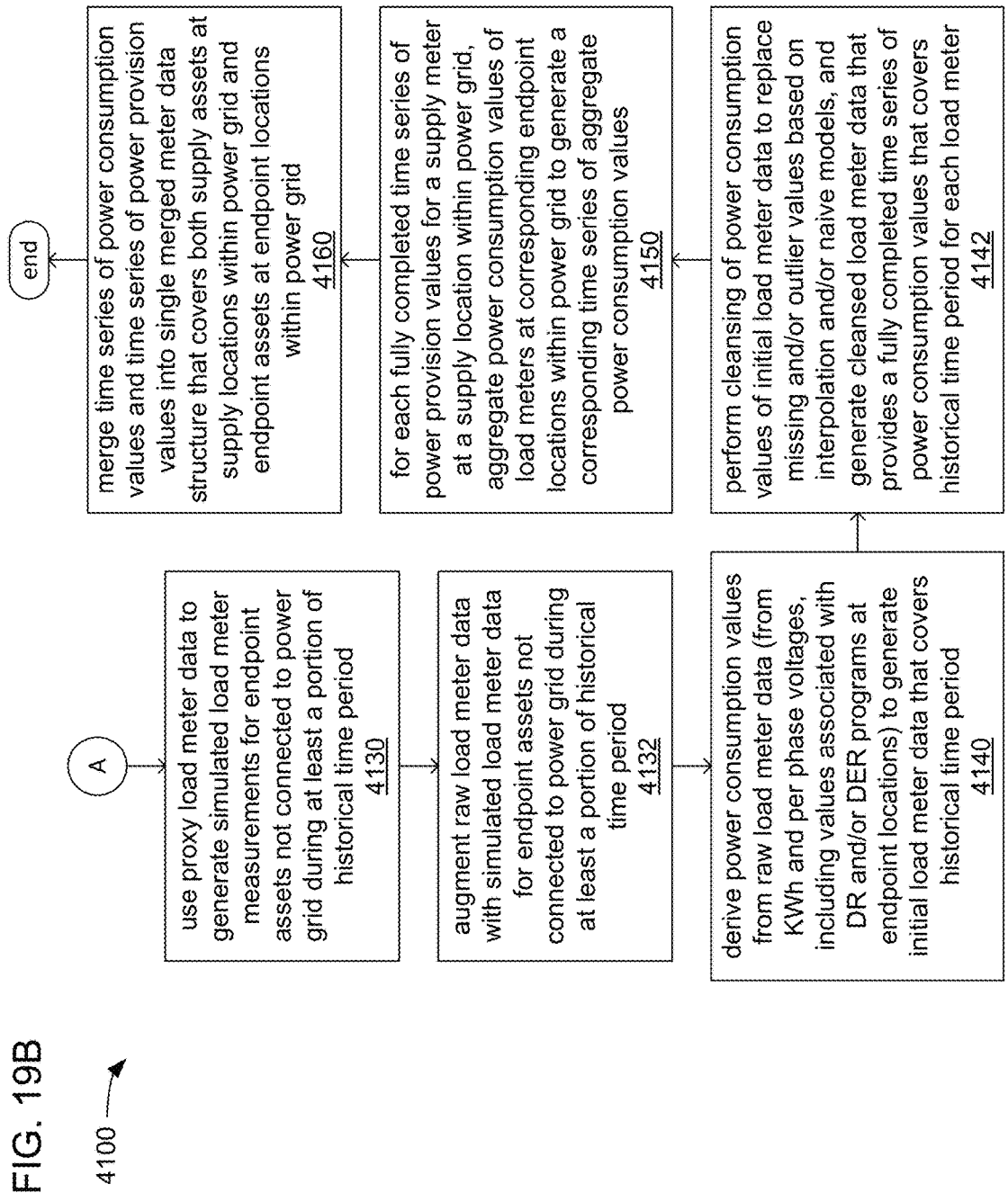

FIGS. 19A and 19B, together, illustrate an example embodiment of a logic flow 4100. The logic flow 4100 may be representative of some or all of the operations executed by one or more embodiments described herein. More specifically, the logic flow 4100 may illustrate operations performed by the processor(s) 3350 and/or the processor(s) 3550, and/or performed by other component(s) of each of the multiple node devices 3300 and/or the control device 3500, respectively, in executing corresponding ones of the integration routine 3240, the cleansing routine 3340 and/or the control routine 3540 to generate the merged meter data 2333 from the raw supply meter data 2131 and the raw load meter data 2132.

At 4110, processor(s) of a node device of a distributed processing system of a power grid (e.g., the processor(s) 3350 of one of the node devices 3300 of the distributed processing system 3000 of the power grid 2000) may receive raw supply meter data that includes measurements taken at intervals by at least a subset of the supply meters of the power grid (e.g., the raw supply meter data 2131 by at least a subset of the supply meters 3101) of various aspects of the provision of electricity at various supply locations of the power grid. As previously discussed, a power grid may include multiple supply assets, such as generating facilities and distribution substations, that may be spread out among multiple supply locations along with corresponding supply meters to take various measurements of the provision of electric power by those supply assets. The raw supply meter data may include, for each supply meter, a set of such measurements taken at intervals by the supply meter (e.g., megawatts, amperage and/or voltage per phase). More precisely, each supply meter may take a combination of measurements concerning provision of power at each interval, and each set of measurements within the raw supply meter data may be made up of multiple ones of such combinations of measurements taken by a single supply meter at those intervals.

At 4112, the processor(s) of the node device may receive raw load meter data that includes measurements taken at intervals by at least a subset of the load meters of the power grid (e.g., the raw load meter data 2132 by at least a subset of the load meters 3102) of various aspects of the consumption of electricity at various endpoint locations of the power grid. As previously discussed, a power grid may include multiple endpoint assets, such as endpoint loads (e.g., industrial machinery or residential appliances) that consume electricity and/or endpoint generators (e.g., solar panels or windmills), that may be spread out among multiple endpoint locations along with corresponding load meters to take various measurements of the consumption of electric power by those endpoint assets. The raw load meter data may include, for each load meter, a set of such measurements taken at intervals by the load meter (e.g., kilowatts and/or voltage per phase). More precisely, each load meter may take a combination of measurements concerning consumption of power at each interval, and each set of measurements within the raw load meter data may be made up of multiple ones of such combinations of measurements taken by a single load meter at those intervals.

At 4114, the processor(s) of the node device may retrieve proxy load meter data (e.g., the proxy load meter data 2130) that includes electrical characteristics of endpoint assets that have not been connected to the power grid (along with their corresponding load meters) for at least a portion of a preselected historical time period. As previously discussed, due to the relatively high frequency with which changes occur at endpoint locations (e.g., remodeling and/or replacement of residences and/or business places such that existing endpoint assets may be disconnected from the power grid for a period of time and/or entirely new endpoint locations with new endpoint assets may be added), there may be numerous endpoint assets that are connected to the power grid during only a portion of the historical time period.

At 4116, the processor(s) of the node device may retrieve asset data that includes indications of what supply and endpoint assets are connected to the power grid, indications of the supply and endpoint locations at which each asset is located, indications of the location of each asset in the hierarchy of the power grid, and correlations of each asset to a supply meter or endpoint meter (e.g., the asset data 2190). As previously discussed, geographical locations may be specified with geographic coordinates and/or street addresses, and each asset and meter may be given one or more types of identifier (e.g., ID numbers, human-readable names, etc.).

At 4120, the processor(s) of the node device may, for each set of measurements taken by a supply meter and stored within the raw supply meter data, derive a corresponding set of power provision values indicative of amounts of power provided within an initial supply meter data (e.g., the initial supply meter data 2231). More precisely, for each combination of measurements taken by a supply meter at an interval in one of the sets of measurements within the raw supply meter data, the processor(s) may derive a corresponding power provision value for the same interval within a corresponding set of power provision values within the initial supply meter data.

At 4122, the processor(s) of the node device may perform a cleansing of the power provision values in each set of power provision values within the initial supply meter data to replace missing power provision values (e.g., where there is an interval for which a power provision value is not provided) and/or outlier power provision values. As previously discussed, due to supply meter malfunctions, network connection malfunctions, and/or still other factors, the set of measurements for a supply meter within the raw supply meter data may include one or more gaps of one or more intervals for which there are no stored measurements, which would then result in a corresponding one or more gaps of one or more intervals for which there are no stored power provision values in the initial supply meter data. As also previously discussed, during such cleansing, a choice may be made among different approaches to deriving power provision values to use in replacing missing or outlier power provision values in each such gap depending on the quantity of consecutive missing and/or outlier power provision values therein. By filling in such gaps, each set of power provision values in which such gaps exist becomes a fully complete time series of power provision values to be stored in a cleansed supply meter data (e.g., the cleansed supply meter data 2331) along with the sets of power provision values that were already so completed.

At 4130, the processor(s) of the node device may, for each combination of load meter and endpoint asset(s) that were not connected to the power grid during a portion of the historical time period, use the proxy load meter data to generate simulated load meter measurements for use in augmenting the corresponding set of measurements within the raw load meter data for that portion of the historical time period, at 4132.

At 4140, the processor(s) of the node device may, for each set of measurements taken by a load meter and stored within the raw load meter data, derive a corresponding set of power provision consumption values indicative of amounts of power consumed within an initial load meter data (e.g., the initial load meter data 2232). More precisely, for each combination of measurements taken by a load meter at an interval in one of the sets of measurements within the raw load meter data, the processor(s) may derive a corresponding power consumption value for the same interval within a corresponding set of power consumption values within the initial load meter data.

At 4142, the processor(s) of the node device may perform a cleansing of the power consumption values in each set of power consumption values within the initial load meter data to replace missing power consumption values (e.g., where there is an interval for which a power consumption value is not provided) and/or outlier power consumption values. As previously discussed, due to load meter malfunctions, network connection malfunctions, and/or still other factors, the set of measurements for a load meter within the raw load meter data may include one or more gaps of one or more intervals for which there are no stored measurements, which would then result in a corresponding one or more gaps of one or more intervals for which there are no stored power consumption values in the initial load meter data. As also previously discussed, during such cleansing, a choice may be made among different approaches to deriving power consumption values to use in replacing missing or outlier power consumption values in each such gap depending on the quantity of consecutive missing and/or outlier power consumption values therein. By filling in such gaps, each set of power consumption values in which such gaps exist becomes a fully complete time series of power consumption values to be stored in a cleansed load meter data (e.g., the cleansed load meter data 2332) along with the sets of power consumption values that were already so completed.

At 4150, the processor(s) of the node device may, for each fully complete time series of power provision values for a supply meter of the power grid, identify the complete time series of power consumption values of each load meter of the power grid to which electric power is provided from the supply location of the supply meter. The processor(s) may then aggregate the power consumption values of those complete time series of power consumption values for those load meters to generate a time series of aggregate power consumption values that corresponds to the complete time series of power provision values of the supply meter.

At 4160, the processor(s) of the node device may merge the cleansed supply meter data and the cleansed load meter data into a single merged meter data structure (e.g., the merged meter data 2333) that includes the complete time series of power provision values and corresponding time series of aggregate power consumption values for each supply meter of the power grid, along with the complete time series of power consumption values for each load meter of the power grid.

Figure 20A:
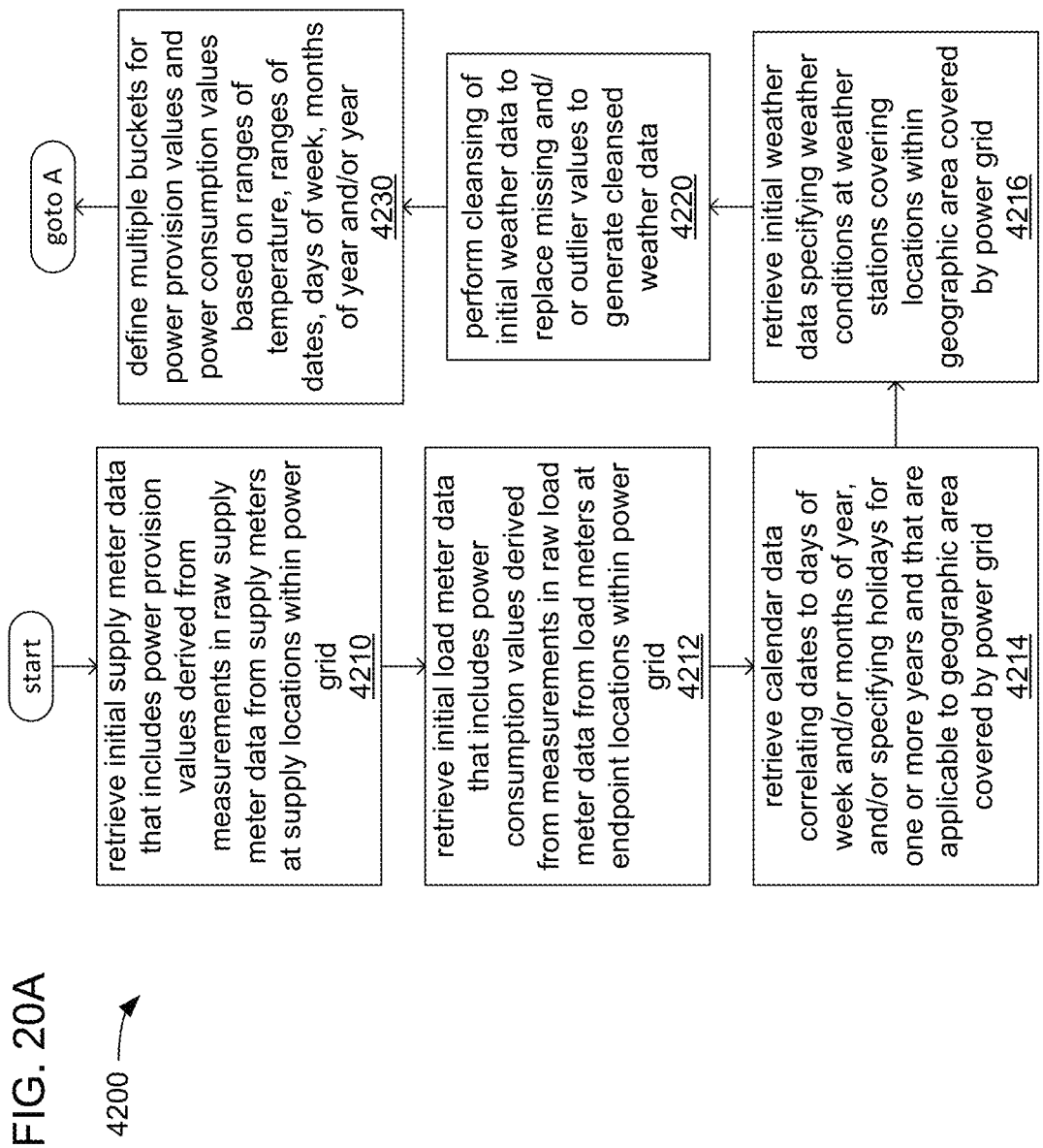
Figure 20B:
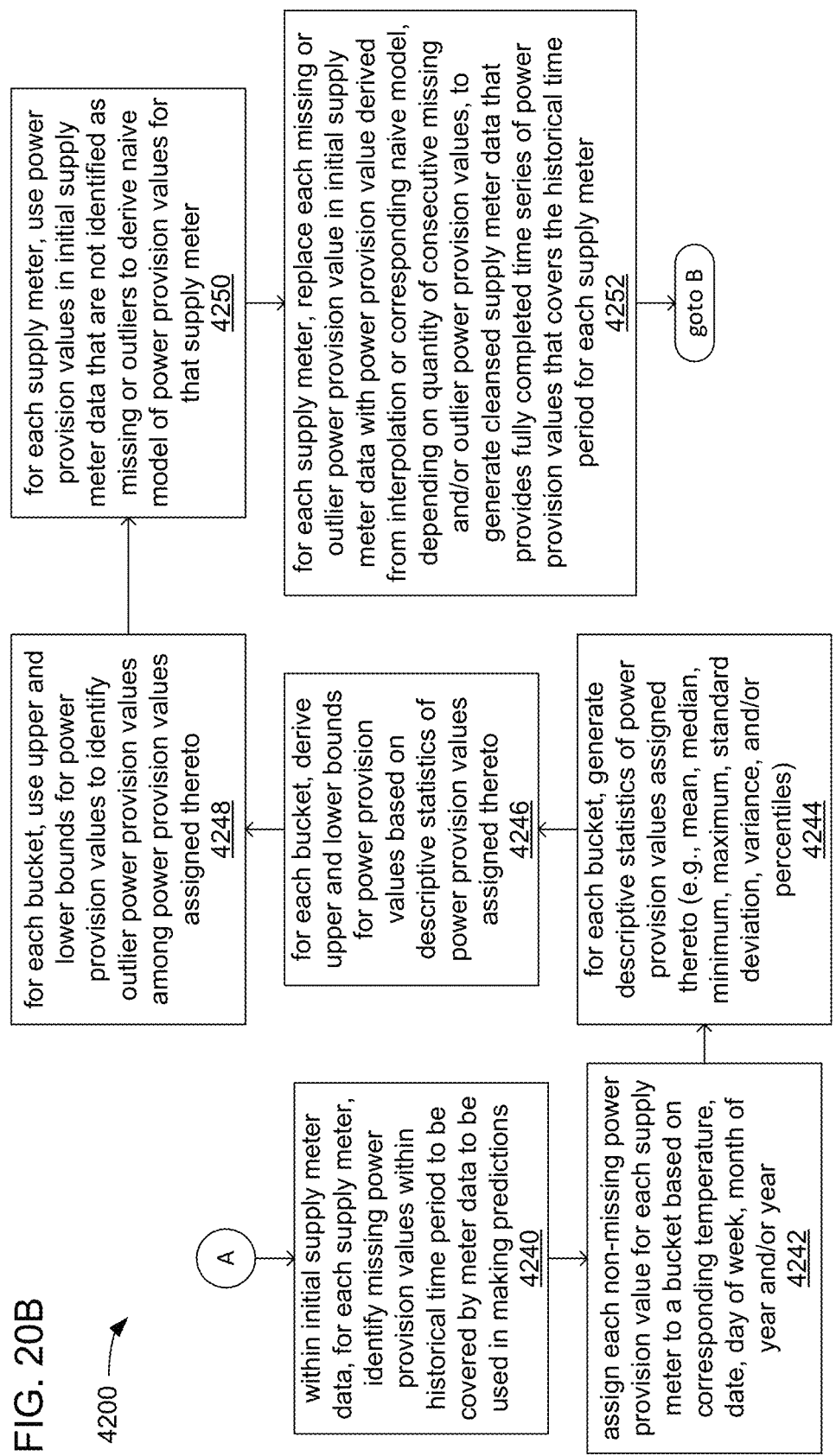

FIGS. 20A, 20B and 20C, together, illustrate an example embodiment of a logic flow 4200. The logic flow 4200 may be representative of some or all of the operations executed by one or more embodiments described herein. More specifically, the logic flow 4200 may illustrate operations performed by the processor(s) 3350 and/or the processor(s) 3550, and/or performed by other component(s) of each of the multiple node devices 3300 and/or the control device 3500, respectively, in executing corresponding ones of the integration routine 3240, the cleansing routine 3340 and/or the control routine 3540 to generate the cleansed supply meter data 2331 and the cleansed load meter data 2332 from the initial supply meter data 2231 and the initial load meter data 2232, respectively.

At 4210, processor(s) of a node device of a distributed processing system of a power grid (e.g., the processor(s) 3350 of one of the node devices 3300 of the distributed processing system 3000 of the power grid 2000) may retrieve initial supply meter data that includes sets of power provision values corresponding to at least a subset of the supply meters of the power grid (e.g., the initial supply meter data 2231 by at least a subset of the supply meters 3101), and that cover a predetermined historical time period. As previously discussed, each set of power provision values in the initial supply meter data is derived from a corresponding set of measurements of various aspects of the provision of electricity taken at intervals by a corresponding supply meter at a corresponding supply location of the power grid.

At 4212, the processor(s) of the node device may retrieve initial load meter data that includes sets of power consumption values corresponding to at least a subset of the load meters of the power grid (e.g., the initial load meter data 2232 by at least a subset of the load meters 3102), and that cover the historical time period. As previously discussed, each set of power consumption values in the initial load meter data is derived from a corresponding set of measurements of various aspects of the consumption of electricity taken at intervals by a corresponding load meter at a corresponding endpoint location of the power grid.

At 4214, the processor(s) of the node device may retrieve calendar data (e.g., the calendar data 2370) that may include, but not be limited to including, correlations of dates to days of weeks and/or months of years, and/or includes indications of dates and/or days of holidays that occur in the geographic area covered by the power grid throughout at least the historical time period.

At 4216, the processor(s) of the node device may retrieve initial weather data (e.g., the initial weather data 2280) that may include, but not be limited to including, indications of weather stations that cover locations within the geographic area covered by the power grid, indications of measurements of weather conditions taken at each such weather station throughout at least the historical time period, and/or indications of particular measuring techniques used in taking measurements of weather conditions (e.g., wet bulb vs. dry bulb temperature measurement technique). The processor(s) of the node device may then perform a cleansing operation with the initial weather data to replace missing and/or outlier weather measurement values, thereby generating cleansed weather data (e.g., the cleansed weather data 2380) at 4220.

At 4230, the processor(s) of the node device may define multiple buckets for power provision values and/or for power consumption values. As previously discussed, in some embodiments, such buckets may be defined by a range of weather measurement values, such as temperatures. However, as also previously discussed, in other embodiments, such buckets may be defined by differing combinations of ranges of weather measurement values and ranges of dates, or combinations of ranges of weather measurement values and days of a week or months of a year. As further previously discussed, in some embodiments, the same buckets may be used for both power provision values and power consumption values, while separate buckets may be used for each in other embodiments.

At 4240, within the initial supply meter data, the processor(s) of the node device may analyze each set of power provision values to identify missing power provision values (if any) within each set. Again, as previously discussed, due to supply meter malfunctions, network connection malfunctions, and/or still other factors, the set of measurements for a supply meter within the raw supply meter data may include one or more gaps of one or more intervals for which there are no stored measurements, which would then result in a corresponding one or more gaps of one or more intervals for which there are no power provision values in the initial supply meter data.

At 4242, the processor(s) of the node device may assign each non-missing power provision value in each set of power provision values to one of the buckets based on the weather conditions and/or based on the time and date at the corresponding supply meter when the corresponding supply meter took the measurements from which that power provision value was derived.

At 4244, the processor(s) of the node device may generate separate descriptive statistics of the power provision values assigned to each bucket, including and not limited to, a mean, a median, a minimum, a maximum, a standard deviation, a variance and/or percentiles. From such descriptive statistics separately generated from the power provision values assigned to each bucket, the processor(s) of the node device may generate separate upper and lower bounds for the power provision values assigned to each bucket at 4246. At 4248, the processor(s) of the node device may, for each bucket, use such upper and lower bounds so derived for that bucket to identify outlier power provision values (if any) among the power provision values assigned to that bucket.

At 4250, the processor(s) of the node device may, for each set of power provision values within the initial supply meter data, use the power provision values that are not missing and that are not identified as outliers to derive a naive power provision model for the power provision values for the corresponding supply meter.

At 4252, the processor(s) of the node device may, within each set of power provision values within the initial supply meter data, replace each missing or outlier power provision value therein with each gap in the set of power provision values with a new power provision value derived from interpolation or the corresponding naive power provision model. As previously discussed, the choice to use interpolation or the corresponding naive power provision model may be based on whether the quantity of consecutive missing and/or outlier power provision values that make up each gap exceeds a predetermined threshold. In so doing, each set of power provision values within the initial supply meter data that included one or more missing and/or outlier power provision values is caused to become a fully complete time series of power provision values that may then be stored as part of a cleansed supply meter data (e.g., the cleansed supply meter data 2331). As also previously discussed, any set of power provision values within the initial supply meter data that do not include any missing or outlier power provision values may simply be copied into the cleansed supply meter data such that the cleansed supply meter data is caused to include a fully complete time series of power provision values for each supply meter of the power grid.

At 4260, within the initial load meter data, the processor(s) of the node device may analyze each set of power consumption values to identify missing power consumption values (if any) within each set. Again, as previously discussed, due to load meter malfunctions, network connection malfunctions, and/or still other factors, the set of measurements for a load meter within the raw load meter data may include one or more gaps of one or more intervals for which there are no stored measurements, which would then result in a corresponding one or more gaps of one or more intervals for which there are no power consumption values in the initial load meter data.

At 4262, the processor(s) of the node device may assign each non-missing power consumption value in each set of power consumption values to one of the buckets based on the weather conditions and/or based on the time and date at the corresponding load meter when the corresponding load meter took the measurements from which that power consumption value was derived.

At 4264, the processor(s) of the node device may generate separate descriptive statistics of the power consumption values assigned to each bucket, including and not limited to, a mean, a median, a minimum, a maximum, a standard deviation, a variance and/or percentiles. From such descriptive statistics separately generated from the power consumption values assigned to each bucket, the processor(s) of the node device may generate separate upper and lower bounds for the power consumption values assigned to each bucket at 4266. At 4268, the processor(s) of the node device may, for each bucket, use such upper and lower bounds so derived for that bucket to identify outlier power consumption values (if any) among the power consumption values assigned to that bucket.

At 4270, the processor(s) of the node device may, for each set of power consumption values within the initial load meter data, use the power consumption values that are not missing and that are not identified as outliers to derive a naive power consumption model for the power consumption values for the corresponding load meter.

At 4272, the processor(s) of the node device may, within each set of power consumption values within the initial load meter data, replace each missing or outlier power consumption value therein with each gap in the set of power consumption values with a new power consumption value derived from interpolation or the corresponding naive power consumption model. As previously discussed, the choice to use interpolation or the corresponding naive power provision model may be based on whether the quantity of consecutive missing and/or outlier power consumption values that make up each gap exceeds a predetermined threshold. In so doing, each set of power consumption values within the initial load meter data that included one or more missing and/or outlier power consumption values is caused to become a fully complete time series of power consumption values that may then be stored as part of a cleansed load meter data (e.g., the cleansed load meter data 2332). As also previously discussed, any set of power consumption values within the initial load meter data that do not include any missing or outlier power consumption values may simply be copied into the cleansed load meter data such that the cleansed load meter data is caused to include a fully complete time series of power consumption values for each load meter of the power grid.

Figure 21A:
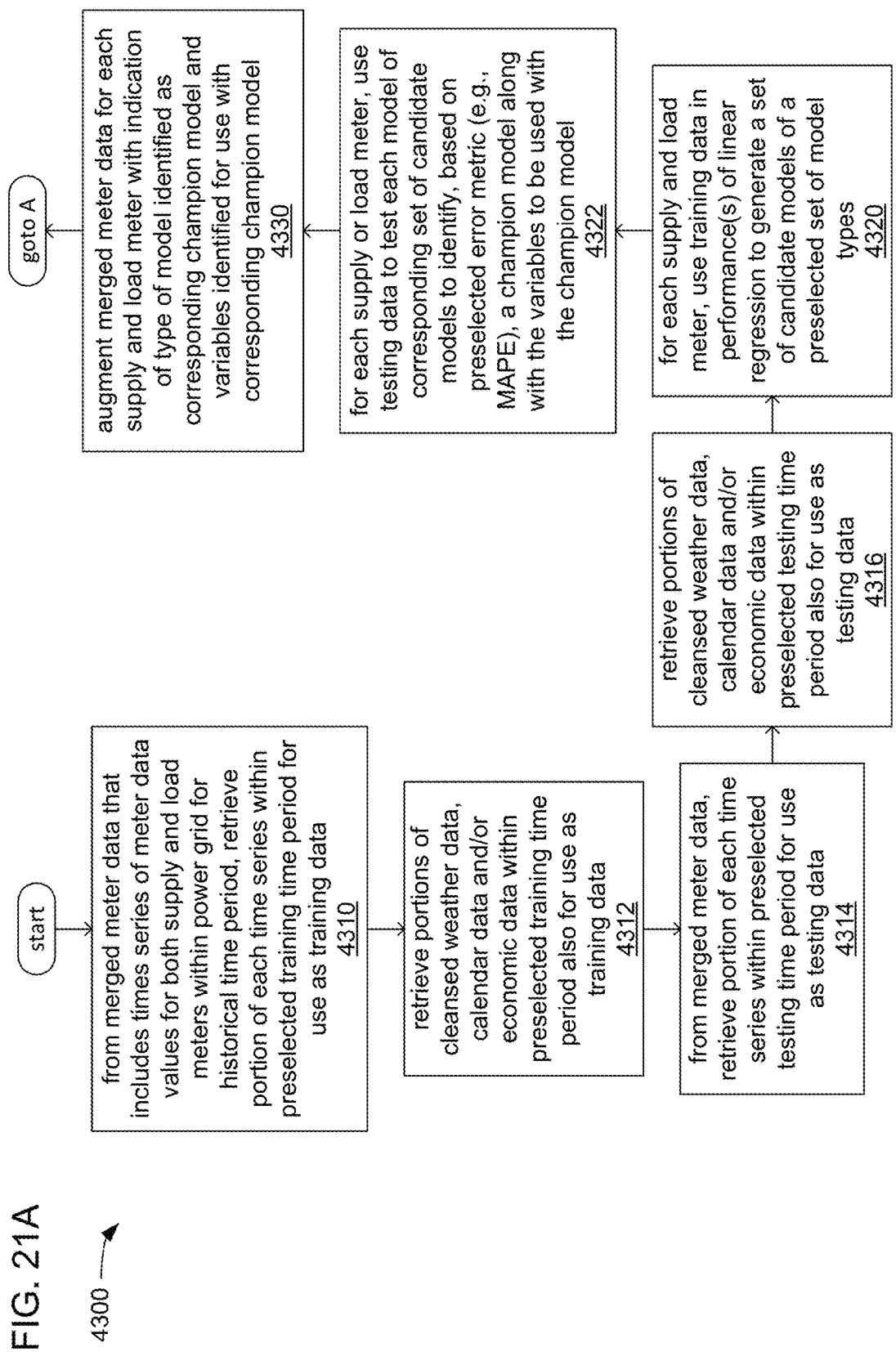
FIGS. 21A and 21B, together, illustrate an example embodiment of a logic flow of deriving models of power provision or consumption using the merged meter data of FIGS. 19A-B.
Figure 21B:
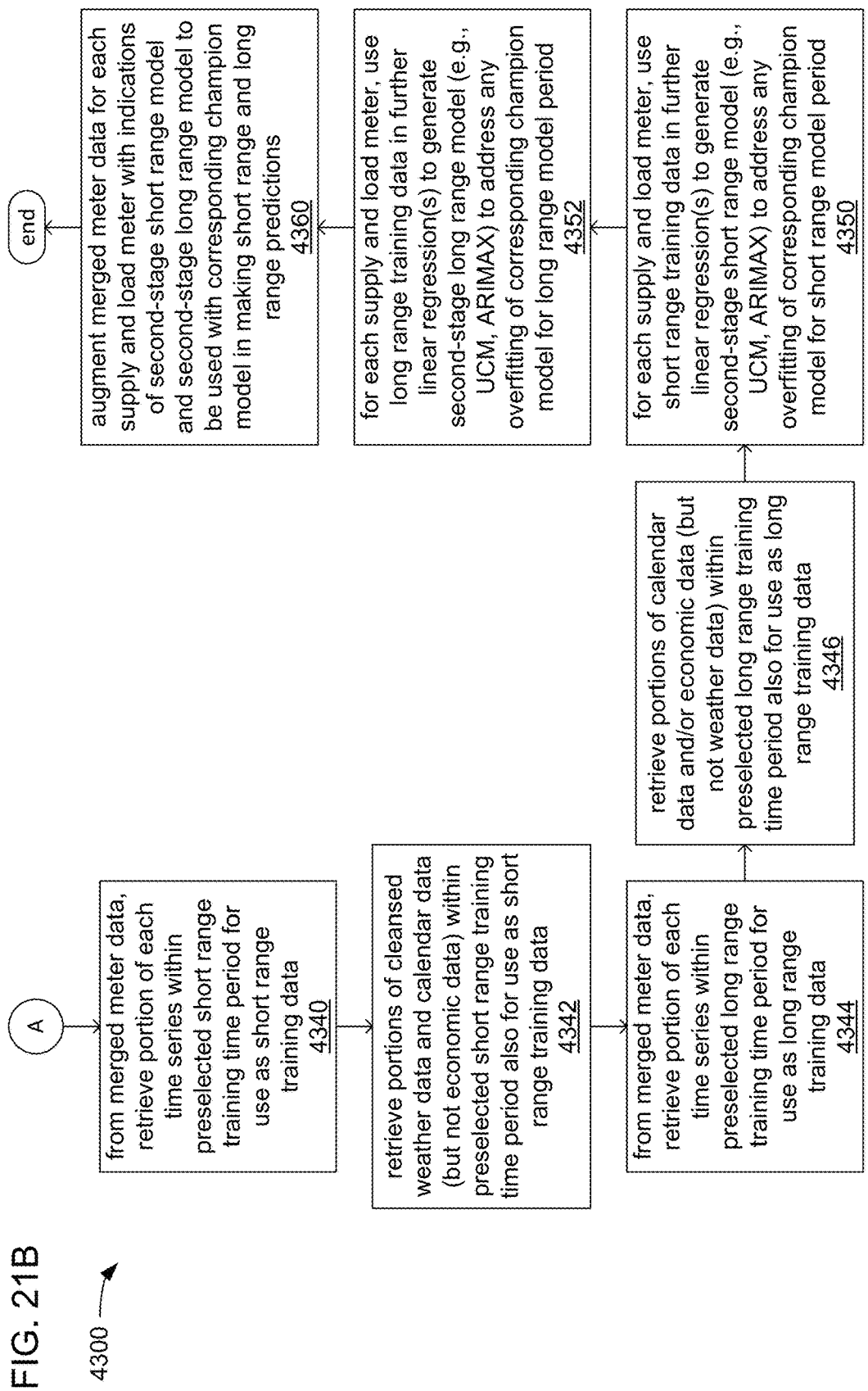
Figure 22A:
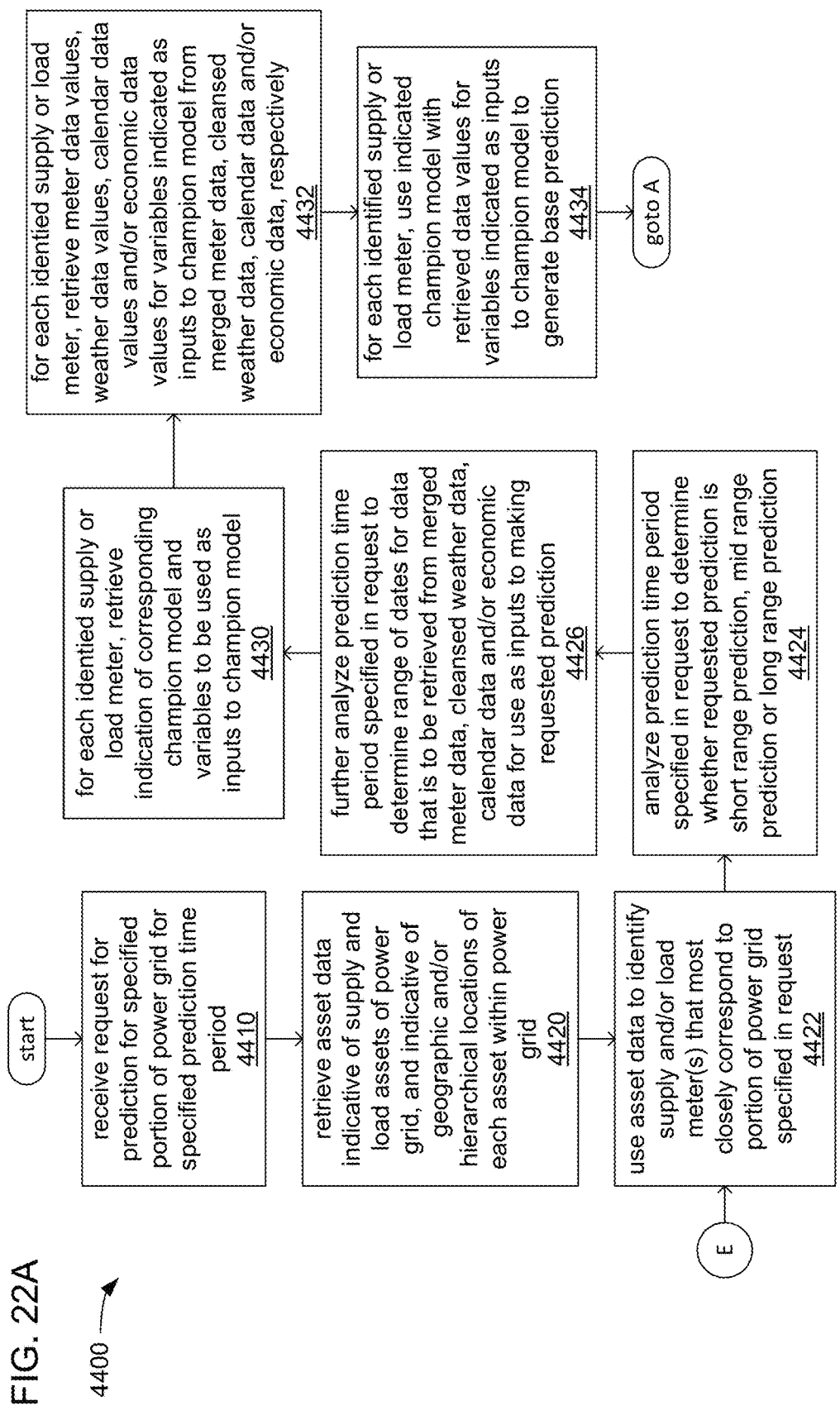
Figure 22B:
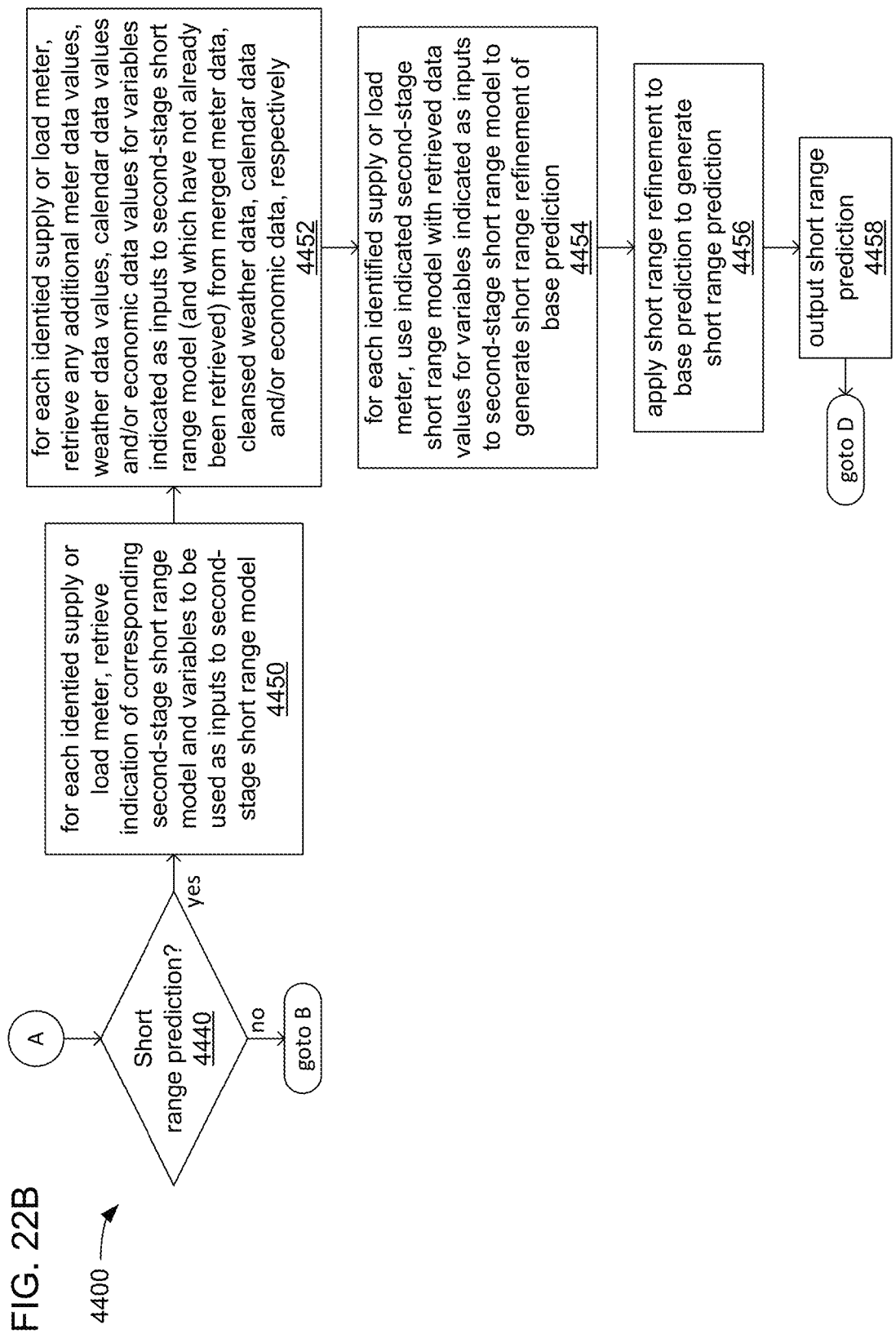
Figure 22D:
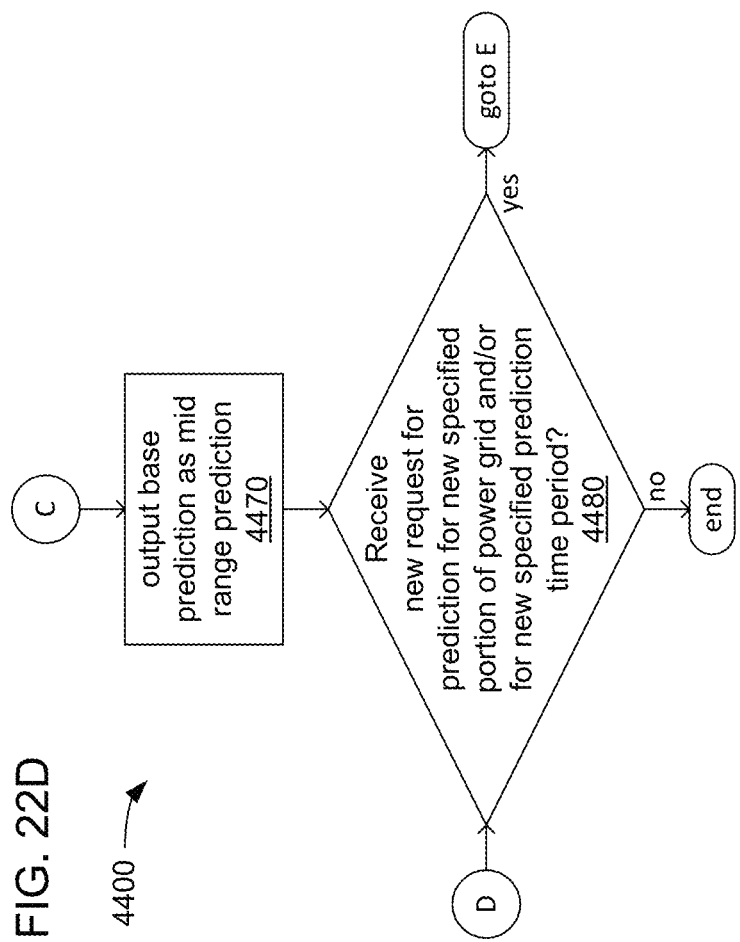

FIGS. 21A and 21B, together, illustrate an example embodiment of a logic flow 4300. The logic flow 4300 may be representative of some or all of the operations executed by one or more embodiments described herein. More specifically, the logic flow 4300 may illustrate operations performed by the processor(s) 3350 and/or the processor(s) 3550, and/or performed by other component(s) of each of the multiple node devices 3300 and/or the control device 3500, respectively, in executing corresponding ones of the modeling routine 3440 and/or the control routine 3540 to generate the champion models data 3434, the short range models data 3436 and/or the long range models data 3438 from the cleansed supply meter data 2331 and the cleansed load meter data 2332, respectively.

At 4310, processor(s) of a node device of a distributed processing system of a power grid (e.g., the processor(s) 3350 of one of the node devices 3300 of the distributed processing system 3000 of the power grid 2000) may retrieve, for use as training data (e.g., the training data 3431), portions of time series of power provision values that fall within a predetermined training time period for supply meters of a power grid and portions of time series of power consumption values that also fall within the training time period for load meters of the power grid from a merged meter data (e.g., the merged meter data 2333).

At 4312, the processor(s) of the node device may retrieve, also for use as training data, portions of initial weather data (e.g., the cleansed weather data 2380) that may include, but not be limited to including, indications of weather stations that cover locations within the geographic area covered by the power grid, indications of measurements of weather conditions taken at each such weather station throughout at least the training time period, and/or indications of particular measuring techniques used in taking measurements of weather conditions (e.g., wet bulb vs. dry bulb temperature measurement technique). The processor(s) may also retrieve, also for use as training data, portions of calendar data (e.g., the calendar data 2370) that may include, but not be limited to including, correlations of dates to days of weeks and/or months of years, and/or includes indications of dates and/or days of holidays that occur in the geographic area covered by the power grid throughout at least the training time period. The processor(s) may further retrieve, also for use as training data, portions of economic data (e.g., the economic data 2460) that may include, but not be limited to including, indications of economic conditions at various locations within the geographic area covered by the power grid throughout at least the training time period.

At 4314, processor(s) of the node device may retrieve, for use as testing data (e.g., the testing data 3433), portions of time series of power provision values that fall within a predetermined testing time period for supply meters of the power grid and portions of time series of power consumption values that also fall within the testing time period for load meters of the power grid from the merged meter data. The processor(s) of the node device may also retrieve, also for use as testing data, portions of the initial weather data, the calendar data and/or the economic data that fall within at least the testing time period, at 4316.

At 4320, for each supply meter of the power grid, the processor(s) of the node device may be caused to use corresponding portions of the training data in multiple performances of linear regression to generate a set of candidate power provision models of a preselected set of candidate power provision model types. Correspondingly, for each load meter of the power grid, the processor(s) may be caused to use corresponding portions of the training data in multiple performances of linear regression to generate a set of candidate power consumption models of a preselected set of candidate power consumption model types.

At 4322, for each supply meter of the power grid, the processor(s) of the node device may be caused to use corresponding portions of the testing data to test each candidate power provision model in the corresponding set of candidate power provision models to identify a champion power provision model among that set based on a preselected metric for degree of error. Correspondingly, for each load meter of the power grid, the processor(s) may be caused to use corresponding portions of the testing data to test each candidate power consumption model in the corresponding set of candidate power consumption models to identify a champion power consumption model among that set based on a preselected metric for degree of error. The processor(s) may then augment the merged meter data with indications of the model type and/or parameters for the champion power provision model for each supply meter, and indications of the model type and/or parameters for the champion power consumption model for each load meter at 4330.

At 4340, processor(s) of the node device may retrieve, for use as short range training data (e.g., the short range training data 3435), portions of time series of power provision values that fall within a predetermined short range training time period for supply meters of the power grid and portions of time series of power consumption values that also fall within the short range training time period for load meters of the power grid from the merged meter data. The processor(s) of the node device may also retrieve, also for use as short range training data, portions of the initial weather data, the calendar data and/or the economic data that fall within at least the short range training time period, at 4342.

At 4344, processor(s) of the node device may retrieve, for use as long range training data (e.g., the long range training data 3437), portions of time series of power provision values that fall within a predetermined long range training time period for supply meters of the power grid and portions of time series of power consumption values that also fall within the long range training time period for load meters of the power grid from the merged meter data. The processor(s) of the node device may also retrieve, also for use as long range training data, portions of the initial weather data, the calendar data and/or the economic data that fall within at least the long range training time period, at 4346.

At 4350, for each supply meter of the power grid, the processor(s) of the node device may be caused to use corresponding portions of the short range training data in linear regression to generate a second-stage short range power provision model of a preselected model type. Correspondingly, for each load meter of the power grid, the processor(s) may be caused to use corresponding portions of the short range training data in linear regression to generate a second-stage short range power consumption model of a preselected model type. At 4352, for each supply meter of the power grid, the processor(s) of the node device may be caused to use corresponding portions of the long range training data in linear regression to generate a second-stage long range power provision model of a preselected model type. Correspondingly, for each load meter of the power grid, the processor(s) may be caused to use corresponding portions of the long range training data in linear regression to generate a second-stage long range power consumption model of a preselected model type. The processor(s) may then augment the merged meter data with indications of the parameters for the short range and long range provision models for each supply meter, and indications of the parameters for the short range and long range consumption models for each load meter at 4360.

FIGS. 22A, 22B, 22C and 22D, together, illustrate an example embodiment of a logic flow 4400. The logic flow 4400 may be representative of some or all of the operations executed by one or more embodiments described herein. More specifically, the logic flow 4400 may illustrate operations performed by the processor(s) 3350 and/or the processor(s) 3550, and/or performed by other component(s) of each of the multiple node devices 3300 and/or the control device 3500, respectively, in executing corresponding ones of the control routine 3540 and/or the prediction routine

3640 to respond to a request for a prediction concerning a power grid by generating and providing the requested prediction based on one or more champion, second-stage short range and/or second-stage long range models.

At 4410, a processor of a control device of a distributed processing system of a power grid (e.g., the processor(s) 3550 of the control device 3500 of the distributed processing system 3000 of the power grid 2000) may receive a request from another device conveyed via a network (e.g., the viewing device 3700 via the network 3999) for a prediction concerning power provision and/or power consumption within a portion of the power grid specified in the request and covering a range of time and/or dates of a prediction time period also specified in the request.

At 4420, the processor of the control device may retrieve asset data that includes indications of what supply and endpoint assets are connected to the power grid, indications of the supply and endpoint locations at which each asset is located, indications of the location of each asset in the hierarchy of the power grid, and correlations of each asset to a supply meter or endpoint meter (e.g., the asset data 2190). As previously discussed, geographical locations may be specified with geographic coordinates and/or street addresses, and each asset and meter may be given one or more types of identifier (e.g., ID numbers, human-readable names, etc.). The processor of the control device may use the asset data to identify the one or more supply meters at supply locations, and/or the one or more load meters at endpoint locations that most closely correspond to the portion of the power grid specified in the request, at 4422.

At 4424, the processor of the control device may analyze the prediction time period specified in the request to determine whether the requested prediction is a short range prediction, a mid range prediction or a long range prediction. At 4426, the processor or the control device may further analyze the prediction time period to determine a range of dates within the historical time period for the data to be retrieved from merged meter data that includes time series of power provision values for each supply meter and time series of power consumption values for each load meter (e.g., the merged meter data 2333); cleansed weather data that includes indications of weather conditions for locations within the geographic area covered by the power grid (e.g., the cleansed weather data 2380); calendar data that correlates dates to days and/or months, and/or that includes indications of holidays applicable to the geographic are covered by the power grid (e.g., the calendar data 2370); and/or economic data that includes indications of economic conditions for locations within the geographic area covered by the power grid (e.g., the economic data 2460).

At 4430, the processor(s) of at least one node device of the power grid (e.g., the processor(s) 3350 of at least one of the node devices 3300) may, in response to information concerning the request transmitted to the at least one node device by the control device, retrieve information concerning the champion power provision models and champion power consumption models, along with indications of what input variables are required, for all supply meters and load meters, respectively, identified at 4422.

At 4432, the processor(s) of the at least one node device may, for each supply meter and each load meter identified at 4422, retrieve portions of corresponding time series of power provision values and corresponding time series of power consumption values, respectively, that fall within the range of dates determined at 4426 from the merged meter data for use as input variables to the retrieved champion models. The processor(s) of the at least one node devices may also retrieve weather measurements from the cleansed weather data, calendar information from the calendar data, and economic information from the economic data for locations within the power grid that correspond to each supply meter and each load meter identified at 4422, and that fall within the range of dates determined at 4426, also for use as input variables to the retrieved champion models.

At 4434, the processor(s) of the at least one device may, for each supply meter and each load meter identified at 4422, use the corresponding retrieved champion power provision and power consumption models, with the corresponding retrieved input variables, to generate a base prediction of power provision for each identified supply meter and a base prediction of power consumption for each identified load meter.

If, at 4440, the prediction time period was determined to be a short range time period at 4424, then at 4450 the processor(s) of the at least one node device may, for the supply meters and the load meters identified at 4422, may retrieve information concerning corresponding second-stage short range power provision models and second-stage short range power consumption models, along with indications of what input variables are required, for those supply meters and load meters, respectively, identified at 4422. At 4452, the processor(s) of the at least one node device may also retrieve additional portions of corresponding time series of power provision values and corresponding time series of power consumption values that are needed for use as further input variables to the retrieved second-stage short range models. The processor(s) of the at least one node device may also retrieve further weather measurements and/or further calendar information that are needed for use as further input variables to the retrieved second-stage short range models. At 4454, for each supply meter and each load meter identified at 4422, the processor(s) of the at least one node device may use the corresponding retrieved second-stage short range power provision and power consumption models, with the corresponding retrieved input variables, to generate short range refinements to corresponding base predictions of power provision and to generate short range refinements to the corresponding base predictions of power consumption. At 4456, the short range refinements are applied to the corresponding ones of the base predictions. At 4458, the processor of the control device provides, to the requesting device via the network, a short range prediction assembled at the control device from the refined predictions made at the at least one node device for each identified supply meter and load meter. The processor of the control device may then check, at 4480, if a new request for a new prediction has been received.

However, if at 4442, the prediction time period was determined to be a long range time period at 4424, then at 4460 the processor(s) of the at least one node device may, for the supply meters and the load meters identified at 4422, may retrieve information concerning corresponding second-stage long range power provision models and second-stage long range power consumption models, along with indications of what input variables are required, for those supply meters and load meters, respectively, identified at 4422. At 4462, the processor(s) of the at least one node device may also retrieve additional portions of corresponding time series of power provision values and corresponding time series of power consumption values that are needed for use as further input variables to the retrieved second-stage long range models. The processor(s) of the at least one node device may also retrieve further economic information and/or further calendar information that are needed for use as further input variables to the retrieved second-stage long range models. At 4464, for each supply meter and each load meter identified at 4422, the processor(s) of the at least one node device may use the corresponding retrieved second-stage long range power provision and power consumption models, with the corresponding retrieved input variables, to generate long range refinements to corresponding base predictions of power provision and to generate short range refinements to the corresponding base predictions of power consumption. At 4466, the long range refinements are applied to the corresponding ones of the base predictions. At 4468, the processor of the control device provides, to the requesting device via the network, a long range prediction assembled at the control device from the refined predictions made at the at least one node device for each identified supply meter and load meter. The processor of the control device may then check, at 4480, if a new request for a new prediction has been received.

However, if the prediction time period was not determined to be either a short range time period or a long range time period, then at 4470, the processor of the control device provides, to the requesting device via the network, a prediction assembled at the control device from the base predictions made at the at least one node device for each identified supply meter and load meter. The processor of the control device may then check, at 4480, if a new request for a new prediction has been received.

In various embodiments, the division of processing and/or storage resources among the devices, and/or the API architectures supporting communications among the devices, may be configured to and/or selected to conform to any of a variety of standards for distributed processing, including without limitation, IEEE P2413, the ALLJOYN® standard, the IOTIVITY™ standard, etc. By way of example, a subset of API and/or other architectural features of one or more of such standards may be employed to implement the relatively minimal degree of coordination described herein to provide greater efficiency in parallelizing processing of data, while minimizing exchanges of coordinating information that may lead to undesired instances of serialization among processes. However, it should be noted that the parallelization of storage, retrieval and/or processing of data set portions of data set(s) are not dependent on, nor constrained by, existing API architectures and/or supporting communications protocols. More broadly, there is nothing in the manner in which data set(s) may be organized in storage, transmission and/or distribution via a network that is bound to existing API architectures or protocols.

Some systems may use the HADOOP® framework, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node HADOOP® cluster, as understood by a person of skill in the art. The APACHE™ HADOOP® framework is an open-source software framework for distributed computing.

Implementing some examples at least in part by using machine-learning models can reduce the total number of processing iterations, time, memory, electrical power, or any combination of these consumed by a computing device when analyzing data. Some machine-learning approaches may be more efficiently and speedily executed and processed with machine-learning specific processors (e.g., not a generic CPU). For example, some of these processors can include a graphical processing unit (GPU), an application-specific integrated circuit (ASIC), a field-programmable gate array (FPGA), a Tensor Processing Unit (TPU) by Google, and/or some other machine-learning specific processor that implements one or more neural networks using semiconductor (e.g., silicon (Si), gallium arsenide (GaAs)) devices.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus comprising a processor and a storage to store instructions that, when executed by the processor, cause the processor to perform operations comprising:

retrieve initial supply meter data from the storage, wherein:
  the initial supply meter data comprises, for each supply meter of multiple supply meters of a power grid, a set of power provision values for a corresponding supply asset at a corresponding supply location; and
  each power provision value is representative of a measure of power provision taken at a time and date by one of the supply meters of the multiple supply meters during a predetermined historical time period;

retrieve initial load meter data from the storage, wherein:
  the initial load meter data comprises, for each load meter of multiple load meters of the power grid, a set of power consumption values for a corresponding endpoint asset at a corresponding endpoint location; and
  each power consumption value is representative of a measure of power consumption taken at a time and date by one of the load meters of the multiple load meters during the predetermined historical time period;

assign each power provision value of the initial supply meter data to one of multiple buckets based on at least a weather condition at the corresponding supply location at the corresponding time and date;

assign each power consumption value of the initial load meter data to one of the multiple buckets based on at least a weather condition at the corresponding endpoint location at the corresponding time and date;

for each bucket, the processor is caused to:
  derive upper and lower bounds of power provision from the power provision values assigned to the bucket;
  use the upper and lower bounds of power provision to identify outlier power provision values among the power provision values assigned to the bucket;
  derive upper and lower bounds of power consumption from the power consumption values assigned to the bucket; and
  use the upper and lower bounds of power consumption to identify outlier power consumption values among the power consumption values assigned to the bucket;

for each set of power provision values within the initial supply meter data, the processor is caused to perform further operations to generate, from the initial supply meter data, cleansed supply meter data in which each set of power provision values defines a complete time series, wherein a complete time series comprises a series of values at a recurring time interval without gaps, the further operations comprising:

generate a naive power provision model from the power provision values in the set of power provision values that are not identified as outliers;

identify missing power provision values, wherein each power provision value identified as missing or an outlier in the set of power provision values defines at least part of a gap that prevents the set of power provision values from defining a complete time series; and for each missing or outlier power provision value in each gap that exceeds a predetermined threshold quantity of power provision values, employ the naive power provision model of the corresponding bucket to generate a power provision value to fill the gap;

for each set of power consumption values within the initial load meter data, the processor is caused to perform further operations to generate, from the initial load meter data, cleansed load meter data in which each set of power consumption values defines a complete time series, the further operations comprising:

generate a naive power consumption model from the power consumption values in the set of power consumption values that are not identified as outliers;

identify missing power consumption values, wherein each power consumption value identified as missing or an outlier in the set of power consumption values defines at least part of a gap that prevents the set of power consumption values from defining a complete time series; and for each missing or outlier power consumption value in each gap that exceeds a predetermined threshold quantity of power consumption values, employ the naive power consumption model of one of the corresponding bucket to generate a power consumption value to fill the gap;

merge the cleansed load meter data and the cleansed supply meter data into merged meter data; and store the merged meter data within the storage to enable generation of power provision models and power consumption models of the power grid.

2. The apparatus of claim 1, wherein the processor is caused to perform operations comprising:

for each set of power provision values within the initial supply meter data, the processor is caused to perform further operations to generate the cleansed supply meter data from the initial supply meter data, the further operations comprising:

for each missing or outlier power provision value in each gap that does not exceed the predetermined threshold quantity of power provision values, employ interpolation of power provision values adjacent to the gap to generate a power provision value to fill the gap; and for each set of power consumption values within the initial load meter data, the processor is caused to perform further operations to generate the cleansed load meter data from the initial load meter data, the further operations comprising:

for each missing or outlier power consumption value in each gap that does not exceed the predetermined threshold quantity of power consumption values, employ interpolation of power consumption values adjacent to the gap to generate a power consumption value to fill the gap.

3. The apparatus of claim 1, wherein the processor is caused to perform operations comprising:

receive raw supply meter readings from the multiple supply meters via a communications network of the power grid, wherein:

each raw supply meter reading comprises a measure, taken by a supply meter, of electric power supplied on at least one phase of electric power by the corresponding supply asset; and each raw supply meter reading comprises an indication of when the measure of electric power provided was taken by the supply meter;

receive raw load meter readings from the multiple load meters via a communications network of the power grid, wherein:

each raw load meter reading comprises a measure, taken by a load meter, of electric power consumed on at least one phase of electric power by an endpoint asset; and each raw load meter reading comprises an indication of when the measure of electric power consumed was taken by the load meter;

for each supply meter of the multiple supply meters, convert a set of corresponding raw supply meter readings into a corresponding set of power provision values of the initial supply meter data; and for each load meter of the multiple load meters, convert a set of corresponding raw load meter readings into a corresponding set of power consumption values of the initial load meter data.

4. The apparatus of claim 3, wherein the processor is caused to perform operations comprising:

retrieve proxy load meter readings, wherein the proxy load meter readings comprise indications of electrical characteristics of at least one endpoint asset at an endpoint location that was not connected to the power grid for a portion of the predetermined historical time period; and for each endpoint asset that was not connected to the power grid for a portion of the predetermined historical time period, the processor is caused to:

use corresponding electrical characteristics indicated in the proxy load meter readings to generate simulated load meter readings for the endpoint asset for the portion of the predetermined historical time period; and augment the raw load meter readings with the simulated load meter readings prior to conversion to power consumption values.

5. The apparatus of claim 1, wherein the processor is caused to perform operations comprising:

retrieve initial weather data comprising weather data values indicative of weather conditions at multiple weather station locations within a geographic area covered by the power grid;

perform cleansing of the weather data values to fill gaps in the weather data values that prevent the weather data values from defining a complete time series of weather data values to cause the weather data values associated with each of the weather station location to define a complete time series of weather data values to generate cleansed weather data from the initial weather data;

correlate each power consumption value of the initial load meter data to a weather data value in the complete time series of weather data values of the cleansed weather data;
assign each power consumption value of the initial load meter data to one of the multiple buckets based at least on the correlated weather data value;
correlate each power provision value of the initial supply meter data to a weather data value in the complete time series of weather data values of the cleansed weather data; and
assign each power provision value of the initial supply meter data to one of the multiple buckets based at least on the correlated weather data value.

6. The apparatus of claim 5, wherein the processor is caused to perform operations comprising:
retrieve calendar data comprising at least one of:
indications of correlations between dates within the historical time period to days of a week or months of a year; or
indications of holidays within the historical time period that are applicable to at least a portion of the geographic area covered by the grid;
define each bucket of the multiple buckets to correspond to a different combination of a range of values of a weather condition and a range of dates;
assign each power consumption value of the initial load meter data to one of the multiple buckets based at least on the date of the corresponding measure of power consumption and the correlated weather data value; and
assign each power provision value of the initial supply meter data to one of the multiple buckets based at least on the date of the corresponding measure of power provision and the correlated weather data value.

7. The apparatus of claim 1, wherein, the processor is caused to perform operations comprising:
retrieve asset data comprising at least one of:
identifiers of supply assets and endpoint assets of the power grid;
indications of locations of supply assets and endpoint assets within a hierarchy of electrical pathways of the power grid;
indications of geographic locations of supply locations of supply assets within a geographic area covered by the power grid; and
indications of geographic locations of endpoint locations of endpoint assets within the geographic area covered by the power grid; and
for each set of power provision values within the cleansed supply meter data, the processor is caused to:
use the asset data to correlate the supply asset corresponding to the set of power provision values to one or more endpoint assets that are provided with electric power by the supply asset in the power grid;
retrieve the one or more sets of power consumption values within the cleansed load meter data that correspond to the one or more endpoint assets;
aggregate the one or more sets of power consumption values to generate a set of aggregated power consumption values to correspond to the set of power provision values; and
include the set of aggregated power consumption values in the merged meter data.

8. The apparatus of claim 1, wherein the processor is caused to perform operations comprising:
retrieve, from the merged meter data, a first portion of each time series of power provision values and of each time series of power consumption values from for a predetermined training time period within the historical time period for use as training data;
retrieve, from the merged meter data, a second portion of each time series of power provision values and of each time series of power consumption values from for a predetermined testing time period within the historical time period for use as testing data;
retrieve, from at least one of cleansed weather data, calendar data or economic data, a first subset of data values for the training time period for use as further training data and a second subset of data values for the testing time period for use as further testing data, wherein:
the cleansed weather data comprises data values indicative of weather conditions at multiple weather station locations within a geographic area covered by the power grid throughout the historical time period;
the calendar data comprises at least one of indications of correlations between dates within the historical time period to days of a week or months of a year, or indications of holidays within the historical time period that are applicable to at least a portion of the geographic area covered by the grid; and
the economic data comprises data values indicative of economic conditions within the geographic area covered by the power grid throughout the historical time period;
for each supply meter of the multiple supply meters, the processor is caused to:
use the first portion of the corresponding time series within the training data, along with the further training data, in multiple performances of linear regression to generate a corresponding set of candidate models of power provision by the corresponding supply asset, wherein the corresponding set of candidate models of power provision are of a preselected set of model types;
use the second portion of the corresponding time series within the testing data, along with the further testing data, to derive a degree of error for each candidate model of the corresponding set of candidate models of power provision;
analyze the degree of error of each candidate model of the corresponding set of candidate models of power provision to identify a corresponding champion model of power provision; and
store an indication of the corresponding champion model of power provision and an indication of variables to be used as inputs thereto within the storage to enable use of the corresponding champion model of power provision in a prediction of power provision by the corresponding supply asset; and
for each load meter of the multiple load meters, the processor is caused to:
use the first portion of the corresponding time series within the training data, along with the further training data, in multiple performances of linear regression to generate a corresponding set of candidate models of power consumption by the corresponding endpoint asset, wherein the corresponding set of candidate models of power consumption are of the preselected set of model types;
use the second portion of the corresponding time series within the testing data, along with the further testing data, to derive a degree of error for each candidate model of the corresponding set of candidate models of power consumption; analyze the degree of error of each candidate model of the corresponding set of candidate models of power consumption to identify a corresponding champion model of power consumption; and store an indication of the corresponding champion model of power consumption and an indication of variables to be used as inputs thereto within the storage to enable use of the corresponding champion model of power consumption in a prediction of power consumption by the corresponding endpoint asset.

9. The apparatus of claim 8, wherein, the processor is caused to perform operations comprising:

retrieve, from the merged meter data, a third portion of each time series of power provision values and of each time series of power consumption values from for a predetermined short range training time period within the historical time period for use as short range training data, wherein the short range training time period is shorter than the predetermined training time period;

retrieve, from the merged meter data, a fourth portion of each time series of power provision values and of each time series of power consumption values from for a predetermined long range training time period within the historical time period for use as long range training data, wherein the long range training time period is longer than the predetermined training time period;

retrieve, from at least the cleansed weather data, a third subset of data values for the short range training time period for use as further short range training data;

retrieve, from at least the economic data, a fourth subset of data values for the long range training time period for use as further long range training data;

for each supply meter of the multiple supply meters, the processor is caused to:

use the third portion of the corresponding time series within the short range training data, along with the further short range training data to generate a corresponding second-stage short range model of power provision by the corresponding supply asset to address overfitting of the corresponding champion model of power provision for a short range prediction time period shorter than at least one of the predetermined training time period or the predetermined testing time period;

use the fourth portion of the corresponding time series within the long range training data, along with the further long range training data to generate a corresponding second-stage long range model of power provision by the corresponding supply asset to address overfitting of the corresponding champion model of power provision for a long range prediction time period longer than the at least one of the predetermined training time period or the predetermined testing time period; and store indications of the corresponding second-stage short range model of power provision and corresponding second-stage long range model of power provision to enable use of the corresponding champion model of power provision in a short range or long range prediction of power provision by the corresponding supply asset; and for each load meter of the multiple load meters, the processor is caused to:

use the third portion of the corresponding time series within the short range training data, along with the further short range training data to generate a corresponding second-stage short range model of power consumption by the corresponding endpoint asset to address overfitting of the corresponding champion model of power consumption for a short range prediction time period shorter than the at least one of the predetermined training time period or the predetermined testing time period;

use the fourth portion of the corresponding time series within the long range training data, along with the further long range training data to generate a corresponding second-stage long range model of power consumption by the corresponding endpoint asset to address overfitting of the corresponding champion model of power consumption for a long range prediction time period longer than the at least one of the predetermined training time period or the predetermined testing time period; and store indications of the corresponding second-stage short range model of power consumption and corresponding second-stage long range model of power consumption to enable use of the corresponding champion model of power consumption in a short range or long range prediction of power consumption by the corresponding endpoint asset.

10. The apparatus of claim 9, wherein the processor is caused to perform operations comprising:

receive a request from a requesting device for a prediction that covers a specified portion of the power grid for a specified prediction time period;

retrieve asset data comprising at least one of:
identifiers of supply assets and endpoint assets of the power grid;
indications of locations of supply assets and endpoint assets within a hierarchy of electrical pathways of the power grid;
indications of geographic locations of supply locations of supply assets within a geographic area covered by the power grid; and
indications of geographic locations of endpoint locations of endpoint assets within the geographic area covered by the power grid;

use the asset data to identify one or more supply assets and one or more endpoint assets within the specified portion of the power grid;

retrieve, from the merged meter data, a portion of the time series of power provision values for each supply meter that corresponds to an asset of the identified one or more supply assets;

for each supply meter that corresponds to a supply asset of the identified one or more supply assets, use the corresponding champion model of power provision with the retrieved portion of the corresponding time series of power provision values to generate a corresponding base prediction of power provision;

retrieve, from the merged meter data, a portion of the time series of power consumption values for each load meter that corresponds to an endpoint asset of the identified one or more endpoint assets;

for each load meter that corresponds to an endpoint asset of the identified one or more endpoint assets, use the corresponding champion model of power consumption with the retrieved portion of the corresponding time series of power consumption values to generate a corresponding base prediction of power consumption;

analyze the specified prediction time period to determine whether the requested prediction comprises a short range prediction, a mid range prediction or a long range prediction based on a comparison of the specified prediction time period to the at least one of the predetermined training time period or the predetermined testing time period, wherein:
the specified prediction time period of the mid range prediction is longer than the specified prediction time period of the short range prediction, and is shorter than the specified prediction time period of the long range prediction;
the specified prediction time of the short range prediction is shorter than the at least one of the predetermined training time period or the predetermined testing time period; and
the specified prediction time of the long range prediction is longer than the at least one of the predetermined training time period or the predetermined testing time period;
in response to a determination that the requested prediction comprises a short range prediction, the processor is caused to:
for each supply meter that corresponds to a supply asset of the identified one or more supply assets:
use the corresponding second-stage short range model of power provision with the retrieved portion of the corresponding time series of power provision values to generate a corresponding short range refinement of the corresponding base prediction of power provision;
apply the corresponding short range refinement to the corresponding base prediction of power provision; and
provide the corresponding base prediction of power provision, after refinement, in response to the request; and
for each load meter that corresponds to an endpoint asset of the identified one or more load assets:
use the corresponding second-stage short range model of power consumption with the retrieved portion of the corresponding time series of power consumption values to generate a corresponding short range refinement of the corresponding base prediction of power consumption;
apply the corresponding short range refinement to the corresponding base prediction of power consumption; and
provide the corresponding base prediction of power consumption, after refinement, in response to the request;
in response to a determination that the requested prediction comprises a long range prediction, the processor is caused to:
for each supply meter that corresponds to a supply asset of the identified one or more supply assets:
use the corresponding second-stage long range model of power provision with the retrieved portion of the corresponding time series of power provision values to generate a corresponding long range refinement of the corresponding base prediction of power provision;
apply the corresponding long range refinement to the corresponding base prediction of power provision; and
provide the corresponding base prediction of power provision, after refinement, in response to the request;

for each load meter that corresponds to an endpoint asset of the identified one or more load assets:
use the corresponding second-stage long range model of power consumption with the retrieved portion of the corresponding time series of power consumption values to generate a corresponding long range refinement of the corresponding base prediction of power consumption;
apply the corresponding long range refinement to the corresponding base prediction of power consumption; and
provide the corresponding base prediction of power consumption, after refinement, in response to the request; or
in response to a determination that the requested prediction comprises a mid range prediction, the processor is caused to:
for each supply meter that corresponds to a supply asset of the identified one or more supply assets, provide the corresponding base prediction of power provision in response to the request; and
for each load meter that corresponds to an endpoint asset of the identified one or more load assets: provide the corresponding base prediction of power consumption in response to the request.

11. A computer-program product tangibly embodied in a non-transitory machine-readable storage medium, the computer-program product including instructions operable to cause a processor to perform operations comprising:
retrieve initial supply meter data from the storage, wherein:
the initial supply meter data comprises, for each supply meter of multiple supply meters of a power grid, a set of power provision values for a corresponding supply asset at a corresponding supply location; and
each power provision value is representative of a measure of power provision taken at a time and date by one of the supply meters of the multiple supply meters during a predetermined historical time period;
retrieve initial load meter data from the storage, wherein:
the initial load meter data comprises, for each load meter of multiple load meters of the power grid, a set of power consumption values for a corresponding endpoint asset at a corresponding endpoint location; and
each power consumption value is representative of a measure of power consumption taken at a time and date by one of the load meters of the multiple load meters during the predetermined historical time period;
assign each power provision value of the initial supply meter data to one of multiple buckets based on at least a weather condition at the corresponding supply location at the corresponding time and date;
assign each power consumption value of the initial load meter data to one of the multiple buckets based on at least a weather condition at the corresponding endpoint location at the corresponding time and date;
for each bucket, the processor is caused to:
derive upper and lower bounds of power provision from the power provision values assigned to the bucket;
use the upper and lower bounds of power provision to identify outlier power provision values among the power provision values assigned to the bucket;

derive upper and lower bounds of power consumption from the power consumption values assigned to the bucket; and
use the upper and lower bounds of power consumption to identify outlier power consumption values among the power consumption values assigned to the bucket;
for each set of power provision values within the initial supply meter data, the processor is caused to perform further operations to generate, from the initial supply meter data, cleansed supply meter data in which each set of power provision values defines a complete time series, wherein a complete time series comprises a series of values at a recurring time interval without gaps, the further operations comprising:
generate a naive power provision model from the power provision values in the set of power provision values that are not identified as outliers;
identify missing power provision values, wherein each power provision value identified as missing or an outlier in the set of power provision values defines at least part of a gap that prevents the set of power provision values from defining a complete time series; and
for each missing or outlier power provision value in each gap that exceeds a predetermined threshold quantity of power provision values, employ the naive power provision model of the corresponding bucket to generate a power provision value to fill the gap;
for each set of power consumption values within the initial load meter data, the processor is caused to perform further operations to generate, from the initial load meter data, cleansed load meter data in which each set of power consumption values defines a complete time series, the further operations comprising:
generate a naive power consumption model from the power consumption values in the set of power consumption values that are not identified as outliers;
identify missing power consumption values, wherein each power consumption value identified as missing or an outlier in the set of power consumption values defines at least part of a gap that prevents the set of power consumption values from defining a complete time series; and
for each missing or outlier power consumption value in each gap that exceeds a predetermined threshold quantity of power consumption values, employ the naive power consumption model of one of the corresponding bucket to generate a power consumption value to fill the gap;
merge the cleansed load meter data and the cleansed supply meter data into merged meter data; and
store the merged meter data within the storage to enable generation of power provision models and power consumption models of the power grid.

12. The computer-program product of claim 11, wherein the processor is caused to perform operations comprising:
for each set of power provision values within the initial supply meter data, the processor is caused to perform further operations to generate the cleansed supply meter data from the initial supply meter data, the further operations comprising:
for each missing or outlier power provision value in each gap that does not exceed the predetermined threshold quantity of power provision values, employ interpolation of power provision values adjacent to the gap to generate a power provision value to fill the gap; and
for each set of power consumption values within the initial load meter data, the processor is caused to perform further operations to generate the cleansed load meter data from the initial load meter data, the further operations comprising:
for each missing or outlier power consumption value in each gap that does not exceed the predetermined threshold quantity of power consumption values, employ interpolation of power consumption values adjacent to the gap to generate a power consumption value to fill the gap.

13. The computer-program product of claim 11, wherein the processor is caused to perform operations comprising:
receive raw supply meter readings from the multiple supply meters via a communications network of the power grid, wherein:
each raw supply meter reading comprises a measure, taken by a supply meter, of electric power supplied on at least one phase of electric power by the corresponding supply asset; and
each raw supply meter reading comprises an indication of when the measure of electric power provided was taken by the supply meter;
receive raw load meter readings from the multiple load meters via a communications network of the power grid, wherein:
each raw load meter reading comprises a measure, taken by a load meter, of electric power consumed on at least one phase of electric power by an endpoint asset; and
each raw load meter reading comprises an indication of when the measure of electric power consumed was taken by the load meter;
for each supply meter of the multiple supply meters, convert a set of corresponding raw supply meter readings into a corresponding set of power provision values of the initial supply meter data; and
for each load meter of the multiple load meters, convert a set of corresponding raw load meter readings into a corresponding set of power consumption values of the initial load meter data.

14. The computer-program product of claim 13, wherein the processor is caused to perform operations comprising:
retrieve proxy load meter readings, wherein the proxy load meter readings comprise indications of electrical characteristics of at least one endpoint asset at an endpoint location that was not connected to the power grid for a portion of the predetermined historical time period; and
for each endpoint asset that was not connected to the power grid for a portion of the predetermined historical time period, the processor is caused to:
use corresponding electrical characteristics indicated in the proxy load meter readings to generate simulated load meter readings for the endpoint asset for the portion of the predetermined historical time period; and
augment the raw load meter readings with the simulated load meter readings prior to conversion to power consumption values.

15. The computer-program product of claim 11, wherein the processor is caused to perform operations comprising:
retrieve initial weather data comprising weather data values indicative of weather conditions at multiple weather station locations within a geographic area covered by the power grid;

perform cleansing of the weather data values to fill gaps in the weather data values that prevent the weather data values from defining a complete time series of weather data values to cause the weather data values associated with each of the weather station location to define a complete time series of weather data values to generate cleansed weather data from the initial weather data;

correlate each power consumption value of the initial load meter data to a weather data value in the complete time series of weather data values of the cleansed weather data;

assign each power consumption value of the initial load meter data to one of the multiple buckets based at least on the correlated weather data value;

correlate each power provision value of the initial supply meter data to a weather data value in the complete time series of weather data values of the cleansed weather data; and assign each power provision value of the initial supply meter data to one of the multiple buckets based at least on the correlated weather data value.

16. The computer-program product of claim 15, wherein the processor is caused to perform operations comprising:

retrieve calendar data comprising at least one of:
indications of correlations between dates within the historical time period to days of a week or months of a year; or
indications of holidays within the historical time period that are applicable to at least a portion of the geographic area covered by the grid;

define each bucket of the multiple buckets to correspond to a different combination of a range of values of a weather condition and a range of dates;

assign each power consumption value of the initial load meter data to one of the multiple buckets based at least on the date of the corresponding measure of power consumption and the correlated weather data value; and assign each power provision value of the initial supply meter data to one of the multiple buckets based at least on the date of the corresponding measure of power provision and the correlated weather data value.

17. The computer-program product of claim 11, wherein the processor is caused to perform operations comprising:

retrieve asset data comprising at least one of:
identifiers of supply assets and endpoint assets of the power grid;
indications of locations of supply assets and endpoint assets within a hierarchy of electrical pathways of the power grid;
indications of geographic locations of supply locations of supply assets within a geographic area covered by the power grid; and
indications of geographic locations of endpoint locations of endpoint assets within the geographic area covered by the power grid; and for each set of power provision values within the cleansed supply meter data, the processor is caused to:
use the asset data to correlate the supply asset corresponding to the set of power provision values to one or more endpoint assets that are provided with electric power by the supply asset in the power grid;
retrieve the one or more sets of power consumption values within the cleansed load meter data that correspond to the one or more endpoint assets;
aggregate the one or more sets of power consumption values to generate a set of aggregated power consumption values to correspond to the set of power provision values; and
include the set of aggregated power consumption values in the merged meter data.

18. The computer-program product of claim 11, wherein the processor is caused to perform operations comprising:

retrieve, from the merged meter data, a first portion of each time series of power provision values and of each time series of power consumption values from for a predetermined training time period within the historical time period for use as training data;

retrieve, from the merged meter data, a second portion of each time series of power provision values and of each time series of power consumption values from for a predetermined testing time period within the historical time period for use as testing data;

retrieve, from at least one of cleansed weather data, calendar data or economic data, a first subset of data values for the training time period for use as further training data and a second subset of data values for the testing time period for use as further testing data, wherein:
the cleansed weather data comprises data values indicative of weather conditions at multiple weather station locations within a geographic area covered by the power grid throughout the historical time period;
the calendar data comprises at least one of indications of correlations between dates within the historical time period to days of a week or months of a year, or indications of holidays within the historical time period that are applicable to at least a portion of the geographic area covered by the grid; and
the economic data comprises data values indicative of economic conditions within the geographic area covered by the power grid throughout the historical time period;

for each supply meter of the multiple supply meters, the processor is caused to:
use the first portion of the corresponding time series within the training data, along with the further training data, in multiple performances of linear regression to generate a corresponding set of candidate models of power provision by the corresponding supply asset, wherein the corresponding set of candidate models of power provision are of a preselected set of model types;
use the second portion of the corresponding time series within the testing data, along with the further testing data, to derive a degree of error for each candidate model of the corresponding set of candidate models of power provision;
analyze the degree of error of each candidate model of the corresponding set of candidate models of power provision to identify a corresponding champion model of power provision; and
store an indication of the corresponding champion model of power provision and an indication of variables to be used as inputs thereto within the storage to enable use of the corresponding champion model of power provision in a prediction of power provision by the corresponding supply asset; and for each load meter of the multiple load meters, the processor is caused to:
use the first portion of the corresponding time series within the training data, along with the further training data, in multiple performances of linear regression to generate a corresponding set of candidate models of power consumption by the corresponding endpoint asset, wherein the corresponding set of candidate models of power consumption are of the preselected set of model types;

use the second portion of the corresponding time series within the testing data, along with the further testing data, to derive a degree of error for each candidate model of the corresponding set of candidate models of power consumption; analyze the degree of error of each candidate model of the corresponding set of candidate models of power consumption to identify a corresponding champion model of power consumption; and store an indication of the corresponding champion model of power consumption and an indication of variables to be used as inputs thereto within the storage to enable use of the corresponding champion model of power consumption in a prediction of power consumption by the corresponding endpoint asset.

19. The computer-program product of claim 18, wherein the processor is caused to perform operations comprising:
retrieve, from the merged meter data, a third portion of each time series of power provision values and of each time series of power consumption values from for a predetermined short range training time period within the historical time period for use as short range training data, wherein the short range training time period is shorter than the predetermined training time period;
retrieve, from the merged meter data, a fourth portion of each time series of power provision values and of each time series of power consumption values from for a predetermined long range training time period within the historical time period for use as long range training data, wherein the long range training time period is longer than the predetermined training time period;
retrieve, from at least the cleansed weather data, a third subset of data values for the short range training time period for use as further short range training data;
retrieve, from at least the economic data, a fourth subset of data values for the long range training time period for use as further long range training data;
for each supply meter of the multiple supply meters, the processor is caused to:
  use the third portion of the corresponding time series within the short range training data, along with the further short range training data to generate a corresponding second-stage short range model of power provision by the corresponding supply asset to address overfitting of the corresponding champion model of power provision for a short range prediction time period shorter than at least one of the predetermined training time period or the predetermined testing time period;
  use the fourth portion of the corresponding time series within the long range training data, along with the further long range training data to generate a corresponding second-stage long range model of power provision by the corresponding supply asset to address overfitting of the corresponding champion model of power provision for a long range prediction time period longer than the at least one of the predetermined training time period or the predetermined testing time period; and
  store indications of the corresponding second-stage short range model of power provision and corresponding second-stage long range model of power provision to enable use of the corresponding champion model of power provision in a short range or long range prediction of power provision by the corresponding supply asset; and for each load meter of the multiple load meters, the processor is caused to:
  use the third portion of the corresponding time series within the short range training data, along with the further short range training data to generate a corresponding second-stage short range model of power consumption by the corresponding endpoint asset to address overfitting of the corresponding champion model of power consumption for a short range prediction time period shorter than the at least one of the predetermined training time period or the predetermined testing time period;
  use the fourth portion of the corresponding time series within the long range training data, along with the further long range training data to generate a corresponding second-stage long range model of power consumption by the corresponding endpoint asset to address overfitting of the corresponding champion model of power consumption for a long range prediction time period longer than the at least one of the predetermined training time period or the predetermined testing time period; and
  store indications of the corresponding second-stage short range model of power consumption and corresponding second-stage long range model of power consumption to enable use of the corresponding champion model of power consumption in a short range or long range prediction of power consumption by the corresponding endpoint asset.

20. The computer-program product of claim 19, wherein the processor is caused to perform operations comprising:
receive a request from a requesting device for a prediction that covers a specified portion of the power grid for a specified prediction time period;
retrieve asset data comprising at least one of:
  identifiers of supply assets and endpoint assets of the power grid;
  indications of locations of supply assets and endpoint assets within a hierarchy of electrical pathways of the power grid;
  indications of geographic locations of supply locations of supply assets within a geographic area covered by the power grid; and
  indications of geographic locations of endpoint locations of endpoint assets within the geographic area covered by the power grid;
use the asset data to identify one or more supply assets and one or more endpoint assets within the specified portion of the power grid;
retrieve, from the merged meter data, a portion of the time series of power provision values for each supply meter that corresponds to an asset of the identified one or more supply assets;
for each supply meter that corresponds to a supply asset of the identified one or more supply assets, use the corresponding champion model of power provision with the retrieved portion of the corresponding time series of power provision values to generate a corresponding base prediction of power provision;

retrieve, from the merged meter data, a portion of the time series of power consumption values for each load meter that corresponds to an endpoint asset of the identified one or more endpoint assets;

for each load meter that corresponds to an endpoint asset of the identified one or more endpoint assets, use the corresponding champion model of power consumption with the retrieved portion of the corresponding time series of power consumption values to generate a corresponding base prediction of power consumption;

analyze the specified prediction time period to determine whether the requested prediction comprises a short range prediction, a mid range prediction or a long range prediction based on a comparison of the specified prediction time period to the at least one of the predetermined training time period or the predetermined testing time period, wherein:
  the specified prediction time period of the mid range prediction is longer than the specified prediction time period of the short range prediction, and is shorter than the specified prediction time period of the long range prediction;
  the specified prediction time of the short range prediction is shorter than the at least one of the predetermined training time period or the predetermined testing time period; and
  the specified prediction time of the long range prediction is longer than the at least one of the predetermined training time period or the predetermined testing time period;

in response to a determination that the requested prediction comprises a short range prediction, the processor is caused to:
  for each supply meter that corresponds to a supply asset of the identified one or more supply assets:
    use the corresponding second-stage short range model of power provision with the retrieved portion of the corresponding time series of power provision values to generate a corresponding short range refinement of the corresponding base prediction of power provision;
    apply the corresponding short range refinement to the corresponding base prediction of power provision; and
    provide the corresponding base prediction of power provision, after refinement, in response to the request; and
  for each load meter that corresponds to an endpoint asset of the identified one or more load assets:
    use the corresponding second-stage short range model of power consumption with the retrieved portion of the corresponding time series of power consumption values to generate a corresponding short range refinement of the corresponding base prediction of power consumption;
    apply the corresponding short range refinement to the corresponding base prediction of power consumption; and
    provide the corresponding base prediction of power consumption, after refinement, in response to the request;

in response to a determination that the requested prediction comprises a long range prediction, the processor is caused to:
  for each supply meter that corresponds to a supply asset of the identified one or more supply assets:
    use the corresponding second-stage long range model of power provision with the retrieved portion of the corresponding time series of power provision values to generate a corresponding long range refinement of the corresponding base prediction of power provision;
    apply the corresponding long range refinement to the corresponding base prediction of power provision; and
    provide the corresponding base prediction of power provision, after refinement, in response to the request; and
  for each load meter that corresponds to an endpoint asset of the identified one or more load assets:
    use the corresponding second-stage long range model of power consumption with the retrieved portion of the corresponding time series of power consumption values to generate a corresponding long range refinement of the corresponding base prediction of power consumption;
    apply the corresponding long range refinement to the corresponding base prediction of power consumption; and
    provide the corresponding base prediction of power consumption, after refinement, in response to the request; or in response to a determination that the requested prediction comprises a mid range prediction, the processor is caused to:
  for each supply meter that corresponds to a supply asset of the identified one or more supply assets, provide the corresponding base prediction of power provision in response to the request; and
  for each load meter that corresponds to an endpoint asset of the identified one or more load assets: provide the corresponding base prediction of power consumption in response to the request.

21. A computer-implemented method comprising:
retrieving, by a processor, and from a storage, initial supply meter data, wherein:
  the initial supply meter data comprises, for each supply meter of multiple supply meters of a power grid, a set of power provision values for a corresponding supply asset at a corresponding supply location; and
  each power provision value is representative of a measure of power provision taken at a time and date by one of the supply meters of the multiple supply meters during a predetermined historical time period;
retrieving, by the processor, and from the storage, initial load meter data, wherein:
  the initial load meter data comprises, for each load meter of multiple load meters of the power grid, a set of power consumption values for a corresponding endpoint asset at a corresponding endpoint location; and
  each power consumption value is representative of a measure of power consumption taken at a time and date by one of the load meters of the multiple load meters during the predetermined historical time period;
assigning each power provision value of the initial supply meter data to one of multiple buckets based on at least a weather condition at the corresponding supply location at the corresponding time and date;
assigning each power consumption value of the initial load meter data to one of the multiple buckets based on at least a weather condition at the corresponding endpoint location at the corresponding time and date;
performing, for each bucket, further operations comprising:
deriving, by the processor, upper and lower bounds of power provision from the power provision values assigned to the bucket;
using the upper and lower bounds of power provision to identify outlier power provision values among the power provision values assigned to the bucket;
deriving, by the processor, upper and lower bounds of power consumption from the power consumption values assigned to the bucket; and
use the upper and lower bounds of power consumption to identify outlier power consumption values among the power consumption values assigned to the bucket;
performing, for each set of power provision values within the initial supply meter data, further operations to generate cleansed supply meter data from the initial supply meter data in which each set of power provision values defines a complete time series, wherein a complete time series comprises a series of values at a recurring time interval without gaps, the further operations comprising:
generating, by the processor, a naive power provision model from the power provision values of the set of power provision values that are not identified as outliers;
identifying missing power provision values, wherein each power provision value identified as missing or an outlier in the set of power provision values defines at least part of a gap that prevents the set of power provision values from defining a complete time series; and
employing, by the processor, and for each missing or outlier power provision value in each gap that exceeds a predetermined threshold quantity of power provision values, the naive power provision model of the corresponding bucket to generate a power provision value to fill the gap;
performing, for each set of power consumption values within the initial load meter data, further operations to generate cleansed load meter data from the initial load meter data in which each set of power consumption values defines a complete time series, the further operations comprising:
generating, by the processor, a naive power consumption model from the power consumption values of the set of power consumption values that are not identified as outliers;
identifying missing power consumption values, wherein each power consumption value identified as missing or an outlier in the set of power consumption values defines at least part of a gap that prevents the set of power consumption values from defining a complete time series; and
employing, by the processor, and for each missing or outlier power consumption value in each gap that exceeds a predetermined threshold quantity of power consumption values, the naive power consumption model of one of the corresponding bucket to generate a power consumption value to fill the gap;
merging the cleansed load meter data and the cleansed supply meter data into merged meter data; and
storing, by the processor, the merged meter data within the storage to enable generation of power provision models and power consumption models of the power grid.

22. The computer-implemented method of claim 21, comprising:
performing, for each set of power provision values within the initial supply meter data, further operations to generate the cleansed supply meter data from the initial supply meter data, the further operations comprising:
employing, by the processor, and for each missing or outlier power provision value in each gap that does not exceed the predetermined threshold quantity of power provision values, interpolation of power provision values adjacent to the gap to generate a power provision value to fill the gap; and
performing, for each set of power consumption values within the initial load meter data, further operations to generate the cleansed load meter data from the initial load meter data, the further operations comprising:
employing, by the processor, and for each missing or outlier power consumption value in each gap that does not exceed the predetermined threshold quantity of power consumption values, interpolation of power consumption values adjacent to the gap to generate a power consumption value to fill the gap.

23. The computer-implemented method of claim 21, comprising:
receiving, by the processor, raw supply meter readings from the multiple supply meters via a communications network of the power grid, wherein:
each raw supply meter reading comprises a measure, taken by a supply meter, of electric power supplied on at least one phase of electric power by the corresponding supply asset; and
each raw supply meter reading comprises an indication of when the measure of electric power provided was taken by the supply meter;
receiving, by the processor, raw load meter readings from the multiple load meters via a communications network of the power grid, wherein:
each raw load meter reading comprises a measure, taken by a load meter, of electric power consumed on at least one phase of electric power by an endpoint asset; and
each raw load meter reading comprises an indication of when the measure of electric power consumed was taken by the load meter;
converting, by the processor, and for each supply meter of the multiple supply meters, a set of corresponding raw supply meter readings into a corresponding set of power provision values of the initial supply meter data; and
converting, by the processor, and for each load meter of the multiple load meters, a set of corresponding raw load meter readings into a corresponding set of power consumption values of the initial load meter data.

24. The computer-implemented method of claim 23, comprising:
retrieving, by the processor, proxy load meter readings, wherein the proxy load meter readings comprise indications of electrical characteristics of at least one endpoint asset at an endpoint location that was not connected to the power grid for a portion of the predetermined historical time period; and performing, for each endpoint asset that was not connected to the power grid for a portion of the predetermined historical time period, further operations comprising:
using, by the processor, corresponding electrical characteristics indicated in the proxy load meter readings to generate simulated load meter readings for the endpoint asset for the portion of the predetermined historical time period; and
augmenting, by the processor, the raw load meter readings with the simulated load meter readings prior to conversion to power consumption values.

25. The computer-implemented method of claim 21, comprising:
retrieving, by the processor, initial weather data comprising weather data values indicative of weather conditions at multiple weather station locations within a geographic area covered by the power grid;
performing, by the processor, cleansing of the weather data values to fill gaps in the weather data values that prevent the weather data values from defining a complete time series of weather data values to cause the weather data values associated with each of the weather station location to define a complete time series of weather data values to generate cleansed weather data from the initial weather data;
correlating, by the processor, each power consumption value of the initial load meter data to a weather data value in the complete time series of weather data values of the cleansed weather data;
assigning each power consumption value of the initial load meter data to one of the multiple buckets based at least on the correlated weather data value;
correlating, by the processor, each power provision value of the initial supply meter data to a weather data value in the complete time series of weather data values of the cleansed weather data; and
assigning each power provision value of the initial supply meter data to one of the multiple buckets based at least on the correlated weather data value.

26. The computer-implemented method of claim 25, comprising:
retrieving, by the processor, calendar data comprising at least one of:
indications of correlations between dates within the historical time period to days of a week or months of a year; or
indications of holidays within the historical time period that are applicable to at least a portion of the geographic area covered by the grid;
defining each bucket of the multiple buckets to correspond to a different combination of a range of values of a weather condition and a range of dates;
assigning each power consumption value of the initial load meter data to one of the multiple buckets based at least on the date of the corresponding measure of power consumption and the correlated weather data value; and
assigning each power provision value of the initial supply meter data to one of the multiple buckets based at least on the date of the corresponding measure of power provision and the correlated weather data value.

27. The computer-implemented method of claim 21, comprising:
retrieving, by the processor, asset data comprising at least one of:
identifiers of supply assets and endpoint assets of the power grid;
indications of locations of supply assets and endpoint assets within a hierarchy of electrical pathways of the power grid;
indications of geographic locations of supply locations of supply assets within a geographic area covered by the power grid; and
indications of geographic locations of endpoint locations of endpoint assets within the geographic area covered by the power grid; and
performing, for each set of power provision values within the cleansed supply meter data, further operations comprising:
using, by the processor, the asset data to correlate the supply asset corresponding to the set of power provision values to one or more endpoint assets that are provided with electric power by the supply asset in the power grid;
retrieving, by the processor, the one or more sets of power consumption values within the cleansed load meter data that correspond to the one or more endpoint assets;
aggregating, by the processor, the one or more sets of power consumption values to generate a set of aggregated power consumption values to correspond to the set of power provision values; and
including, by the processor, the set of aggregated power consumption values in the merged meter data.

28. The computer-implemented method of claim 21, comprising:
retrieving, by the processor, and from the merged meter data, a first portion of each time series of power provision values and of each time series of power consumption values from for a predetermined training time period within the historical time period for use as training data;
retrieving, by the processor, and from the merged meter data, a second portion of each time series of power provision values and of each time series of power consumption values from for a predetermined testing time period within the historical time period for use as testing data;
retrieving, by the processor, and from at least one of cleansed weather data, calendar data or economic data, a first subset of data values for the training time period for use as further training data and a second subset of data values for the testing time period for use as further testing data, wherein:
the cleansed weather data comprises data values indicative of weather conditions at multiple weather station locations within a geographic area covered by the power grid throughout the historical time period;
the calendar data comprises at least one of indications of correlations between dates within the historical time period to days of a week or months of a year, or indications of holidays within the historical time period that are applicable to at least a portion of the geographic area covered by the grid; and
the economic data comprises data values indicative of economic conditions within the geographic area covered by the power grid throughout the historical time period;
performing, by the processor, and for each supply meter of the multiple supply meters, further operations comprising:
using the first portion of the corresponding time series within the training data, along with the further training data, in multiple performances of linear regression to generate a corresponding set of candidate models of power provision by the corresponding supply asset, wherein the corresponding set of candidate models of power provision are of a preselected set of model types;

using the second portion of the corresponding time series within the testing data, along with the further testing data, to derive a degree of error for each candidate model of the corresponding set of candidate models of power provision;

analyzing the degree of error of each candidate model of the corresponding set of candidate models of power provision to identify a corresponding champion model of power provision; and storing an indication of the corresponding champion model of power provision and an indication of variables to be used as inputs thereto within the storage to enable use of the corresponding champion model of power provision in a prediction of power provision by the corresponding supply asset; and performing, by the processor, and for each load meter of the multiple load meters, further operations comprising:

using the first portion of the corresponding time series within the training data, along with the further training data, in multiple performances of linear regression to generate a corresponding set of candidate models of power consumption by the corresponding endpoint asset, wherein the corresponding set of candidate models of power consumption are of the preselected set of model types;

using the second portion of the corresponding time series within the testing data, along with the further testing data, to derive a degree of error for each candidate model of the corresponding set of candidate models of power consumption; analyzing the degree of error of each candidate model of the corresponding set of candidate models of power consumption to identify a corresponding champion model of power consumption; and storing an indication of the corresponding champion model of power consumption and an indication of variables to be used as inputs thereto within the storage to enable use of the corresponding champion model of power consumption in a prediction of power consumption by the corresponding endpoint asset.

29. The computer-implemented method of claim 28, comprising:

retrieving, by the processor, and from the merged meter data, a third portion of each time series of power provision values and of each time series of power consumption values from for a predetermined short range training time period within the historical time period for use as short range training data, wherein the short range training time period is shorter than the predetermined training time period;

retrieving, by the processor, and from the merged meter data, a fourth portion of each time series of power provision values and of each time series of power consumption values from for a predetermined long range training time period within the historical time period for use as long range training data, wherein the long range training time period is longer than the predetermined training time period;

retrieving, by the processor, and from at least the cleansed weather data, a third subset of data values for the short range training time period for use as further short range training data;

retrieving, by the processor, and, from at least the economic data, a fourth subset of data values for the long range training time period for use as further long range training data;

performing, by the processor, and for each supply meter of the multiple supply meters, further operations comprising:

using the third portion of the corresponding time series within the short range training data, along with the further short range training data to generate a corresponding second-stage short range model of power provision by the corresponding supply asset to address overfitting of the corresponding champion model of power provision for a short range prediction time period shorter than at least one of the predetermined training time period or the predetermined testing time period;

using the fourth portion of the corresponding time series within the long range training data, along with the further long range training data to generate a corresponding second-stage long range model of power provision by the corresponding supply asset to address overfitting of the corresponding champion model of power provision for a long range prediction time period longer than the at least one of the predetermined training time period or the predetermined testing time period; and storing indications of the corresponding second-stage short range model of power provision and corresponding second-stage long range model of power provision to enable use of the corresponding champion model of power provision in a short range or long range prediction of power provision by the corresponding supply asset; and performing, by the processor, and for each load meter of the multiple load meters, further operations comprising:

using the third portion of the corresponding time series within the short range training data, along with the further short range training data to generate a corresponding second-stage short range model of power consumption by the corresponding endpoint asset to address overfitting of the corresponding champion model of power consumption for a short range prediction time period shorter than the at least one of the predetermined training time period or the predetermined testing time period;

using the fourth portion of the corresponding time series within the long range training data, along with the further long range training data to generate a corresponding second-stage long range model of power consumption by the corresponding endpoint asset to address overfitting of the corresponding champion model of power consumption for a long range prediction time period longer than the at least one of the predetermined training time period or the predetermined testing time period; and storing indications of the corresponding second-stage short range model of power consumption and corresponding second-stage long range model of power consumption to enable use of the corresponding champion model of power consumption in a short range or long range prediction of power consumption by the corresponding endpoint asset.

30. The computer-implemented method of claim 29, comprising:
receiving, by the processor, a request from a requesting device for a prediction that covers a specified portion of the power grid for a specified prediction time period;
retrieving, by the processor, asset data comprising at least one of:
identifiers of supply assets and endpoint assets of the power grid;
indications of locations of supply assets and endpoint assets within a hierarchy of electrical pathways of the power grid;
indications of geographic locations of supply locations of supply assets within a geographic area covered by the power grid; and
indications of geographic locations of endpoint locations of endpoint assets within the geographic area covered by the power grid;
using, by the processor, the asset data to identify one or more supply assets and one or more endpoint assets within the specified portion of the power grid;
retrieving, by the processor, and from the merged meter data, a portion of the time series of power provision values for each supply meter that corresponds to an asset of the identified one or more supply assets;
for each supply meter that corresponds to a supply asset of the identified one or more supply assets, using, by the processor, the corresponding champion model of power provision with the retrieved portion of the corresponding time series of power provision values to generate a corresponding base prediction of power provision;
retrieving, by the processor, and from the merged meter data, a portion of the time series of power consumption values for each load meter that corresponds to an endpoint asset of the identified one or more endpoint assets;
for each load meter that corresponds to an endpoint asset of the identified one or more endpoint assets, using, by the processor, the corresponding champion model of power consumption with the retrieved portion of the corresponding time series of power consumption values to generate a corresponding base prediction of power consumption;
analyzing, by the processor, the specified prediction time period to determine whether the requested prediction comprises a short range prediction, a mid range prediction or a long range prediction based on a comparison of the specified prediction time period to the at least one of the predetermined training time period or the predetermined testing time period, wherein:
the specified prediction time period of the mid range prediction is longer than the specified prediction time period of the short range prediction, and is shorter than the specified prediction time period of the long range prediction;
the specified prediction time of the short range prediction is shorter than the at least one of the predetermined training time period or the predetermined testing time period; and
the specified prediction time of the long range prediction is longer than the at least one of the predetermined training time period or the predetermined testing time period;

in response to a determination that the requested prediction comprises a short range prediction, performing, by the processor, operations comprising:
for each supply meter that corresponds to a supply asset of the identified one or more supply assets:
using the corresponding second-stage short range model of power provision with the retrieved portion of the corresponding time series of power provision values to generate a corresponding short range refinement of the corresponding base prediction of power provision;
applying the corresponding short range refinement to the corresponding base prediction of power provision; and
providing the corresponding base prediction of power provision, after refinement, in response to the request; and
for each load meter that corresponds to an endpoint asset of the identified one or more load assets:
using the corresponding second-stage short range model of power consumption with the retrieved portion of the corresponding time series of power consumption values to generate a corresponding short range refinement of the corresponding base prediction of power consumption;
applying the corresponding short range refinement to the corresponding base prediction of power consumption; and
providing the corresponding base prediction of power consumption, after refinement, in response to the request;
in response to a determination that the requested prediction comprises a long range prediction, performing, by the processor, operations comprising:
for each supply meter that corresponds to a supply asset of the identified one or more supply assets:
using the corresponding second-stage long range model of power provision with the retrieved portion of the corresponding time series of power provision values to generate a corresponding long range refinement of the corresponding base prediction of power provision;
applying the corresponding long range refinement to the corresponding base prediction of power provision; and
providing the corresponding base prediction of power provision, after refinement, in response to the request; and
for each load meter that corresponds to an endpoint asset of the identified one or more load assets:
using the corresponding second-stage long range model of power consumption with the retrieved portion of the corresponding time series of power consumption values to generate a corresponding long range refinement of the corresponding base prediction of power consumption;
applying the corresponding long range refinement to the corresponding base prediction of power consumption; and
providing the corresponding base prediction of power consumption, after refinement, in response to the request; or
in response to a determination that the requested prediction comprises a mid range prediction, performing, by the processor, operations comprising:
for each supply meter that corresponds to a supply asset of the identified one or more supply assets, providing the corresponding base prediction of power provision in response to the request; and for each load meter that corresponds to an endpoint asset of the identified one or more load assets: providing the corresponding base prediction of power consumption in response to the request.

\* \* \* \* \*